(12) United States Patent
Kakui

(10) Patent No.: US 7,064,890 B2
(45) Date of Patent: Jun. 20, 2006

(54) OPTICAL AMPLIFIER AND OPTICAL COMMUNICATION SYSTEM INCLUDING THE SAME

(75) Inventor: Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 213 days.

(21) Appl. No.: 10/315,239

(22) Filed: Dec. 10, 2002

(65) Prior Publication Data

US 2003/0174390 A1 Sep. 18, 2003

Related U.S. Application Data

(60) Provisional application No. 60/336,193, filed on Mar. 22, 2002.

(30) Foreign Application Priority Data

Dec. 10, 2001 (JP) ............ P2001-376179
Mar. 4, 2002 (JP) ............ P2002-057600

(51) Int. Cl.
*H04B 10/12* (2006.01)

(52) U.S. Cl. .................................. 359/341.5
(58) Field of Classification Search ............ 359/341.5, 359/341.41
See application file for complete search history.

(56) References Cited

U.S. PATENT DOCUMENTS

| | | | |
|---|---|---|---|
| 5,245,690 A * | 9/1993 | Aida et al. .................. | 385/142 |
| 5,861,981 A | 1/1999 | Jabr | |
| 6,038,061 A * | 3/2000 | Sugaya ....................... | 359/337 |
| 6,081,369 A | 6/2000 | Waarts et al. | |
| 6,091,539 A * | 7/2000 | Kosaka .................. | 359/341.41 |
| 6,292,292 B1 * | 9/2001 | Garito et al. ............ | 359/341.5 |
| 6,313,941 B1 | 11/2001 | Suzuki et al. | |
| 6,335,821 B1 | 1/2002 | Suzuki et al. | |
| 6,356,387 B1 * | 3/2002 | Ohishi et al. ............ | 359/341.5 |
| 6,417,960 B1 * | 7/2002 | Shimojoh ................ | 359/337.2 |

(Continued)

FOREIGN PATENT DOCUMENTS

EP     0 762 569 A2     3/1997

(Continued)

OTHER PUBLICATIONS

T. Sakamoto et al., "Gain-equalized thulium-doped fiber amplifiers for 1460 nm-based WDM signals", OAA '99, Technical Digest, WD2 (1999).

(Continued)

*Primary Examiner*—Jack Keith
*Assistant Examiner*—Eric Bolda
(74) *Attorney, Agent, or Firm*—McDermott Will & Emery LLP

(57) ABSTRACT

The present invention relates to an optical amplifier (TDFA) or the like comprising a structure for constantly keeping the power of outputted signal light and gain flatness even when the power or number of channels of input signal light fluctuates.

In this optical amplifier, the pumping light outputted from each pumping light source is forwardly or backwardly supplied to an optical amplification fiber. The signal light inputted from an input port is amplified by the optical amplification fiber, and thus amplified light is outputted from an output port. An optical add/drop coupler causes a part of the light outputted from the optical amplification fiber to branch out, whereby its power is monitored by an output light monitor system at two or more wavelengths. According to thus obtained results of monitoring, a controller adjusts the pumping light outputted from each pumping light source.

62 Claims, 48 Drawing Sheets

U.S. PATENT DOCUMENTS

| | | | |
|---|---|---|---|
| 6,433,925 B1* | 8/2002 | Sakano et al. | 359/341.43 |
| 6,459,527 B1* | 10/2002 | Kosaka | 359/337.1 |
| 6,476,960 B1* | 11/2002 | Traynor et al. | 359/341.31 |
| 6,501,596 B1* | 12/2002 | Inoue et al. | 359/341.5 |
| 6,529,316 B1* | 3/2003 | Treyz et al. | 359/337.11 |
| 6,570,703 B1* | 5/2003 | Murakami et al. | 359/341.42 |
| 6,589,895 B1* | 7/2003 | Dejneka et al. | 501/42 |
| 6,594,071 B1* | 7/2003 | Gavrilovic et al. | 359/341.4 |
| 6,611,371 B1* | 8/2003 | Wigley et al. | 359/337.2 |
| 6,628,883 B1* | 9/2003 | Wyatt et al. | 385/142 |
| 6,631,027 B1* | 10/2003 | Gerrish et al. | 359/341.41 |
| 6,650,400 B1* | 11/2003 | Maroney et al. | 359/337.21 |
| 6,667,257 B1* | 12/2003 | Cole et al. | 501/37 |
| 6,690,506 B1* | 2/2004 | Zahnley et al. | 359/337.11 |
| 2001/0017728 A1* | 8/2001 | Kitabayashi et al. | 359/337 |
| 2002/0021882 A1* | 2/2002 | Wyatt et al. | 385/142 |
| 2002/0024723 A1* | 2/2002 | Sekiya et al. | 359/337.1 |
| 2003/0090782 A1* | 5/2003 | Kakui et al. | 359/337.1 |

FOREIGN PATENT DOCUMENTS

| | | |
|---|---|---|
| EP | 1 037 409 A2 | 9/2000 |
| EP | 1 111 743 | 6/2001 |
| JP | 09-120090 | 5/1997 |
| JP | 2000-299518 | 10/2000 |
| JP | P2001-203413 A | 7/2001 |
| WO | WO 01/50005 | 1/2001 |

OTHER PUBLICATIONS

I.G. Clarke et al., "S-band amplifier with variable gain tilt control", OFC 2001, Technical Digest, TuQ2 (2001).

T. Kasamatsu, et al., "Novel 1.50 μm Band Gain-Shifted Thulium-Doped Fiber Amplifier by using Dual Wavelength Pumping of 1.05 μm and 1.56 μm", OAA '99, Technical Digest, PDP1 (1999).

H. Hatayama, C. Hirose, K. Koyama, N. Akasaka and M. Nishimura : Variable attenuation slope compensator (VASC) using silica-based planer lightwave circuit technology for active gain slope control in EDFAs,OFC2000, WH7, 2000, pp. 142-144.

M. Yuda et al., High-power and Highly Reliable 1.05 μm InGaAs Strained-quantum-well Laser Diodes as Pump Sources for Thullium-doped Fiber Amplifiers OFC 2002, Thursday, Mar. 21, 2002, pp. 571-572.

Roy, Fabien., et al. "Noise and Gain Band Management of Thulium-Doped Fiber Amplifier with Dual-Wavelength Pumping Schemes." IEEE Photonics Technology Letters, vol., 13, No. 8, Aug. 2001, pp. 788-790, XP001107445.

Clarke, Ian, G., et al. "S-band amplifier with variable gain tilt control." Optical Fiber Communication Conference (OFC), Technical Digest Post-conference Edition, Trends in Optics and Photonics Series. Tops. vol. 54, Mar. 17, 2001, vol. 2, pp. TuQ2-1, XP010545813.

Aozasa, S., et al. "Tm-Doped Fiber Amplifier for 1470-nm-Band WDM Signals." IEEE Photonics Technology Letters, vol. 12, No. 10, Oct. 2000, pp. 1331-1333, XP000970127.

Aozasa, S., et al. "1480-1510 nm band T m-doped fibre amplifier with high power conversion efficiency of 42%." Electronics Letter, vol. 37, No. 19, Sep. 13, 2001, pp. 1157-1158, XP006017214.

Partial European Search Report: Reference: REC/P61968/000, Date: Nov. 25, 2005, Application No./Patent No. 02258518.6-2415, Applicant: Sumitomo Electric Industries, Ltd.

* cited by examiner

OPTICAL AMPLIFIER AND OPTICAL COMMUNICATION SYSTEM INCLUDING THE SAME

CROSS-REFERENCE TO RELATED APPLICATION

This application claims priority to Provisional Application Ser. No. 60/336,193 filed on Mar. 22, 2002, which is hereby incorporated by reference in its entirety.

BACKGROUND OF THE INVENTION

1. Field of the Invention

The present invention relates to an optical amplifier for amplifying a plurality of channels of signal light having respective wavelengths different from each other in an optical waveguide supplied with pumping light, and an optical communication system including the same.

2. Related Background Art

Optical communication systems transmit a large volume of information by propagating multiplexed signal light through an optical fiber transmission line. As a signal wavelength band, such optical communication systems have already employed C band (1530 nm to 1565 nm), whereas the use of L band (1565 nm to 1625 nm) has been under study. For achieving a greater volume, the use of S band (1460 nm to 1530 nm) as a signal wavelength band has also been under consideration.

The optical communication systems employ optical amplifiers for amplifying the signal light. Employed as an optical amplifier capable of amplifying the signal light in C or L band is EDFA (Erbium Doped Fiber Amplifier) in which an optical amplification fiber having a light-guiding region doped with Er (erbium) element (EDF: Erbium Doped Fiber) is used as an optical amplification medium. By supplying pumping light (in the wavelength band of 0.98 μm or 1.48 μm) to the EDF, the EDFA can amplify the C or L band of signal light propagating through the EDF.

On the other hand, as an optical amplifier capable of amplifying the S band of signal light, TDFA (Thulium Doped Fiber Amplifier), in which an optical amplification fiber having a light-guiding region doped with Tm (thulium) element (TDF: Thulium Doped Fiber) is used as an optical amplification medium, has been under study. By supplying pumping light (in the wavelength band of 0.8 μm, 1.05 μm, 1.2 μm, 1.4 μm, or 1.55 to 1.65 μm) to the TDF, the TDFA can amplify the S band of signal light propagating through the TDF.

While the EDFA utilizes the three-level type transition (at ground level, $^4I_{13/2}$ level, and $^4I_{15/2}$ level) of Er ion, the TDFA utilizes the four-level type transition (at ground level, $^3H_4$ level, $^3F_4$ level, and $^3H_6$ level) of Tm ion. As a consequence, the TDFA can modify the magnitude of gain without deteriorating the gain flatness even when the length of TDF is held constant (see, for example, literature 1, i.e., T. Sakamoto, et al., "Gain-equalized thulium-doped fiber amplifiers for 1460 nm-based WDM signals", OAA'99, Technical Digest, WD2 (1999)).

SUMMARY OF THE INVENTION

The inventors studied conventional techniques mentioned above and, as a result, have found the following problems.

FIGS. 1A and 1B are charts for explaining respective operations of EDFA and TDFA in comparison with each other. In FIG. 1A, curves G110A, G120A, G130A, and G140A indicate the unsaturated gain spectrum, unsaturated absorption spectrum, gain spectrum at a population inversion of 60%, and gain spectrum at a population inversion of 50% in the EDFA, respectively. In FIG. 1B, curves G110B, G120B, G130B, and G140B indicate the unsaturated gain spectrum, unsaturated absorption spectrum, gain spectrum at a population inversion of 60%, and gain spectrum at a population inversion of 50% in the TDFA, respectively. Each gain spectrum can be calculated according to the unsaturated gain spectrum and unsaturated absorption spectrum. In the case of TDFA as compared with that of EDFA, as can be seen from these graphs, the number of ions contributing to optical amplification fluctuates more depending on the power of pumping light, whereby the gain spectrum can be changed by integral multiples without fluctuating the gain slope. Thus, the TDFA can alter the magnitude of gain without deteriorating the gain flatness even when the length of TDF is constant. In the TDFA, the gain spectrum shifts to the longer wavelength side as the population inversion increases.

The TDFA described in the literature 1 intends to adjust only the magnitude of gain while constantly keeping the gain slope under the condition that the total input signal light power is held constant at −13 dBm.

The TDFA described in literature 2, i.e., I. G. Clarke, et al., "S-band amplifier with variable gain tilt control", OFC 2001, Technical Digest, TuQ2 (2001), has a variable optical attenuator disposed between first and second TDFs, and intends to adjust the gain slope. This TDFA compensates for the fluctuation in signal light power occurring in each signal channel due to the change in loss slope and the induced Raman scattering in the optical transmission line through which the signal light propagates before reaching the TDFA.

However, the description of TDFA in the above-mentioned literature 1 does not take account of actual operating conditions in wavelength division multiplexing (WDM) optical communication systems which transmit multiplexed signal light having a plurality of channels. Namely, while the number of channels of signal light fed into the TDFA is 4, the power of signal light in each channel is −19 dBm, and they are held constant, only the gain is changed in literature 1. While the power of pumping light supplied to the TDF is 630 mW or greater, the total power of amplified signal light is 11 dBm, thus yielding a ratio of 2% or less therebetween, whereby the pumping efficiency is very low.

As compared with the state of actual use, the TDFA described in the above-mentioned literature 1 has a lower total input signal light power (−13 dBm), such that the gain is not saturated with respect to the pumping light power, whereby the magnitude of gain can be adjusted alone while keeping the gain slope constant. Since improvements in the degree of wavelength multiplexing have been under study in wavelength division multiplexing (WDM) optical communication systems which transmit multiplexed signal light having a plurality of channels, the total power of signal light fed into the TDFA amplifying thus multiplexed signal light collectively is expected to become greater in practice. When the state of actual use is taken into consideration, the magnitude of gain should be controlled such that the output signal light power becomes constant instead of the total input signal light power. The TDFA described in the above-mentioned literature 2 does not take account of dynamic changes in loss of the optical transmission line or dynamic changes in the number of channels of signal light expected in the state of actual use. While optical communication systems on land are required to operate in an environment at a temperature of 0° C. to 65° C. in general, there have been no cases taking account of the temperature dependence of gain spectrum in TDF.

Optical amplifiers employed in a WDM optical communication system are required to alter their gain such that the output signal light power is maintained at a constant design value when the input signal light power fluctuates due to changes in transmission loss (span loss) of optical fiber transmission lines and the like. This regulation is known as automatic level control (ALC). Therefore, the description of literature 2 that changes only the gain while constantly keeping the input signal light level differs from the actual operating state of optical amplifiers. Even when the number of channels of signal light is 32, the output signal light power is −4 dBm/ch according to the description of literature 1. This output signal power is very low as an optical amplifier used in land main line type WDM optical communication systems.

FIG. 2 is a graph showing TDFA gain spectra obtained when conventional ALC is carried out. FIG. 3 shows TDFA output signal light power spectra obtained when conventional ALC is carried out. In FIGS. 2 and 3, curves G210 and G310, G220 and G320, G230 and G330, and G240 and G340 indicate spectra in the cases where the pumping light power is regulated such that the total power $P_{out}$ of output signal light becomes +18 dBm when the total power of signal light fed into the TDFA is −4.2 dBm, −2.2 dBm, −0.2 dBm, and +0.8 dBm, respectively. Here, a TDF having a Tm element doping concentration of 2000 wt.ppm and a length of 20 m is supplied with pumping light in the 1.05-μm wavelength band in the forward direction identical to the signal light propagating direction and also with pumping light in the same wavelength band in the backward direction, whereas these pumping light components forwardly and backwardly supplied to the TDF have the same power. As the input signal light power $P_{in}$ is greater, the gain slope (wavelength dependence of gain) increases from a negative value to a positive value, and the wavelength dependence of output signal light power increases from a negative value to a positive value, as can be seen from the above-mentioned spectra. This can be regarded as a phenomenon in which the gain spectrum of TDFA shifts toward the longer wavelength side (i.e., gain shift).

Meanwhile, literature 3, i.e., T. Kasamatsu, et al., "Novel 1.50-μm Band Gain-Shifted Thulium-Doped Fiber Amplifier by using Dual Wavelength Pumping of 1.05 μm and 1.56 μm", OAA'99, Technical Digest, PDP1 (1999), and Japanese Patent Application Laid-Open No. 2001-203413 state that a gain shift occurs in TDFA when TDF is supplied with not only pumping light in the wavelength band of 1.05 μm but also pumping light in the wavelength band of 1.55 μm to 1.65 μm or when the Tm element doping concentration in the TDF is 3000 wt.ppm or greater. However, as mentioned above, a gain shift occurs in the TDFA also when the input signal light power becomes greater.

Optical amplifiers employed in WDM optical communication systems are required to carry out not only the ALC when the input signal light fluctuates due to changes in span loss and the like, but also automatic gain control (AGC) when the number of channels of input signal light fluctuates. When the AGC is carried out in EDFA, the gain spectrum form is maintained regardless of pumping types. When the AGC is carried out in TDFA, by contrast, the gain spectrum form changes, thereby altering the gain flatness.

FIG. 4 shows gain spectra of TDFA obtained when conventional AGC is carried out. In FIG. 4, curves G410, G420, and G430 indicate spectra obtained in the cases where the pumping light power is regulated so as to yield a gain peak of 18 dB when the total power $P_{in}$ of signal light fed into the TDFA is −4.2 dBm, −1.2 dBm, and +0.8 dBm, respectively. Here, a TDF having a Tm element doping concentration of 2000 wt.ppm and a length of 20 m is supplied with pumping light in the 1.05-μm wavelength band in the forward direction identical to the signal light propagating direction and also with pumping light in the same wavelength band in the backward direction, whereas these pumping light components forwardly and backwardly supplied to the TDF have the same power. As the input signal light power $P_{in}$ is greater, the gain slope (wavelength dependence of gain) increases from a negative value to a positive value as can be seen from the above-mentioned spectra. Namely, a gain shift occurs also when the number of channels of input signal light fluctuates.

In view of the inventor's findings mentioned above, it is an object of the present invention to provide an optical amplifier (TDFA) comprising a structure which can constantly keep the power and gain flatness of output signal light against fluctuations in the power and number of signal channels in input signal light, and an optical communication system including this optical amplifier.

The optical amplifier according to the present invention comprises, as an optical waveguide disposed on a signal propagating line extending from a signal input end to a signal output end, an optical waveguide having a light-guiding region doped with Tm element. The optical amplifier further comprises a pumping light supply system for supplying the optical waveguide with pumping light, a monitor system, and a controller. The monitor system monitors two or more wavelengths of light included in an amplification wavelength band at one or more positions on the signal propagating line. According to the result of monitoring obtained by the monitor system, the controller adjusts the power of pumping light supplied from the pumping light supply system to the optical waveguide, so as to regulate the gain flatness in the optical waveguide and the power of signal light outputted from the optical waveguide.

The pumping light supply system comprises at least light source means (first light source means) for supplying pumping light of one or more channels included in the wavelength band of 1.05 μm or 1.4 μm to the optical waveguide, and carries out one of forward pumping for supplying the pumping light in the forward direction identical to the signal light propagating direction, backward pumping for supplying the pumping light in the backward direction opposite from the signal light propagating direction, and bidirectional pumping for supplying the pumping light in both forward and backward directions.

Controlling methods in the controller include FW/BW control for adjusting each of the forward and backward pumping light powers in a bidirectional pumping configuration as a first controlling method, auxiliary light source control for supplying pumping light of one or more channels included in the wavelength band of 1.2 μm or 1.55 to 1.65 μm from auxiliary light source means (second light source means) together with the pumping light of one or more channels included in the wavelength band of 1.05 μm or 1.4 μm as a second controlling method, VOA control utilizing a variable optical attenuator (VOA) as a third controlling method, and VASC control utilizing variable attenuation slope compensator (VASC) as a fourth controlling method. The auxiliary light source control, which is the second controlling method, is effective for fluctuations in the number of channels and temperature, and is suitable for AGC (Automatic Gain Control) in particular. The VOA control, which is the third controlling method, is effective for fluctuations in span loss and temperature, and is suitable for ALC (Automatic Level Control) in particular. The VASC control, which is the fourth controlling method, is effective for each of fluctuations in span loss, the number of signal channels, and temperature, and is suitable for each of the AGC and ALC. The first to fourth controlling methods may be carried out separately or in combination of two or more.

In the FW/BW control, the pumping light supply system includes first light source means for supplying the optical waveguide with pumping light of one or more channels included in the wavelength band of 1.05 µm or 1.4 µm, and a structure for guiding a part of the pumping light from the first light source means to the optical waveguide by way of an input end of the optical waveguide in the forward direction identical to the signal light advancing direction while guiding a part of the pumping light from the first light source means to the optical waveguide by way of an output end of the optical waveguide in the backward direction opposite from the signal light advancing direction. The controller adjusts the power of pumping light supplied to the optical waveguide in the forward direction, so as to regulate the gain flatness of the optical waveguide, and adjusts the power of pumping light supplied to the optical waveguide in the backward direction, so as to regulate the power of signal light outputted from the optical waveguide.

Specifically, as the FW/BW control, the controller adjusts the ratio between respective powers of pumping light supplied to the optical waveguide in the forward and backward directions, so as to regulate the gain flatness of the optical waveguide, and adjusts the sum of respective powers of pumping light supplied to the optical waveguide in the forward and backward directions, so as to regulate the power of signal light from the optical waveguide. The controller may adjust the power of pumping light supplied to the optical waveguide in at least one of the forward and backward directions according to the number of channels of signal light propagating through the optical waveguide, so as to regulate the gain flatness of optical waveguide and the power of output signal light. Alternatively, the controller may adjust the power of pumping light supplied to the optical waveguide in at least one of the forward and backward directions according to the power of signal light fed into the optical waveguide, so as to regulate the gain flatness of optical waveguide and the power of output signal light.

In the auxiliary light source control, the pumping light supply system includes first light source means for outputting pumping light of one or more channels included in the wavelength band of 1.05 µm or 1.4 µm and second light source means for outputting pumping light of one or more channels included in the wavelength band of 1.2 µm or 1.55 to 1.65 µm. Also, as the auxiliary light source control, the controller adjusts the power of pumping light supplied from the second light source means to the optical waveguide, so as to regulate the gain flatness of optical waveguide, and adjusts the power of pumping light supplied from the first light source means to the optical waveguide, so as to regulate the power of signal light outputted from the optical waveguide. The controller may adjust the power of pumping light supplied from the second light source means to the optical waveguide according to the number of channels of signal light propagating through the optical waveguide, so as to regulate the gain flatness of optical waveguide and the power of output signal light. The controller may adjust the power of pumping light supplied from the second light source means to the optical waveguide according to the power of pumping light fed into the optical waveguide, so as to regulate the gain flatness of optical waveguide and the power of output signal light.

In the VOA control and VASC control, the optical amplifier further comprises a transmission characteristic variable optical member, disposed on the signal propagating line and optically connected to the optical waveguide, having a variable transmission characteristic in a signal wavelength band. Here, the controller adjusts the power of pumping light and the transmission characteristic of the transmission characteristic variable optical member, so as to regulate both of the magnitude of amplification gain and the gain spectrum form in the optical waveguide.

In the case where the transmission characteristic variable optical member is a VOA having a structure with a variable transmittance for the signal light in particular, the controller in the optical amplifier including first light source means for outputting pumping light of one or more channels included in the wavelength band of 1.05 µm or 1.4 µm and second light source means for outputting pumping light of one or more channels included in the wavelength band of 1.2 µm or 1.55 to 1.65 µm adjusts the power of pumping light of one or more channels included in the wavelength band of 1.2 µm or 1.55 to 1.65 µm outputted from the second light source means in accordance with the number of channels of the signal light propagating through the optical waveguide, and adjusts the transmittance of VOA in the signal wavelength band according to the power of signal light fed into the optical waveguide or a target value of power of signal light outputted from the optical waveguide, so as to regulate the gain spectrum form in the optical waveguide. Further, the controller adjusts the power of pumping light in the wavelength band of 1.05 µm or 1.4 µm outputted from the first light source means, so as to regulate the power of signal light outputted from the optical waveguide.

Namely, in the VOA control, the controller adjusts the transmittance fluctuation amount ΔA (dB) of VOA represented by the following expression:

$$\Delta A = X \cdot (\Delta P_{in} - \Delta P_{out})$$

where $\Delta P_{in}$ (dB) is the amount of power fluctuation in signal light fed into the optical waveguide, $\Delta P_{out}$ (dB) is the amount of target power fluctuation of signal light outputted from the optical waveguide, and X is a coefficient having a value corresponding to the number of channels of signal light propagating through the optical waveguide.

In the case of VASC in which the transmission characteristic variable optical member has a structure with a variable slope of loss spectrum with respect to signal light, the controller in the optical amplifier including first light source means for outputting pumping light of one or more channels included in the wavelength band of 1.05 µm or 1.4 µm and second light source means for outputting pumping light of one or more channels included in the wavelength band of 1.2 µm or 1.55 to 1.65 µm adjusts the power of pumping light of one or more channels included in the wavelength band of 1.2 µm or 1.55 to 1.65 µm outputted from the second light source means in accordance with the number of channels of the signal light propagating through the optical waveguide, and adjusts the slope of loss spectrum with respect to signal light in the VASC according to the power of signal light fed into the optical waveguide or a target value of power of signal light outputted from the optical waveguide, so as to regulate the gain spectrum form in the optical waveguide with respect to signal light. Further, the controller adjusts the power of pumping light of one or more channels included in the wavelength band of 1.05 µm or 1.4 µm outputted from the first light source, so as to regulate the power of signal light outputted from the optical waveguide.

Namely, in the VASC control, the controller adjusts the loss spectrum slope fluctuation amount ΔS (dB) in VASC in the signal wavelength band represented by the following expression:

$$\Delta S = Y \cdot (\Delta P_{in} - \Delta P_{out})$$

where $\Delta P_{in}$ (dB) is the amount of power fluctuation in signal light fed into the optical waveguide, $\Delta P_{out}$ (dB) is the amount of target power fluctuation of signal light outputted from the optical waveguide, and Y is a coefficient having a value corresponding to the number of channels of signal light propagating through the optical waveguide.

The VASC, which is the transmission characteristic variable optical member, may have a structure in which the loss spectrum form in the signal wavelength band is shiftable in a wavelength axis direction.

In this case, the pumping light supply system includes first light source means for outputting pumping light of one or more channels included in the wavelength band of 1.05 µm or 1.4 µm. The controller adjusts the slope and wavelength axis direction shift amount of loss spectrum of VASC in the signal wavelength band according to the number of channels of signal light propagating through the optical waveguide, and adjusts the slope of loss spectrum of VASC in the signal wavelength band according to the power of signal light fed into the optical waveguide and a target power of signal light outputted from the optical waveguide, so as to regulate the gain spectrum form in the optical waveguide. Further, the controller adjusts the power of pumping light of one or more channels included in the wavelength band of 1.05 µm or 1.4 µm outputted from the first light source, so as to regulate the power of signal light outputted from the optical waveguide.

In the optical amplifier according to the present invention, the shiftable amount in the wavelength direction of loss spectrum is preferably at least 10 nm, more preferably at least 15 nm.

In the optical amplifier according to the present invention, the monitor system may monitor light outputted from the optical waveguide and spontaneously emitted light generated in the optical waveguide, e.g., spontaneously emitted light released from a side face of the optical waveguide, for at least two wavelengths included in the amplification wavelength band. The side-face detection is preferred since no insertion loss occurs. The monitor system may detect at least one of the power or number of channels of signal light fed into the optical waveguide and the power of light outputted from the optical waveguide. The monitor system may detect the total power of signal light fed into the optical waveguide and the total power of light outputted from the optical waveguide.

Specifically, the monitor system comprises an optical add/drop coupler, a filter, and a light-receiving section. The optical add/drop coupler isolates a part of light outputted from the optical waveguide. The filter selectively transmits therethrough a specific wavelength of light included in the part of light isolated by the optical add/drop coupler. The light-receiving section detects the power of specific wavelength of light transmitted through the filter. The monitor system may comprise an optical add/drop coupler, a diffraction grating, and a light-receiving section. In this case, the optical add/drop coupler isolates a part of light outputted from the optical waveguide. The diffraction grating diffracts the part of light isolated by the optical add/drop coupler. The light-receiving section detects the power of a specific wavelength of the light included in the light diffracted by the diffraction grating. Here, the number of channels of signal light fed into the optical waveguide can be detected from the spectrum of light diffracted by the diffraction grating.

The optical waveguide in the optical amplifier according to the present invention preferably includes an optical fiber having a core region doped with Tm element since it can easily increase the waveguide length.

The optical amplifier according to the present invention may comprise not only an optical waveguide having a light-guiding region doped with Tm element as the optical waveguide disposed on the signal propagating line extending from the signal input end to the signal output end, but also a pumping light supply system, a temperature detecting section, and a controller. For supplying the optical waveguide with pumping light, the pumping light supply section has a forward pumping, backward pumping, or bidirectional pumping structure. The temperature detecting section detects the temperature of the optical waveguide or in the vicinity thereof. The controller adjusts the power of pumping light supplied from the pumping light supply system to the optical waveguide according to the result of detection obtained by the temperature detecting section, so as to regulate the gain flatness in the optical waveguide and control the power of signal light outputted from the optical waveguide.

The controller carries out any of the above-mentioned first to fourth controlling methods or a control method which is a combination of at least two thereof.

Specifically, in the optical amplifier in which the pumping light supply system includes first light source means for supplying the optical waveguide with pumping light of one or more channels included in the wavelength band of 1.05 µm or 1.4 µm and a structure for guiding a part of the pumping light from the first light source means to the optical waveguide by way of the input end of the optical waveguide in the forward direction identical to the signal light advancing direction while guiding a part of the pumping light from the first light source means to the optical waveguide by way of the output end of the optical waveguide in the backward direction opposite from the signal light advancing direction, as FW/BW control, the controller adjusts the power of pumping light supplied to the optical waveguide in the forward direction, so as to regulate the gain flatness of optical waveguide, and adjusts the power of pumping light supplied to the optical waveguide in the backward direction, so as to regulate the power of signal light outputted from the optical waveguide. Namely, as the FW/BW control, this controlling method adjusts the ratio between respective powers of pumping light supplied to the optical waveguide in the forward and backward directions, so as to regulate the gain flatness of optical waveguide, and adjusts the sum of respective powers of pumping light supplied to the optical waveguide in the forward and backward directions, so as to regulate the power of signal light outputted from the optical waveguide.

In the optical amplifier in which the pumping light supply system includes first light source means for supplying the optical waveguide with pumping light of one or more channels included in the wavelength band of 1.05 µm or 1.4 µm and second light source means for supplying the optical waveguide with pumping light of one or more channels included in the wavelength band of 0.8 µm, 1.2 µm or 1.55 to 1.65 µm, the controlling method may adjust, as auxiliary light source control, the power of pumping light supplied from the second light source means to the optical waveguide, so as to regulate the gain flatness of optical waveguide, and adjusts the power of pumping light supplied from the first light source means to the optical waveguide, so as to regulate the power of signal light outputted from the optical waveguide.

The optical amplifier according to the present invention may further comprise a transmission characteristic variable optical member, disposed on the signal propagating line and optically connected to the optical waveguide, having a variable transmission characteristic in a signal wavelength band. In this case, the controller adjusts the power of pumping light and the transmission characteristic of the transmission characteristic variable optical member, so as to regulate both of the magnitude of amplification gain and the gain spectrum form in the optical waveguide.

The transmission characteristic variable optical member may include a VOA having a structure with a variable transmittance with respect to the signal light. The transmission characteristic variable optical member may include a VASC having a structure with a variable slope of loss spectrum with respect to the signal light. In particular, the VASC includes a plurality of Mach-Zehnder interferometers configured in a plurality of stages. The VASC may have a structure in which the loss spectrum form in the signal wavelength band is shiftable in a wavelength axis direction. Here, the shiftable amount in the wavelength direction of loss spectrum is preferably at least 10 nm, more preferably at least 15 nm.

The optical waveguide in the optical amplifier according to the present invention preferably includes an optical fiber having a core region doped with Tm element since it can easily increase the waveguide length.

The optical communication system according to the present invention includes the optical amplifier comprising the configuration mentioned above (optical amplifier according to the present invention), and transmits a plurality of channels of signal light having respective wavelengths different from each other. Since signal light in a predetermined wavelength band (1455 to 1485 nm) is amplified by the above-mentioned optical amplifier, this optical communication system yields an excellent transmission quality in the predetermined wavelength band.

The present invention will be more fully understood from the detailed description given hereinbelow and the accompanying drawings, which are given byway of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the optical amplifier and optical communication system according to the present invention will be explained with reference to FIGS. 5 to 55, 56A to 57B, 58, 59, and 60A to 62B. In the explanation of the drawings, constituents identical to each other will be referred to with numerals identical to each other without repeating their overlapping descriptions.

First Embodiment of Optical Amplifier

Figure 1A:
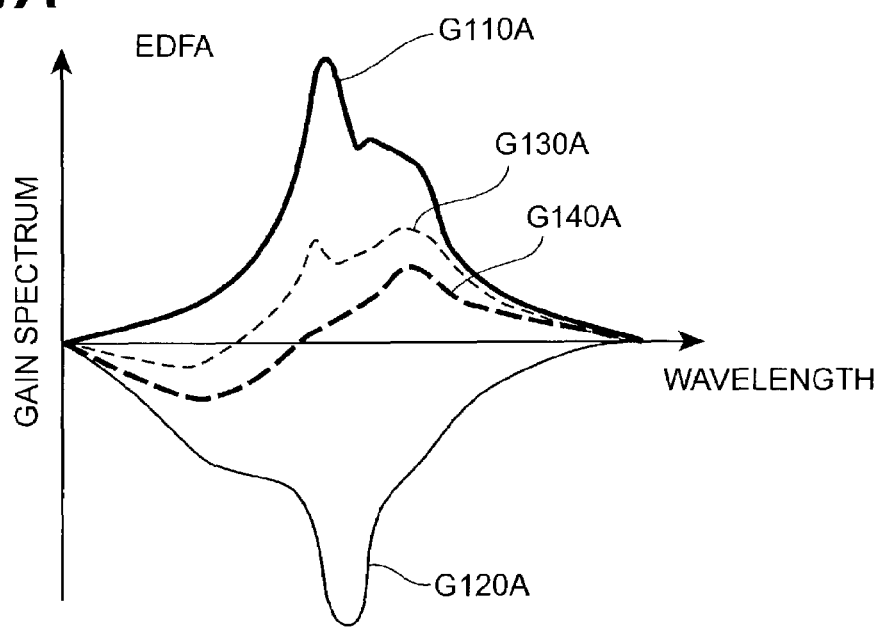
FIGS. 1A and 1B are graphs for explaining respective operations of EDFA and TDFA in comparison with each other.
Figure 1B:
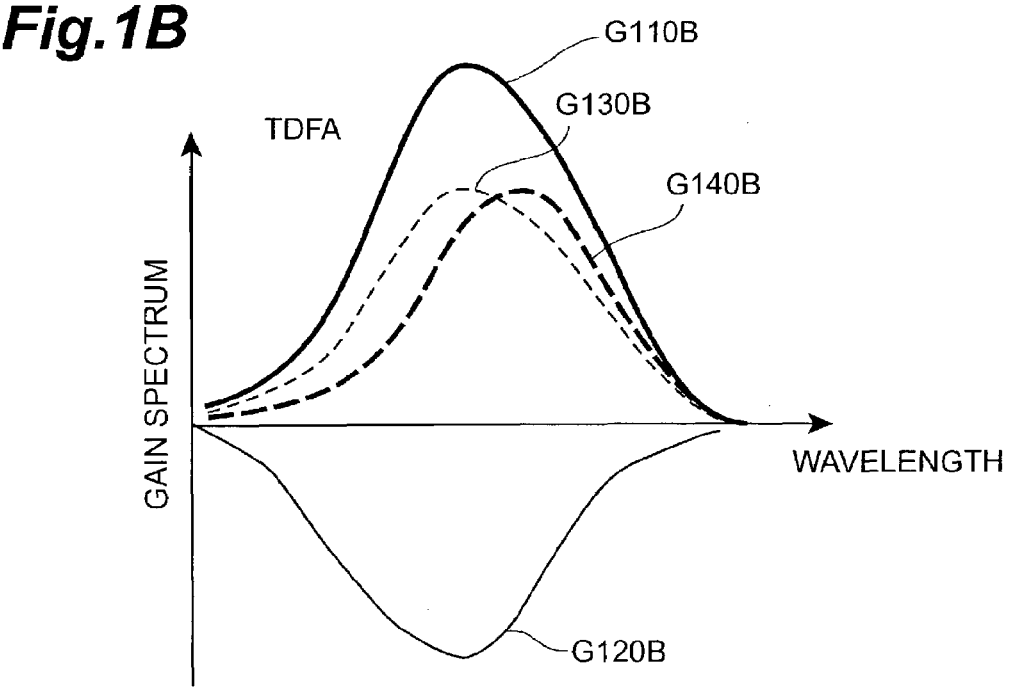
Figure 2:
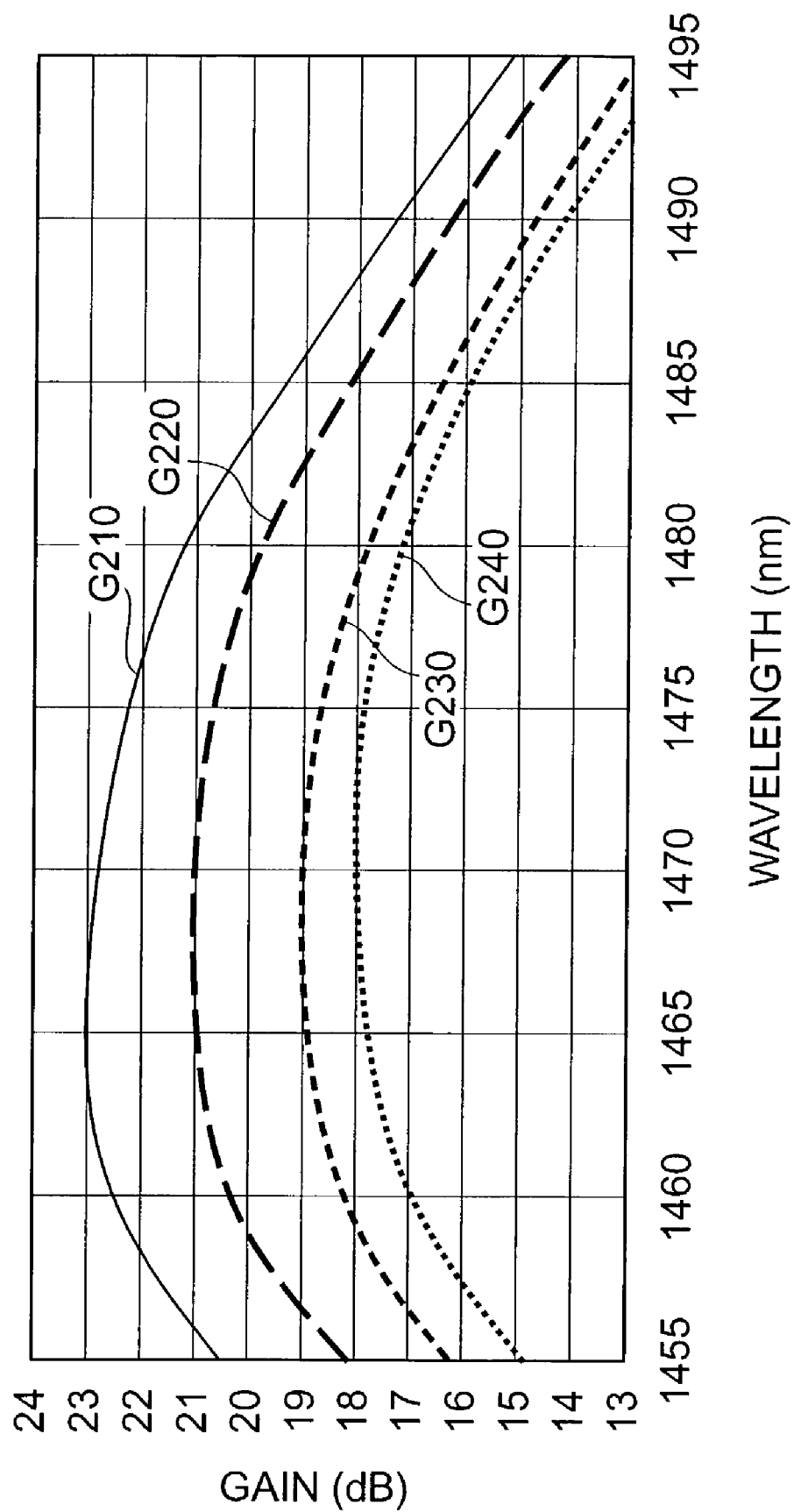
FIG. 2 is a graph showing gain spectra of TDFA obtained when the conventional ALC is carried out.
Figure 3:
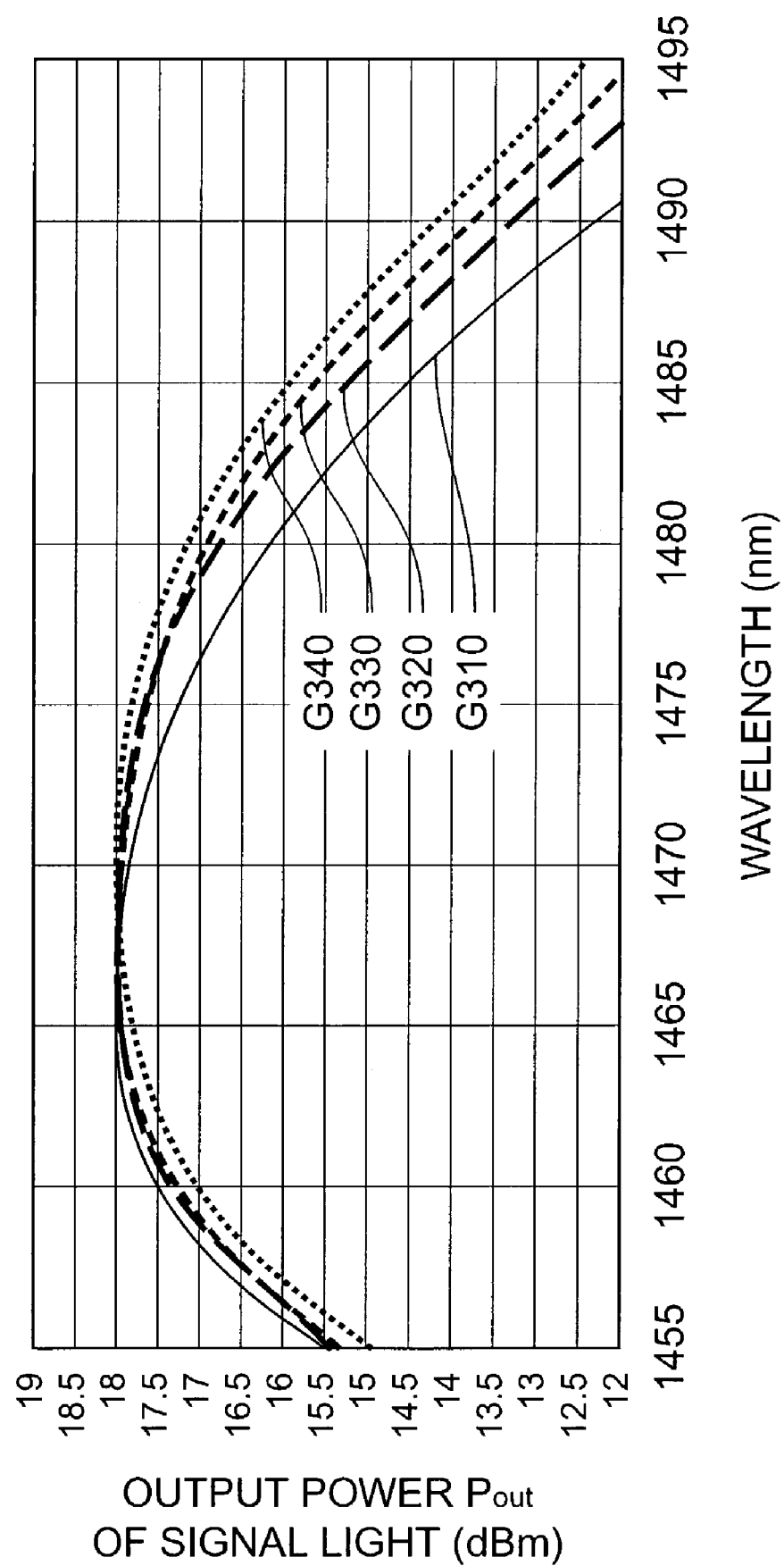
FIG. 3 shows output signal light power spectra of TDFA obtained when the conventional ALC is carried out.
Figure 4:
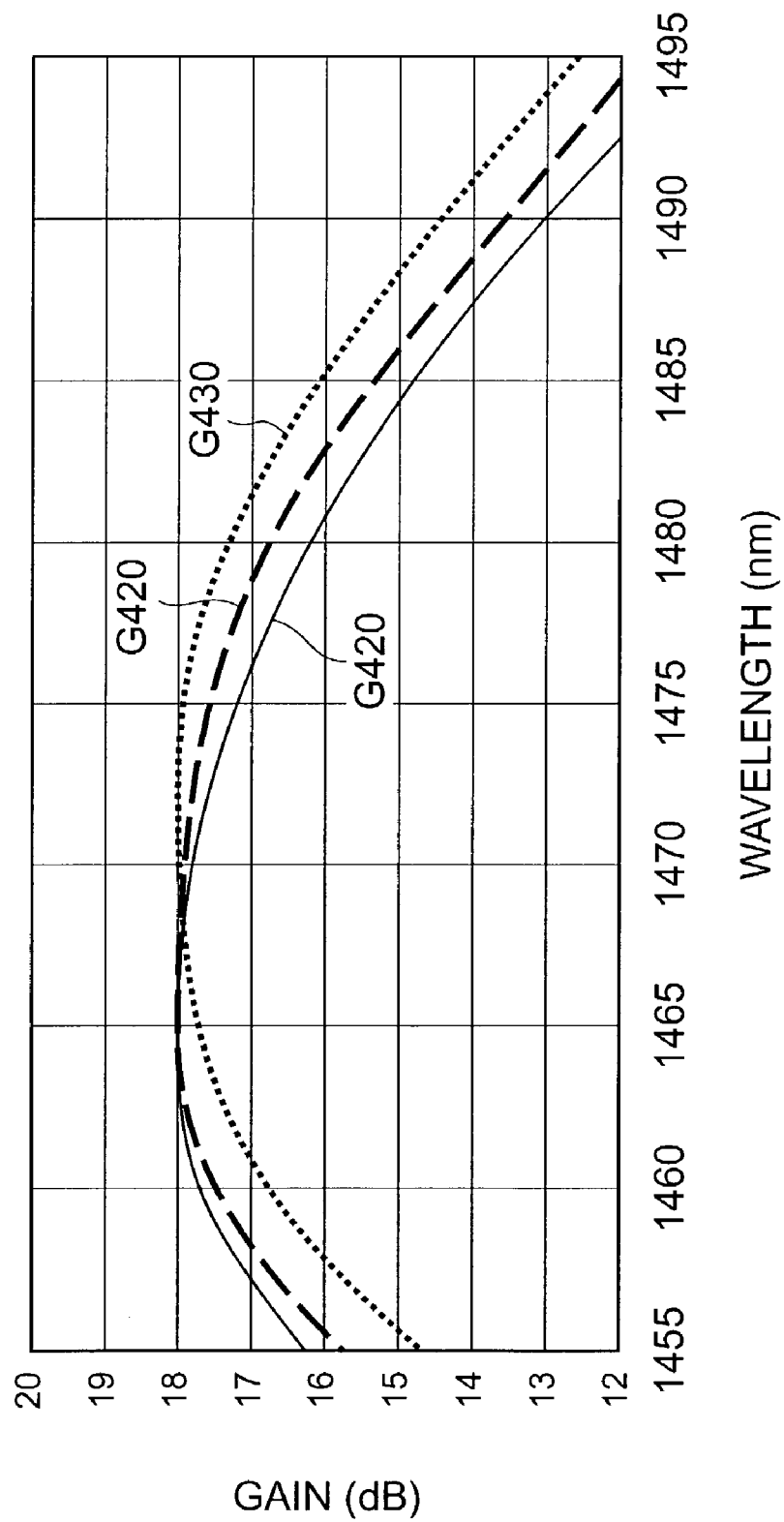
FIG. 4 shows output signal light power spectra of TDFA obtained when the conventional AGC is carried out.
Figure 5:
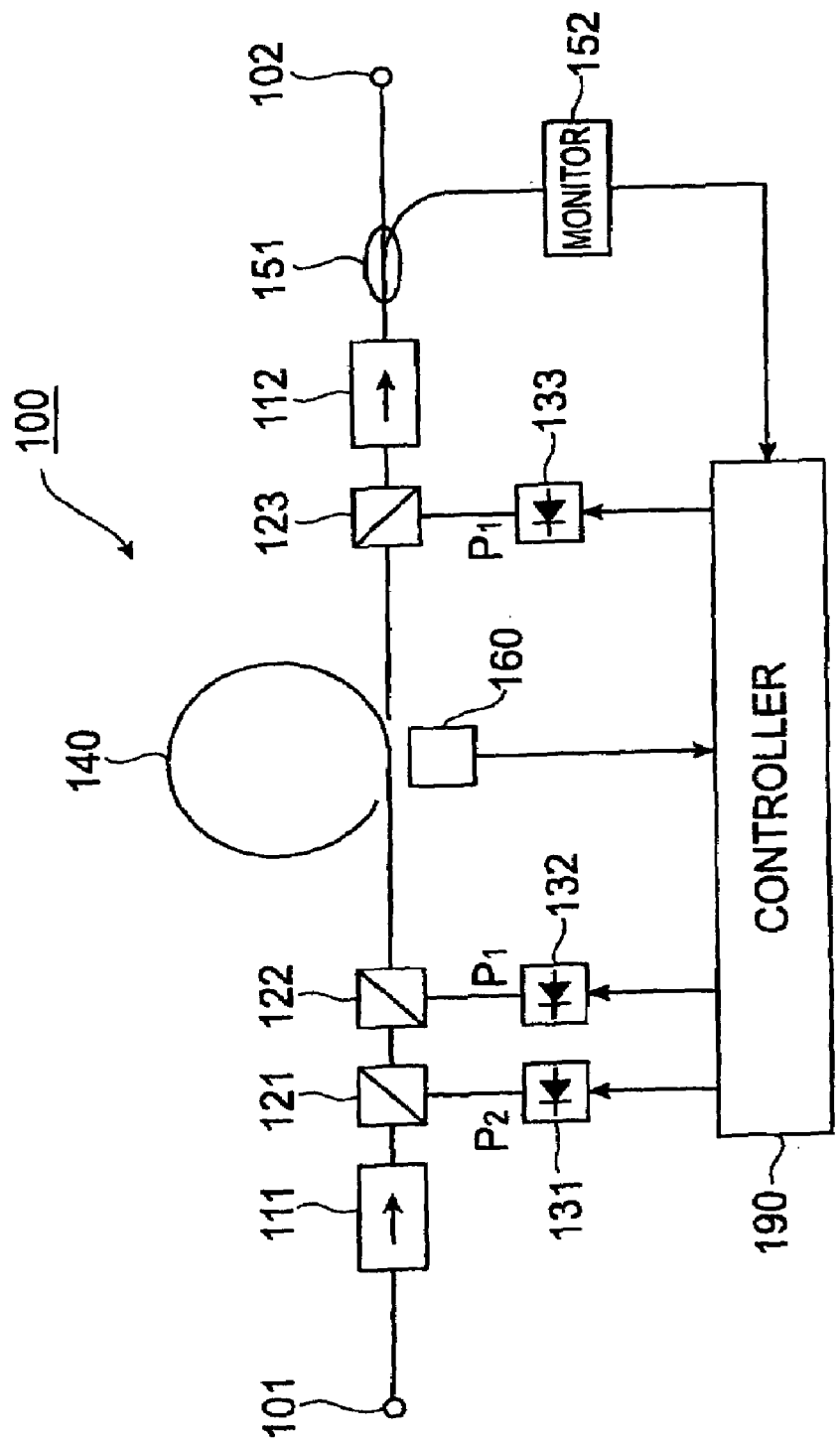
FIG. 5 is a diagram showing the configuration of a first embodiment of the optical amplifier according to the present invention.

To begin with, a first embodiment of the optical amplifier according to the present invention will be explained. FIG. 5 is a diagram showing the optical amplifier 100 according to the first embodiment. The optical amplifier shown in this drawing comprises, successively from an input port 101 to an output port 102, an optical isolator 111, an optical coupler 121, an optical coupler 122, an optical amplification fiber 140, an optical coupler 123, an optical isolator 112, and an optical add/drop coupler 151. Also, the optical amplifier 100 comprises a pumping light source 131 connected to the optical coupler 121, a pumping light source 132 connected to the optical coupler 122, a pumping light source 133 connected to the optical coupler 123, an output light monitor system 152 connected to the optical add/drop coupler 151, a lateral spontaneous emission monitor system 160, and a controller 190.

The optical amplification fiber 140 is an optical waveguide using fluoride glass or tellurite glass as its host glass, and is a TDF in which at least a core region is doped with Tm element. The optical amplification fiber 140 amplifies signal light having a wavelength within a predetermined wavelength band (1455 to 1485 nm) when pumping light is supplied thereto.

The optical couplers 121 to 123 and pumping light sources 131 to 133 act as pumping light supply means for supplying the optical amplification fiber 140 with pumping light. The pumping light source 131 outputs pumping light $P_2$ in the wavelength band of 1.55 to 1.65 µm. As the pumping light source 131, a semiconductor laser light source or the like is used suitably. On the other hand, each of the pumping light sources 132, 133 outputs pumping light $P_1$ in the wavelength band of 1.05 µm or 1.4 µm. As the pumping light sources 132, 133, semiconductor laser pumping Nd:YLF laser light sources, Nd:YAG laser light sources, Yb laser light sources, and the like are used favorably.

The optical coupler 121 outputs toward the optical coupler 122 not only the pumping light $P_2$ outputted from the pumping light source 131 but also the signal light inputted from the optical isolator 111. The optical coupler 122 forwardly supplies the optical amplification fiber 140 with the pumping light $P_1$ outputted from the pumping light source 132, and outputs toward the amplification optical fiber 140 the signal light and pumping light $P_2$ inputted from the optical coupler 121. The optical coupler 123 backwardly supplies the optical amplification fiber 140 with the pumping light $P_1$ outputted from the pumping light source 133, and outputs toward the optical isolator 112 the signal light inputted from the optical amplification fiber 140.

Each of the optical isolators 111, 112 transmits light therethrough only in the forward direction (from the input port 101 to the output port 102) but not in the backward direction.

The optical add/drop coupler 151 is disposed on the optical path between the optical isolator 112 and the output port 102, causes a part of the power of light transmitted through the optical coupler 123 and optical isolator 112 to branch out, and outputs thus branched light toward the output light monitor system 152. The output light monitor system 152 inputs the light having arrived from the optical add/drop coupler 151 and monitors the power of light at two or more wavelengths. As a consequence, the output light monitor system 152 can monitor the gain flatness of the optical amplifier 100 and the power of signal light outputted from the optical amplifier 100.

The light monitored by the output light monitor system 152 may be the signal light amplified by the optical amplification fiber 140, the spontaneously emitted light generated and amplified by the optical amplification fiber 140, or pilot light amplified by the optical amplification fiber 140. The pilot light is one fed into the optical amplifier 100 in order to monitor the gain of optical amplifier 100, and has a wavelength different from the signal light wavelength. Preferably, the pilot light is set so as to have respective wavelengths on the longer and shorter wavelength sides within the signal wavelength band. When this pilot light is used, the gain of optical amplifier 100 can be monitored even if the number of channels of input signal light fluctuates.

The lateral spontaneous emission monitor system 160 monitors the power of spontaneously emitted light laterally released from the optical amplification fiber 140 at two or more wavelengths. As a consequence, the lateral spontaneous emission monitor system 160 can monitor the gain flatness of optical amplifier 100 and the power of signal light outputted from the optical amplifier 100. In this case, without taking light out of the signal main line connected to the optical amplification fiber 140, the spontaneously emitted light laterally released from the optical amplification fiber 140 is monitored, which is favorable in that there is no increase of insertion loss. The output light monitor system 152 and the lateral spontaneous emission monitor system 160 may have configurations identical to each other, which will be explained later with reference to FIGS. 6 and 7.

The controller 190 receives the result of monitoring obtained by the output light monitor system 152 or lateral spontaneous emission monitor system 160. Then, according to the result of monitoring, the controller 190 regulates the power of pumping light outputted from each of the pumping light sources 131 to 133.

The optical amplifier 100 operates under the control of the controller 190 having received the monitoring result obtained by the output light monitor system 152 or lateral spontaneous emission monitor system 160. The pumping light $P_2$ outputted from the pumping light source 131 is forwardly supplied to the optical amplification fiber 140 by way of the optical couplers 121 and 122. The pumping light $P_1$ outputted from the pumping light source 132 is forwardly supplied to the optical amplification fiber 140 by way of the optical coupler 122. On the other hand, the pumping light $P_1$ outputted from the pumping light source 133 is backwardly supplied to the optical amplification fiber 140 by way of the optical coupler 123. The signal light inputted from the input port 101 enters the optical amplification fiber 140 by way of the optical isolator 111, optical coupler 121, and optical coupler 122, and is amplified by the optical amplification fiber 140. The signal light amplified by the optical amplification fiber 140 travels the optical coupler 123, optical isolator 112, and optical add/drop coupler 151, so as to be outputted from the output port 102. A part of the light outputted from the optical amplification fiber 140 is caused to branch out by the optical add/drop coupler 151, and the power of thus branched light is monitored by the output light monitor system 152 at two or more wavelengths. According to the result of monitoring, the controller 190 adjusts the power of pumping light outputted from each of the pumping light sources 131 to 133.

Figure 6:
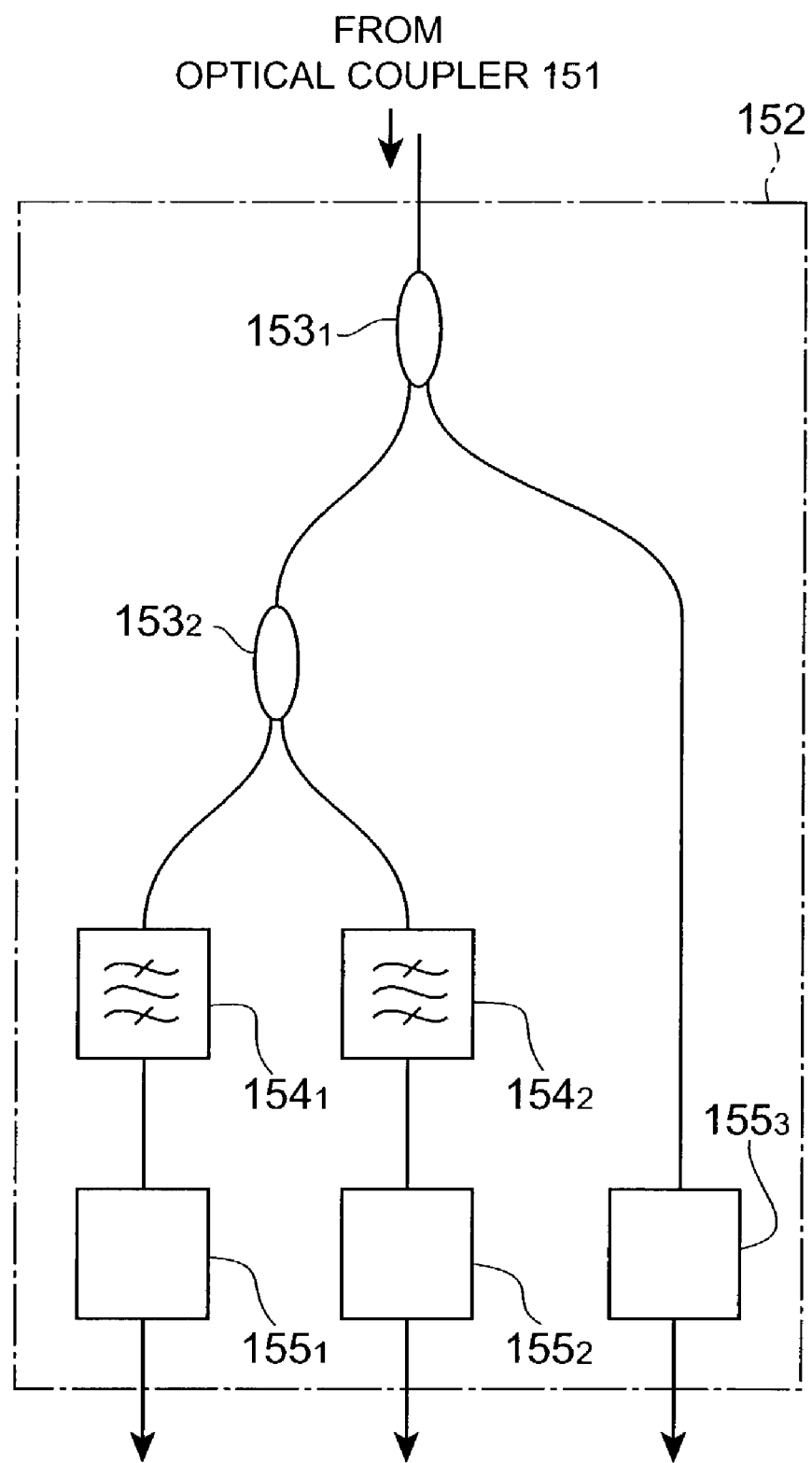
FIG. 6 is a diagram showing a configurational example of an output light monitor system 152 in the optical amplifier 100 shown in FIG. 5.

FIG. 6 is a diagram showing a configurational example of the output light monitor system 152 in the optical amplifier 100 according to the first embodiment. The output light monitor system 152 shown in this drawing has optical add/drop couplers $153_1$, $153_2$, optical filters $154_1$, $154_2$, and light-receiving devices $155_1$ to $155_3$. The optical add/drop coupler $153_1$ splits the light having arrived from the optical add/drop coupler 151 into two, and outputs one of thus split parts of light toward the optical add/drop coupler $153_2$ and the other toward the light-receiving device $155_3$. The optical add/drop coupler $153_2$ splits the light having arrived from the optical add/drop coupler $153_1$ into two, and outputs one of thus split parts of light toward the optical filter $154_1$ and the other toward the optical filter $154_2$.

The optical filter $154_1$ inputs the light having arrived from the optical add/drop coupler $153_2$, and selectively transmits therethrough a specific wavelength of light on the shorter wavelength side in the wavelength band (amplification wavelength band) of signal light amplified by the optical amplification fiber 140. The optical filter $154_2$ inputs the light having arrived from the optical add/drop coupler $153_2$, and selectively transmits therethrough a specific wavelength of light on the longer wavelength side in the signal wavelength band.

The light-receiving device $155_1$ receives the light transmitted through the optical filter $154_1$, and outputs toward the controller 190 an electric signal corresponding to the power of thus received light. The light-receiving device $155_2$ receives the light transmitted through the optical filter $154_2$, and outputs toward the controller 190 an electric signal corresponding to the power of thus received light. The light-receiving device $155_3$ receives the light having arrived from the optical filter $153_1$, and outputs toward the controller 190 an electric signal corresponding to the power of thus received light.

Therefore, the output light monitor system 152 shown in FIG. 6 can monitor the power of light having arrived from the optical add/drop coupler 151 at two wavelengths by using the light-receiving devices $155_1$ and $155_2$, whereby the gain slope can be monitored. Also, by using the light-receiving device $155_3$, the output light monitor system 152 can monitor the total power of light having arrived from the optical add/drop coupler 151. The output light monitor system 152 is favorable in that it has a simple configuration at a low cost.

Figure 7:
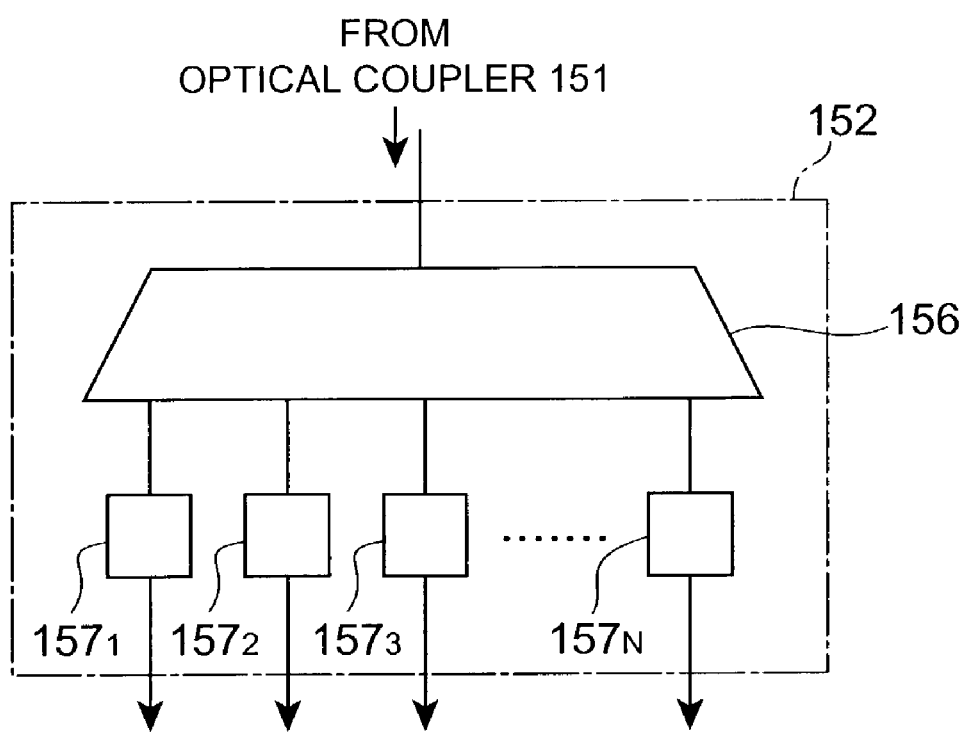
FIG. 7 is a diagram showing another configurational example of the output light monitor system 152 in the optical amplifier 100 shown in FIG. 5.

FIG. 7 is a diagram showing another configurational example of the output light monitor system 152 in the optical amplifier 100 according to the first embodiment. The output light monitor system 152 shown in this drawing has an arrayed waveguide grating (AWG) 156 and light-receiving devices $157_1$ to $157_N$, where N is an integer of 2 or greater.

The AWG 156 is a diffraction grating in which a plurality of optical waveguides are formed into an array on a flat substrate, and can multiplex or demultiplex inputted light and output the resulting light. Here, the AWG 156 is used as an optical demultiplexer. Namely, the AWG 156 demultiplexes the light having arrived from the optical add/drop coupler 151, and outputs thus demultiplexed individual wavelengths of light toward the light-receiving devices $157_1$ to $157_N$. The light-receiving devices $157_1$ to $157_N$ receive the respective wavelengths of light having arrived after being outputted from the AWG 156, and output toward the controller 190 electric signals corresponding to the power of thus received light.

Therefore, by using the light-receiving devices $157_1$ to $157_N$, the output light monitor system 152 shown in FIG. 7 can monitor the power of light having arrived from the optical add/drop coupler 151 at N wavelengths, whereby the gain slope can be monitored. Also, according to the respective results of monitoring obtained by the light-receiving devices $157_1$ to $157_N$, the output light monitor system 152 can monitor the total power of light having arrived from the optical add/drop coupler 151. The output light monitor system 152 is favorable in that it enables highly accurate monitoring at a number of wavelengths and can respond to increases/decreases in the number of channels of input signal light.

Control operations of the controller 190 in the optical amplifier 100 according to the first embodiment will now be explained. The control effected by the controller 190 is feedback control carried out according to the result of monitoring (gain slope or output signal light power) obtained by the output light monitor system 152 or the lateral spontaneous emission monitor system 160, and adjusts the power of pumping light outputted from any of the pumping light sources 131 to 133. It includes three control operations which will be explained in the following. Though the first embodiment explains auxiliary pumping light control utilizing auxiliary pumping light as a first control operation, and FW/BW control regulating at least one of the forward and backward pumping light powers as second and third control operations, the controlling method of the optical amplifier according to the present invention is not restricted to the above-mentioned first to third control operations, and VOA control and VASC control which will be explained later may also be carried out. These control operations are not required to be carried out separately, but a plurality of control operations may be performed in combination.

In the first control operation (auxiliary pumping light control), the controller 190 determines whether the gain slope obtained by monitoring is positive or negative. Then, it lowers the power of pumping light $P_2$ (in the wavelength band of 1.55 to 1.65 μm) supplied from the pumping light source 131 to the optical amplification fiber 140 if the gain slope is positive, and increases the power of pumping light $P_2$ if the gain slope is negative. Also, the controller 190 compares the monitored output signal light power with a design value in terms of magnitude. Then, it increases the power of pumping light $P_1$ (in the wavelength band of 1.05 μm or 1.4 μm) supplied from the pumping light source 132 or 133 to the optical amplification fiber 140 if the output signal light power is lower than the design value, and lowers the power of pumping light $P_1$ if the output signal light power is higher than the design value. Preferably, the controller 190 alternately controls the power of pumping light $P_1$ and the power of pumping light $P_2$.

Figure 8:
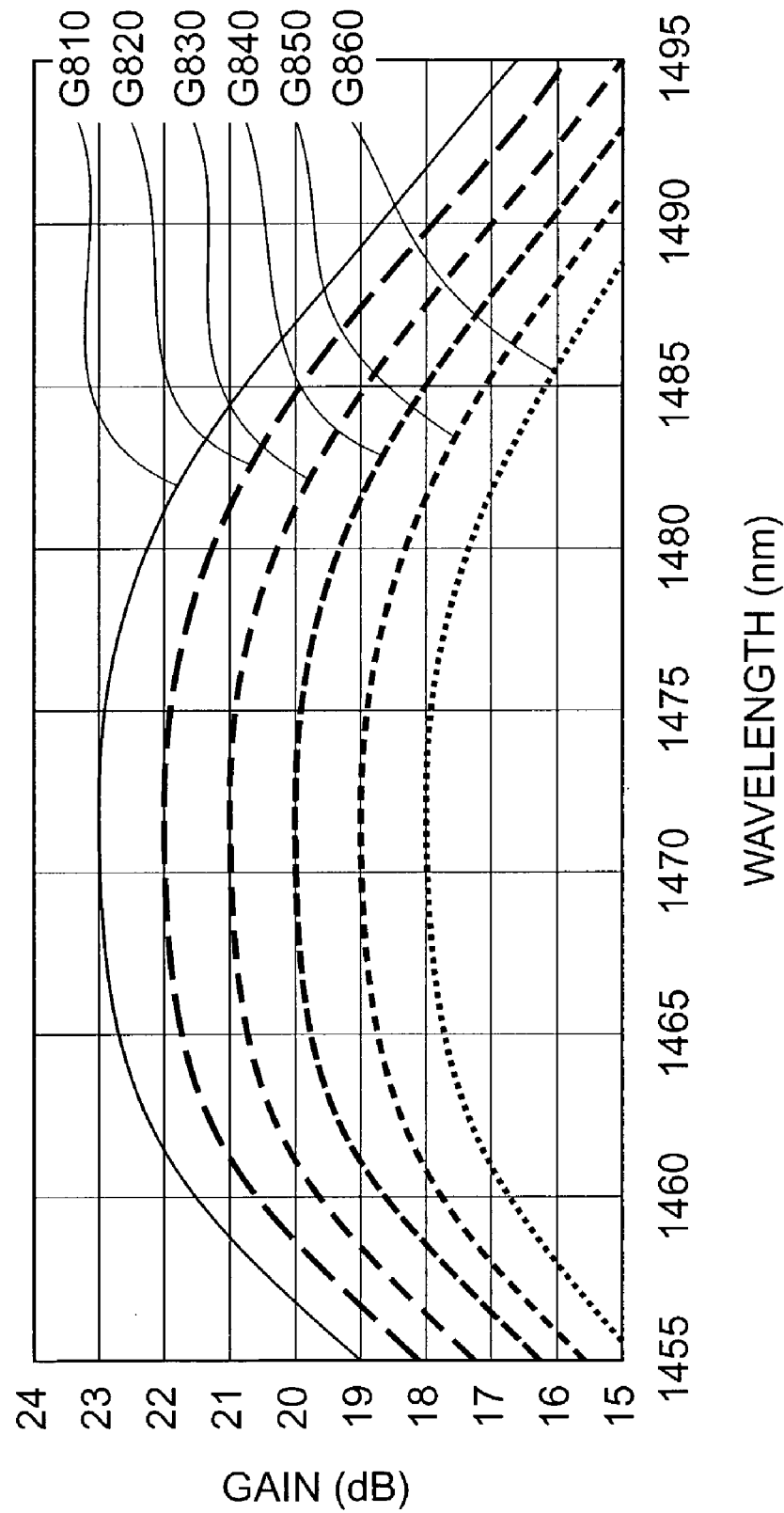
FIG. 8 shows gain spectra obtained when ALC is carried out by a first control operation (auxiliary pumping light control) in the optical amplifier 100 shown in FIG. 5.
Figure 9:
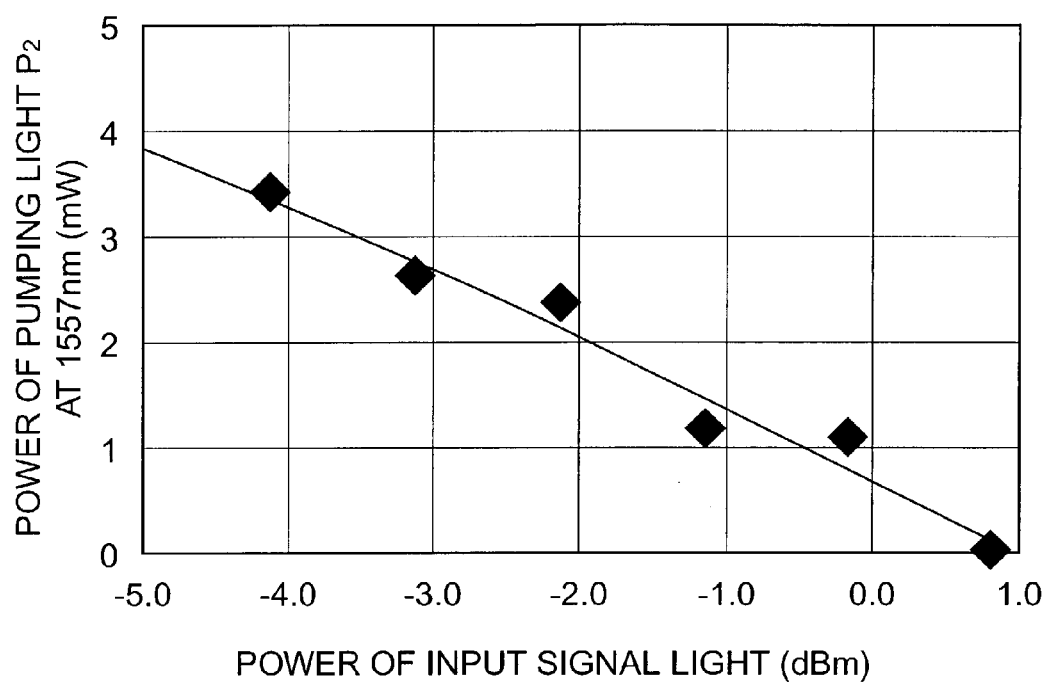
FIG. 9 is a graph showing the relationship between the power of pumping light $P_2$ and input signal light power when ALC is carried out by the first control operation (auxiliary pumping light control) in the optical amplifier 100 shown in FIG. 5.

FIG. 8 shows gain spectra obtained when ALC is carried out by the first control operation in the optical amplifier 100 according to the first embodiment, whereas FIG. 9 is a graph showing the relationship between the power of pumping light $P_2$ and the input signal light power at this time. Here, the power of each pumping light is controlled such that the total signal light power $P_{out}$ outputted becomes +18 dBm in the cases where the total power $P_{in}$ of signal light fed into the optical amplifier 100 is −4.2 dBm (curve G810), −3.2 dBm (curve G820), −2.2 dBm (curve G830), −1.2 dBm (curve G840), −0.2 dBm (curve G850), and +0.8 dBm (curve G860), respectively. The wavelength of pumping light $P_2$ supplied from the pumping light source 131 to the optical amplification fiber 140 is 1557 nm. The wavelength of pumping light P1 supplied from the pumping light source 132 or 133 to the optical amplification fiber 140 is 1.05 μm. As shown in FIG. 8, even when the input signal light power changes, the gain flatness is maintained, and the output signal light power is held constant. Also, as shown in FIG. 9, the power of pumping light $P_2$ at the time of ALC can be approximated well by a linear or quadratic function.

Figure 10:
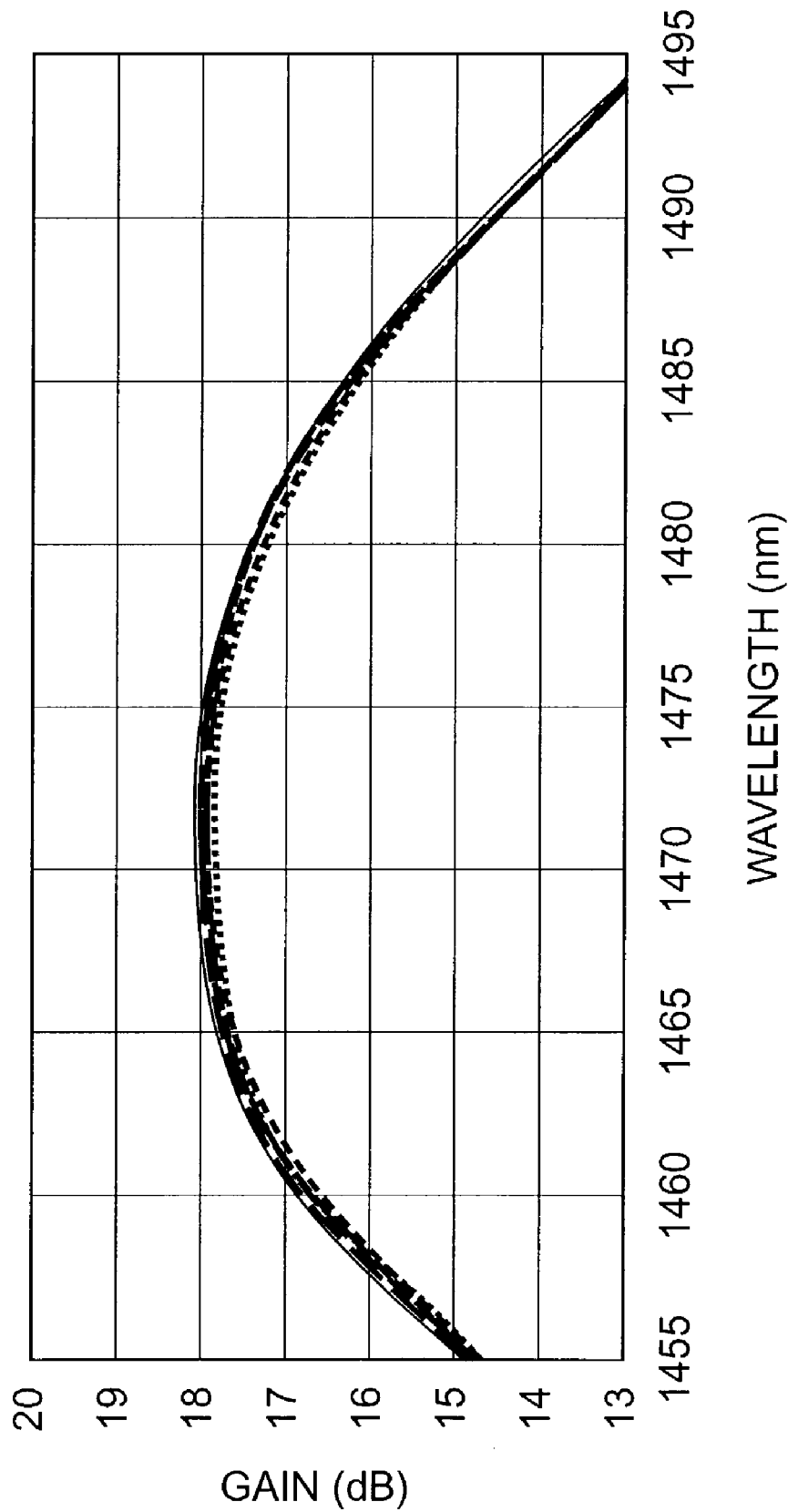
FIG. 10 shows gain spectra obtained when AGC is carried out by the first control operation (auxiliary pumping light control) in the optical amplifier 100 shown in FIG. 5.
Figure 11:
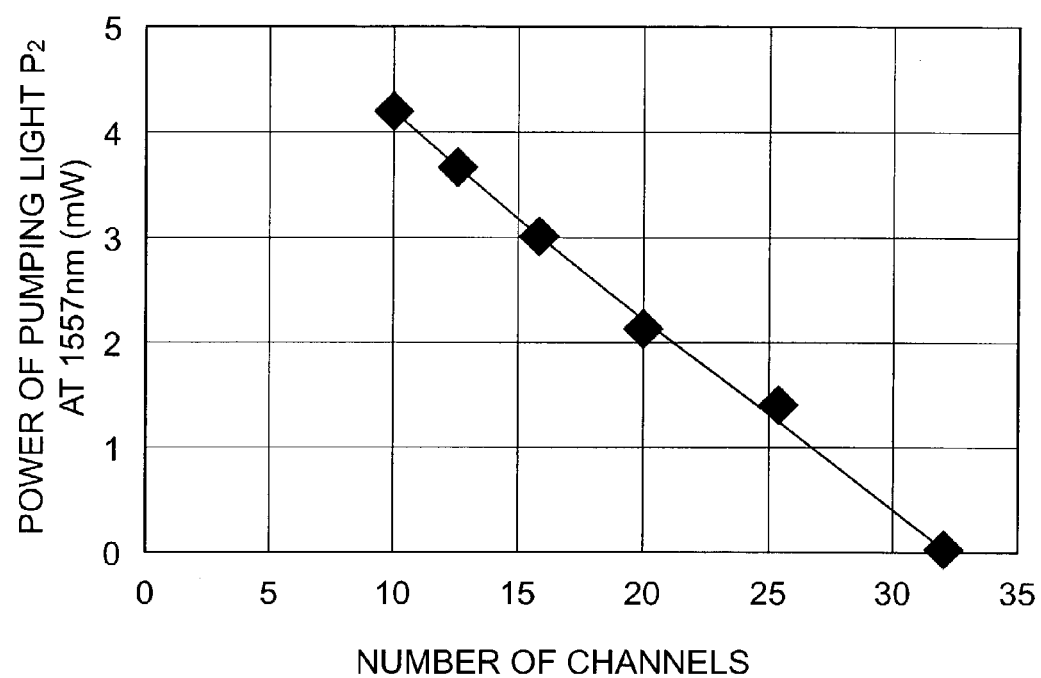
FIG. 11 is a graph showing the relationship between the power of pumping light $P_2$ and the number of channels of input signal light when AGC is carried out by the first control operation (auxiliary pumping light control) in the optical amplifier 100 shown in FIG. 5.

FIG. 10 shows gain spectra obtained when AGC is carried out by the first control operation in the optical amplifier 100 according to the first embodiment, whereas FIG. 11 is a graph showing the relationship between the power of pumping light $P_2$ and the number of channels of input signal light at this time. Here, for each of respective cases where the number of channels of signal light fed into the optical amplifier 100 is 10, 12, 16, 20, 26, and 32, the power of each pumping light is regulated so as to yield a gain peak of 18 dB. The wavelength of pumping light $P_2$ supplied from the pumping light source 131 to the optical amplification fiber 140 is 1557 nm. The wavelength of pumping light P1 supplied from the pumping light source 132 or 133 to the optical amplification fiber 140 is 1.05 μm. As shown in FIG. 10, even when the number of channels of signal light inputted changes, the gain flatness is maintained, and the output signal light power is held constant. Also, as shown in FIG. 11, the power of pumping light $P_2$ at the time of AGC can be approximated well by a linear or quadratic function.

In the second control operation (FW/BW control), the controller 190 determines whether the gain slope obtained by monitoring is positive or negative. Then, it lowers the power of pumping light (forward pumping light) forwardly supplied from the pumping light source 132 to the optical amplification fiber 140 if the gain slope is positive, but increases the power of forward pumping light if the gain slope is negative. Also, the controller 190 compares the monitored output signal light power with a design value in terms of magnitude. Then, it increases the power of pumping light (backward pumping light) backwardly supplied from the pumping light source 133 to the optical amplification fiber 140 if the output signal light power is lower than the design value, but decreases the backward pumping light if the output signal light power is higher than the design value. Preferably, the controller 190 alternately controls the power of forward pumping light and the power of backward pumping light. In the second control operation, the pumping light source 131 and the optical coupler 121 are unnecessary, whereby the optical amplifier 100 becomes smaller in size and less expensive.

The second control operation is based on the fact that the power of pumping light supplied to the optical amplification fiber 140 and the gain are substantially proportional to each other, while the gain peak and the degree of saturation of population inversion are substantially proportional to each other, whereby the gain peak is correlated with the value of ratio between respective powers of signal light and pumping light.

The degree of saturation of population inversion is determined in the vicinity of the output end of the optical amplification fiber 140 where the signal light power approaches the pumping light power. As a consequence, in the case of AGC in which the output signal light power decreases as the input signal light power lowers, the backward pumping light power is required to decrease in response thereto. On the other hand, it is necessary for AGC to carry out control such that the gain becomes constant, whereby the forward pumping light power is required to be made greater, so as to reduce the fluctuation of total pumping light power.

In the case of ALC, the change in backward pumping light power cannot be made greater since it is necessary for the output signal light power to be held constant. On the other hand, the gain is required to increase as the input signal light power decreases. Therefore, in order to increase the total power of pumping light, it is necessary for the forward pumping light power to become higher.

Namely, in each of ALC and AGC, the forward pumping light power is required to increase when the input signal light power decreases. The second control scheme is based on such an idea.

Figure 12:
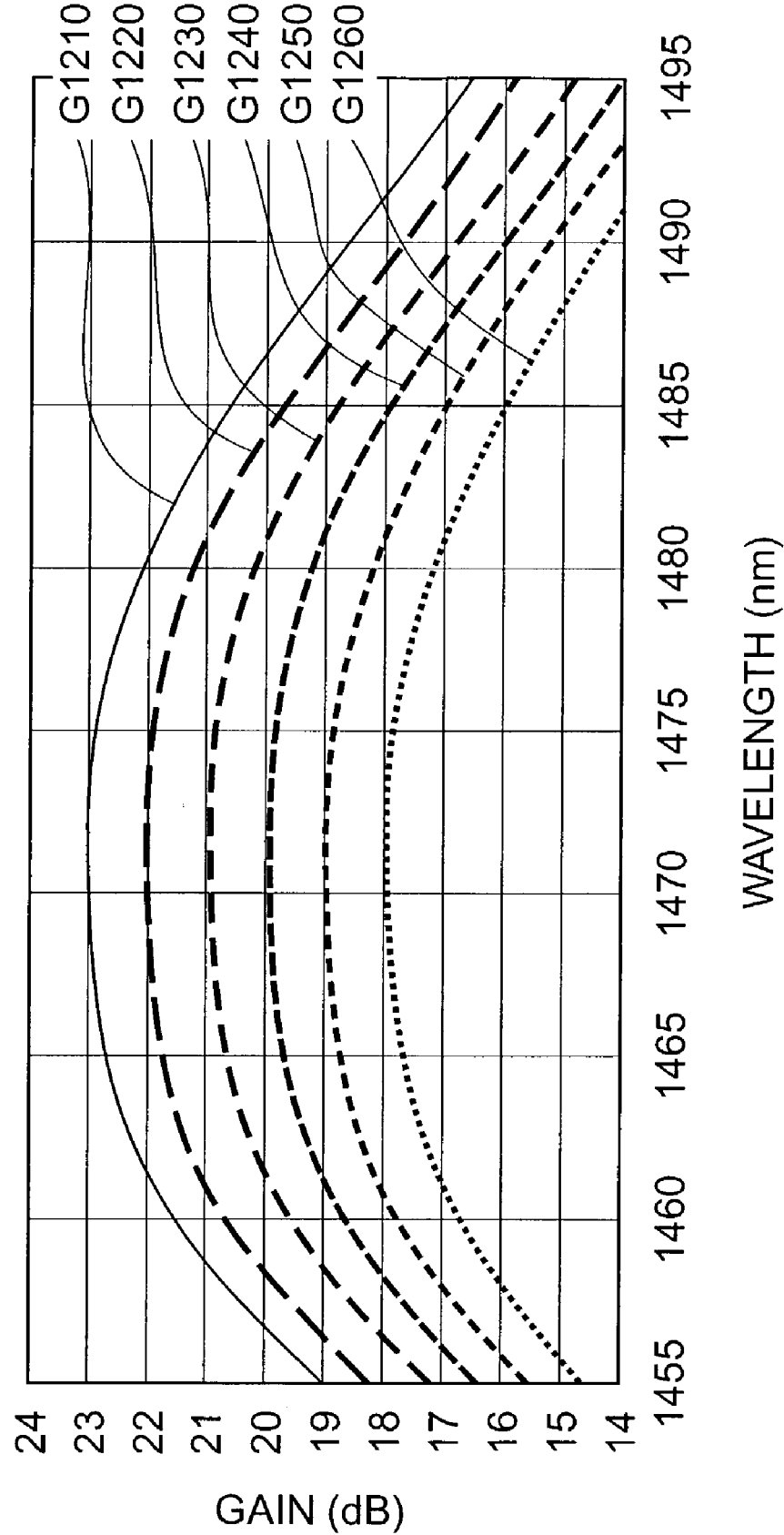
FIG. 12 shows gain spectra obtained when ALC is carried out by a second control operation (FW/BW control) in the optical amplifier 100 shown in FIG. 5.
Figure 13:
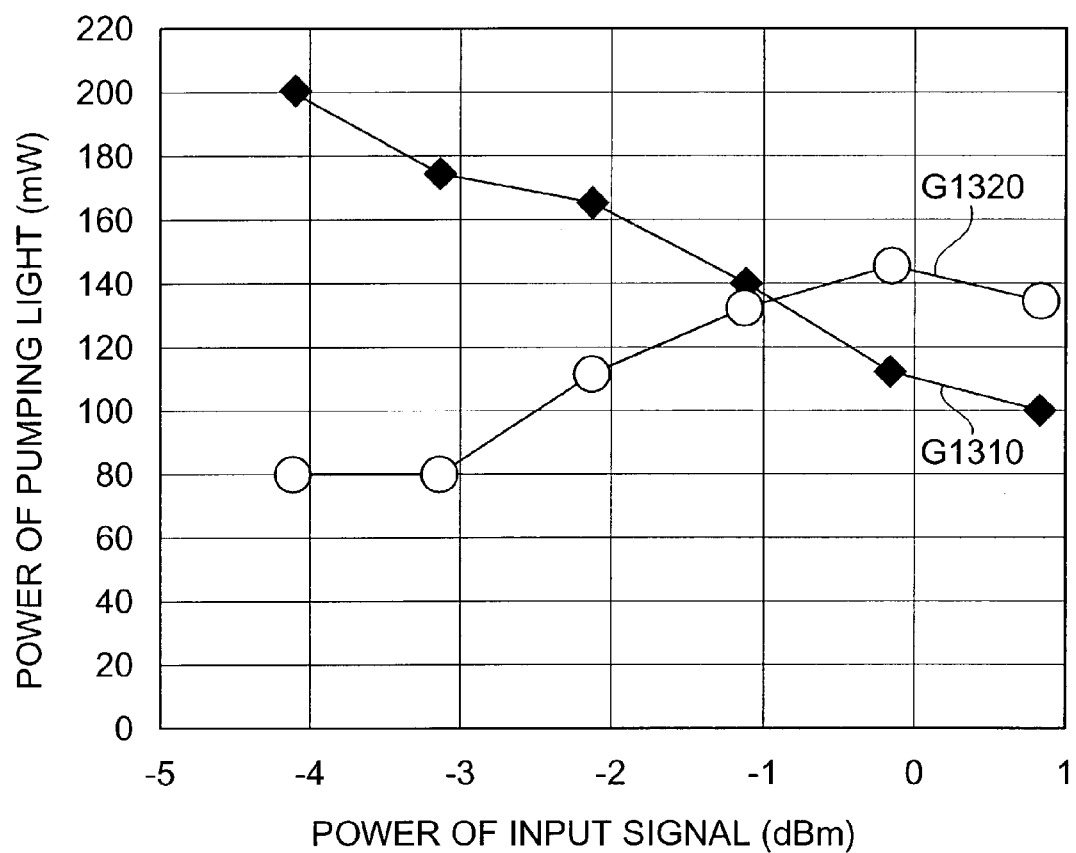
FIG. 13 is a graph showing relationships between the input signal light power and the forward pumping light power and backward pumping light power obtained when ALC is carried out by the second control operation (FW/BW control) in the optical amplifier 100 shown in FIG. 5.
Figure 14:
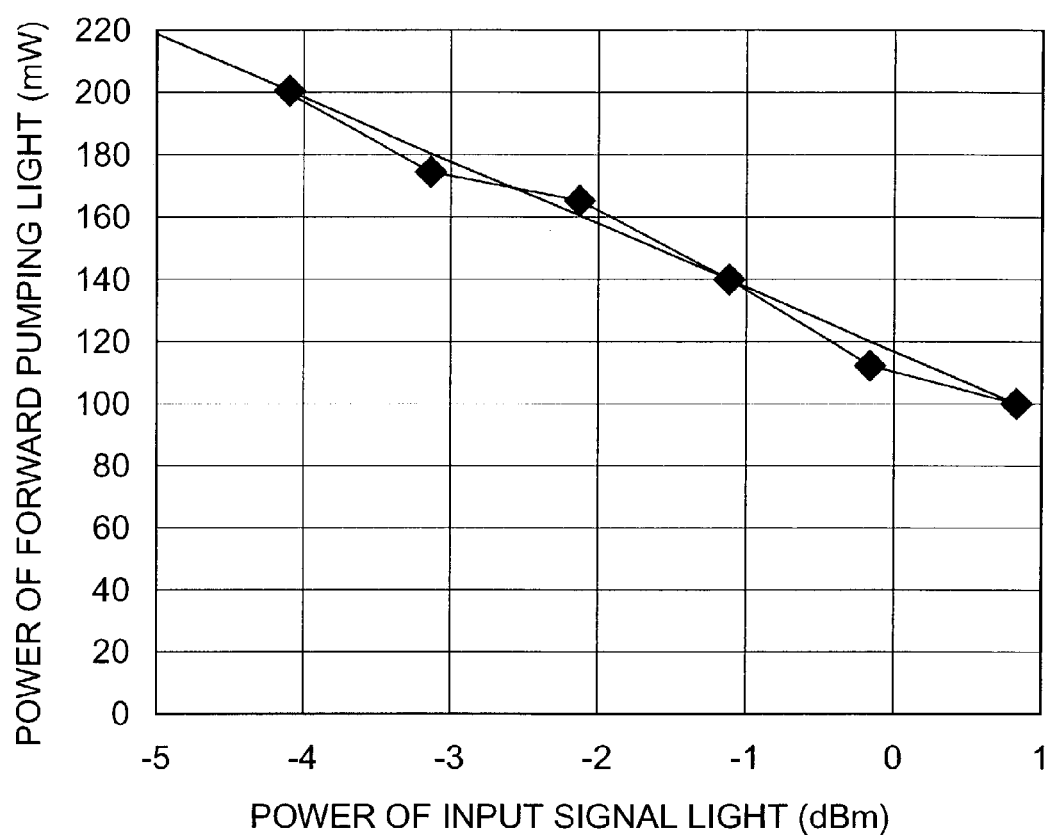
FIG. 14 is a graph showing the relationship between the forward pumping light power and input signal light power when ALC is carried out by the second control operation (FW/BW control) in the optical amplifier 100 shown in FIG. 5.

FIG. 12 shows gain spectra obtained when ALC is carried out by the second control operation in the optical amplifier 100 according to the first embodiment, FIG. 13 is a graph showing respective relationships between the input signal light power and the forward pumping light power (curve G1310) and backward pumping light power (curve G1320) at this time, and FIG. 14 is a graph showing the relationship between the forward pumping light power and input signal light power at this time. FIG. 14 also shows an approximate curve represented by a linear expression. Here, the power of each pumping light is regulated such that the total power $P_{out}$ of signal light outputted becomes +18 dBm in respective cases where the total power $P_{in}$ of signal light fed into the optical amplifier 100 is −4.2 dBm (curve G1210 in FIG. 12), −3.2 dBm (curve G1220 in FIG. 12), −2.2 dBm (curve G1230 in FIG. 12), −1.2 dBm (curve G1240 in FIG. 12), −0.2 dBm (curve G1250 in FIG. 12), and +0.8 dBm (curve G1260 in FIG. 12). As shown in FIG. 12, even when the input signal light power changes, the gain flatness is maintained, and the output signal light power is held constant. Also, as shown in FIG. 14, the forward pumping light power at the time of ALC is approximated well by a linear function of the input signal light power.

Figure 15:
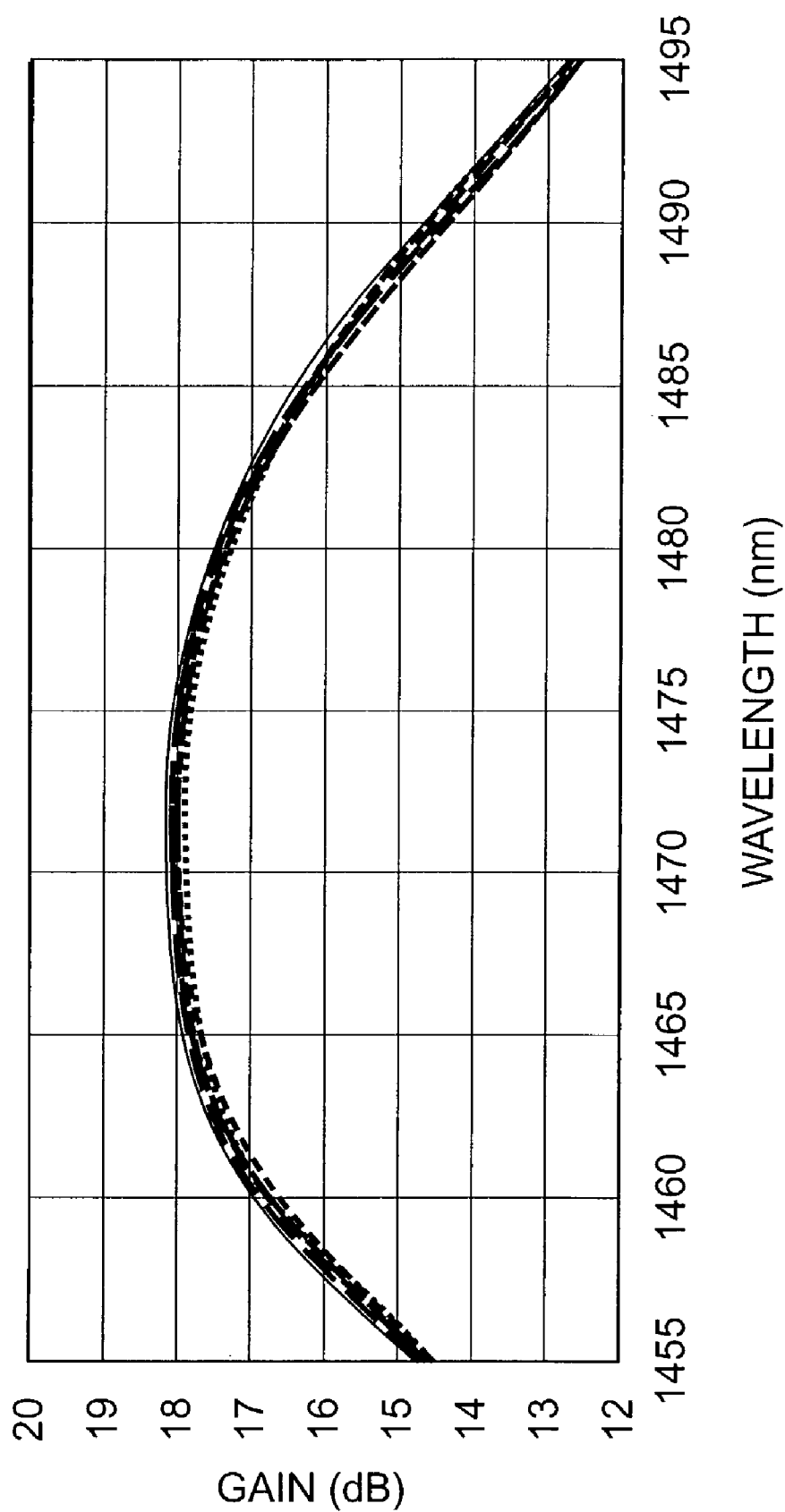
FIG. 15 shows gain spectra obtained when AGC is carried out by the second control operation (FW/BW control) in the optical amplifier 100 shown in FIG. 5.
Figure 16:
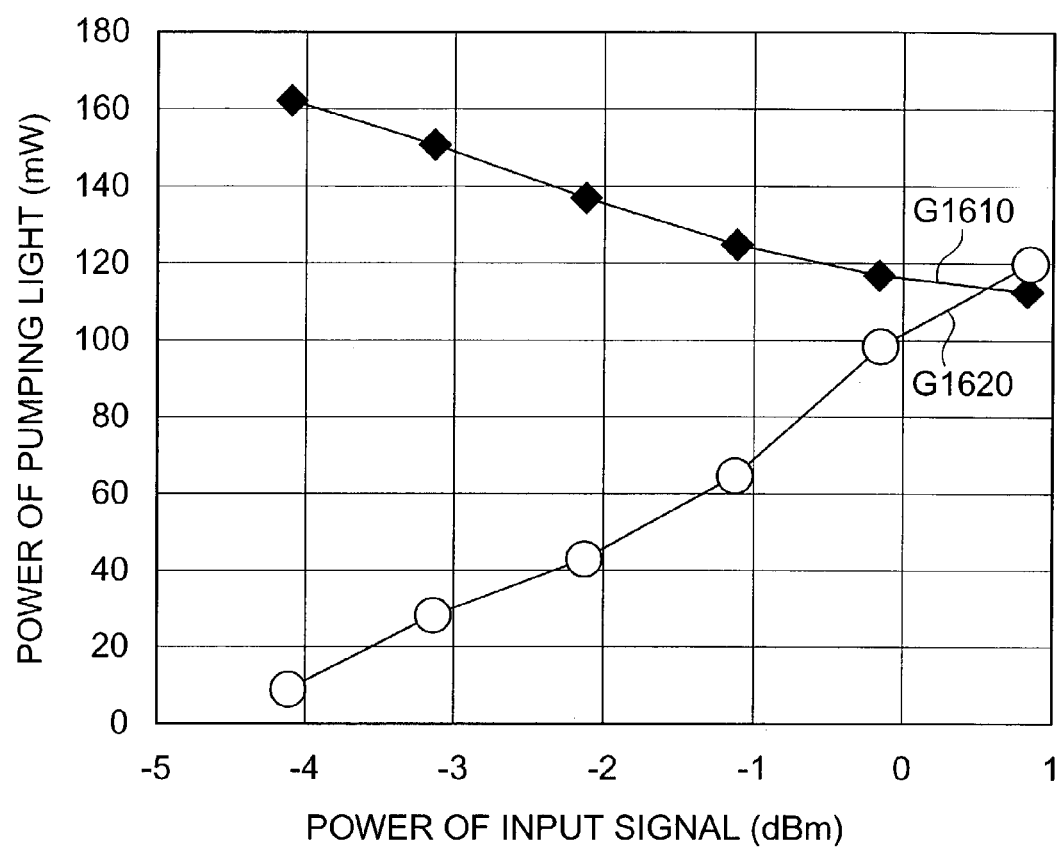
FIG. 16 is a graph showing relationships between the input signal light power and the forward pumping light power and backward pumping light power obtained when AGC is carried out by the second control operation (FW/BW control) in the optical amplifier 100 shown in FIG. 5.
Figure 17:
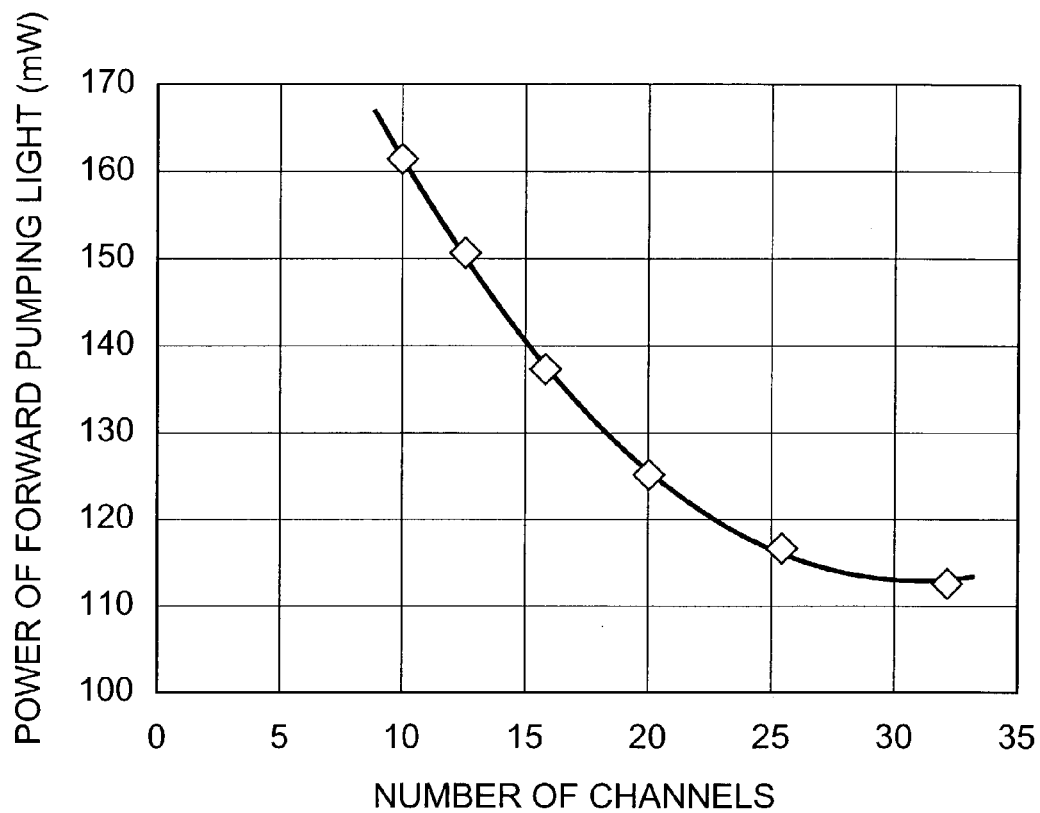
FIG. 17 is a graph showing the relationship between the number of channels of input signal light and input signal light power obtained when AGC is carried out by the second control operation (FW/BW control) in the optical amplifier 100 shown in FIG. 5.

FIG. 15 shows gain spectra obtained when AGC is carried out by the second control operation in the optical amplifier 100 according to the first embodiment, FIG. 16 is a graph showing respective relationships between the input signal light power and the forward pumping light power (curve G1610) and backward pumping light power (curve G1620) at this time, and FIG. 17 is a graph showing the relationship between the number of channels of input signal light and input signal light power at this time. FIG. 17 also shows an approximate curve represented by a quadratic function. Here, the power of each pumping light is regulated so as to yield a gain peak of 18 dB in respective cases where the number of channels of signal light fed into the optical amplifier 100 is 10, 12, 16, 20, 26, and 32. As shown in FIG. 15, even when the number of channels of signal light inputted changes, the gain flatness is maintained, and the output signal light power is held constant. Also, as shown in FIG. 17, the forward pumping light power at the time of AGC is approximated well by a quadratic function of the number of channels of input signal light.

In the third control operation (FW/BW control), the controller 190 determines whether the gain slope obtained by monitoring is positive or negative. Then, it decreases the ratio of forward pumping light power/backward pumping light power if the gain slope is positive, but increases this ratio if the gain slope is negative. Also, the controller 190 compares thus monitored output signal light power with a design value in terms of magnitude. Then, it increases the sum of the forward pumping light power and backward pumping light power if the output signal light power is smaller than the design value, but decreases the sum if the output signal light power is greater than the design value. Preferably, the controller 190 alternately controls the ratio and sum. In the third control operation, the pumping light source 131 and optical coupler 121 are unnecessary. Even when the input signal light power changes at the time of ALC, the gain flatness is maintained, and the output signal light power is held constant in the third control operation as well. Also, even when the number of channels of input signal light changes at the time of AGC, the gain flatness is maintained, and the output signal light power is held constant.

Second Embodiment of Optical Amplifier

Figure 18:
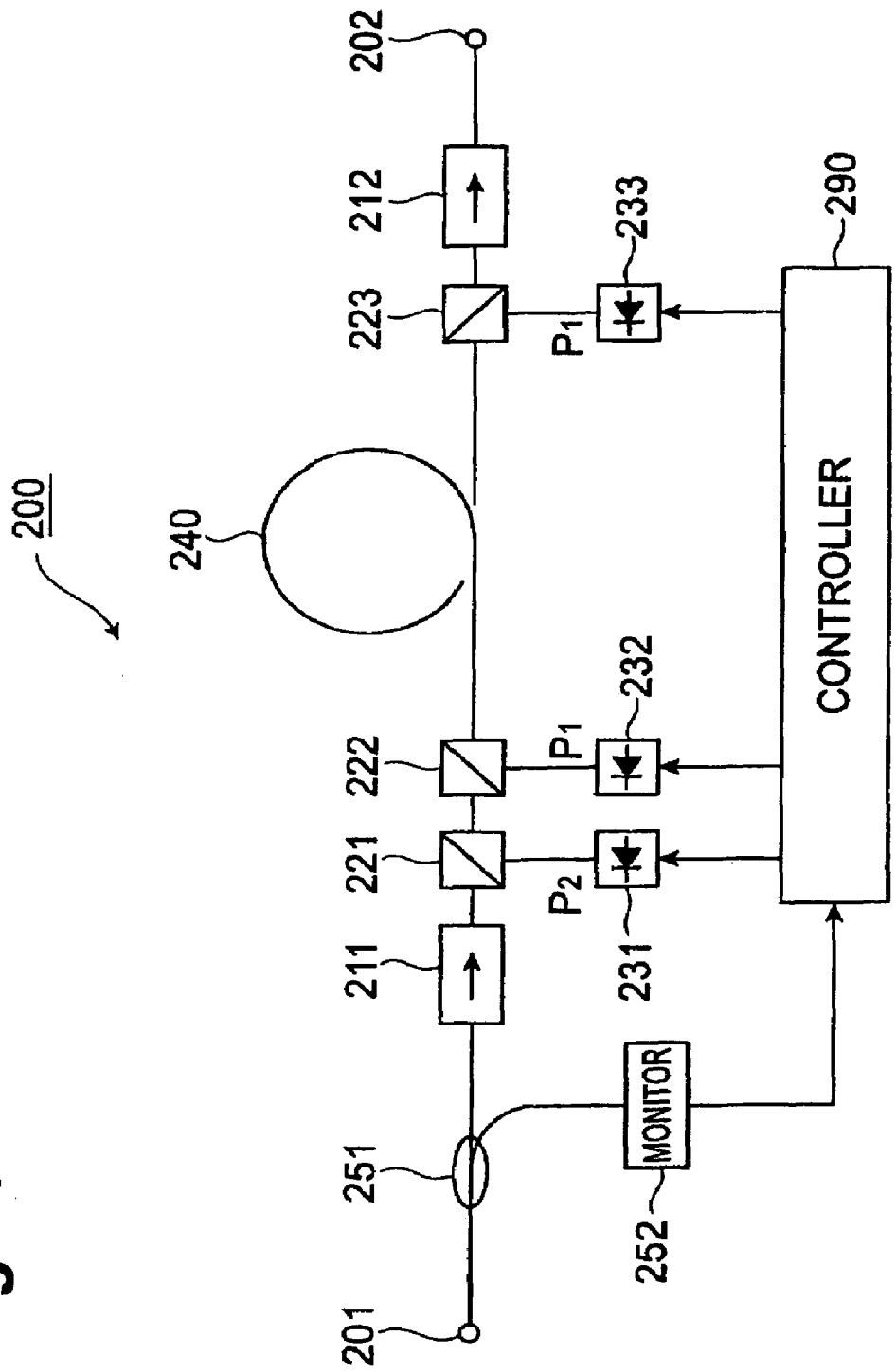
FIG. 18 is a diagram showing the configuration of a second embodiment of the optical amplifier according to the present invention.

A second embodiment of the optical amplifier according to the present invention will now be explained. FIG. 18 is a diagram showing the optical amplifier 200 according to the second embodiment. The optical amplifier 200 shown in this drawing comprises, successively from an input port 201 to an output port 202, an optical add/drop coupler 251, an optical isolator 211, an optical coupler 221, an optical coupler 222, an optical amplification fiber 240, an optical coupler 223, and an optical isolator 212. Also, the optical amplifier 200 comprises a pumping light source 231 connected to the optical coupler 221, a pumping light source 232 connected to the optical coupler 222, a pumping light source 233 connected to the optical coupler 223, an input light monitor system 252 connected to the optical add/drop coupler 251, and a controller 290.

The optical amplification fiber 240 is an optical waveguide using fluoride glass or tellurite glass as its host glass, and is a TDF in which at least a core region is doped with Tm element. The optical amplification fiber 240 amplifies signal light having a wavelength within a predetermined wavelength band (1455 to 1485 nm) when pumping light is supplied thereto.

The optical couplers 221 to 223 and pumping light sources 231 to 233 act as pumping light supply means for supplying the optical amplification fiber 240 with pumping light. The pumping light source 231 outputs pumping light $P_2$ in the wavelength band of 1.55 to 1.65 µm. As the pumping light source 231, a semiconductor laser light source or the like is used suitably. On the other hand, each of the pumping light sources 232, 233 outputs pumping light $P_1$ in the wavelength band of 1.05 µm or 1.4 µm. As the pumping light sources 232, 233, semiconductor laser pumping Nd:YLF laser light sources, Nd:YAG laser light sources, Yb laser light sources, and the like are used favorably.

The optical coupler 221 outputs toward the optical coupler 222 not only the pumping light $P_2$ outputted from the pumping light source 231 but also the signal light inputted from the optical isolator 211. The optical coupler 222 forwardly supplies the optical amplification fiber 240 with the pumping light $P_1$ outputted from the pumping light source 232, and outputs toward the amplification optical fiber 240 the signal light and pumping light $P_2$ inputted from the optical coupler 221. The optical coupler 223 backwardly supplies the optical amplification fiber 240 with the pumping light $P_1$ outputted from the pumping light source 233, and outputs toward the optical isolator 212 the signal light inputted from the optical amplification fiber 240.

Each of the optical isolators 211, 212 transmits light therethrough only in the forward direction (from the input port 201 to the output port 202) but not in the backward direction.

The optical add/drop coupler 251 is disposed on the optical path between the input port 201 and the optical isolator 211, causes a part of the power of light inputted from the input port 201 to branch out, and outputs thus branched light toward the input light monitor system 252. The input light monitor system 252 inputs the light having arrived from the optical add/drop coupler 251 and monitors the power or number of channels of light fed into the optical amplifier 200. The input light monitor system 252 may have a configuration similar to that shown in FIG. 7. The controller 290 receives the result of monitoring obtained by the input light monitor system 252 and, according to the result of monitoring, regulates respective powers of pumping light outputted from the pumping light sources 231 to 233. The optical add/drop coupler 251 and input light monitor system 252 are not always necessary, whereby the controller 290 may receive the power or number of channels of the input signal light from other means as well. In this case, the optical amplifier 200 becomes smaller in size and less expensive.

The optical amplifier 200 operates under the control of the controller 290. The pumping light $P_2$ outputted from the pumping light source 231 is forwardly supplied to the optical amplification fiber 240 by way of the optical couplers 221 and 222. The pumping light $P_1$ outputted from the pumping light source 232 is forwardly supplied to the optical amplification fiber 240 by way of the optical coupler 222. The pumping light $P_1$ outputted from the pumping light source 233 is backwardly supplied to the optical amplification fiber 240 by way of the optical coupler 223. The signal light fed into the input port 201 enters the optical amplification fiber 240 byway of the optical add/drop coupler 251, optical isolator 211, optical coupler 221, and optical coupler 222, and is amplified by the optical amplification fiber 240. The signal light amplified by the optical amplification fiber 240 travels the optical coupler 223 and optical isolator 212, so as to be outputted from the output port 202. A part of the signal light inputted from the input port 201 is caused to branch out by the optical add/drop coupler 251, whereby the power is monitored by the input light monitor system 252 at two or more wavelengths. According to the result of monitoring, the controller 290 adjusts respective powers of pumping light outputted from the pumping light sources 231 to 233. The controller 290 may adjust the respective powers of pumping light outputted from the pumping light sources 231 to 233 according to the power or number of channels of input signal light received from other means as well.

Control operations of the controller 290 in the optical amplifier 200 according to the second embodiment will now be explained. The control carried out by the controller 290 is feedforward control effected according to the power or number of channels of input signal light, and adjusts the power of pumping light outputted from any of the pumping light sources 231 to 233. The control operation in the optical amplifier 200 according to the second embodiment is substantially the same as the first to third control operations in the optical amplifier 100 according to the first embodiment. However, they differ from each other in that the first embodiment is feedback control, whereas the second embodiment is feed forward control. Not only the first to third control operations, but also VOA and VASC control operations, and a plurality of these control operations in combination are possible in the second embodiment as well.

Namely, in the first control operation (auxiliary pumping light control), the power of pumping light $P_2$ at the time of ALC is approximated well by a linear or quadratic function of the input signal light power as shown in FIG. 9, whereas the power of pumping light $P_2$ at the time of AGC is approximated well by a linear or quadratic function of the number of channels of input signal light as shown in FIG. 11. In the second or third control operation (FW/BW control), the forward pumping light power at the time of ALC is approximated well by a linear function of the input signal power as shown in FIG. 14, whereas the forward pumping light power at the time of AGC is approximated well by a quadratic function of the number of channels of input signal as shown in FIG. 17. Therefore, according to the power or number of channels of input signal light, the controller 290 adjusts the power of pumping light outputted from one of the pumping light sources 231 to 233, thereby executing one of the first to third control operations. As a consequence, even when the input signal light power changes at the time of ALC, the gain flatness is maintained, and the output signal light power is held constant. Also, even when the number of channels of input signal light changes at the time of AGC, the gain flatness is maintained, and the output signal light power is held constant.

In the second embodiment, means for monitoring the power or number of channels of input signal light is not always necessary, whereby the controller 290 may receive the power or number of channels of input signal light from other means as well. This case is favorable in that the optical amplifier 200 becomes smaller in size and less expensive. In the second embodiment, the power of pumping light outputted from any of the pumping light sources 231 to 233 is adjusted according to the power or number of channels of input signal, which requires the controller 290 to perform arithmetic operations therefor. However, these arithmetic operations hardly become a burden on the controller 290, since they are simple.

Third Embodiment of Optical Amplifier

Figure 19:
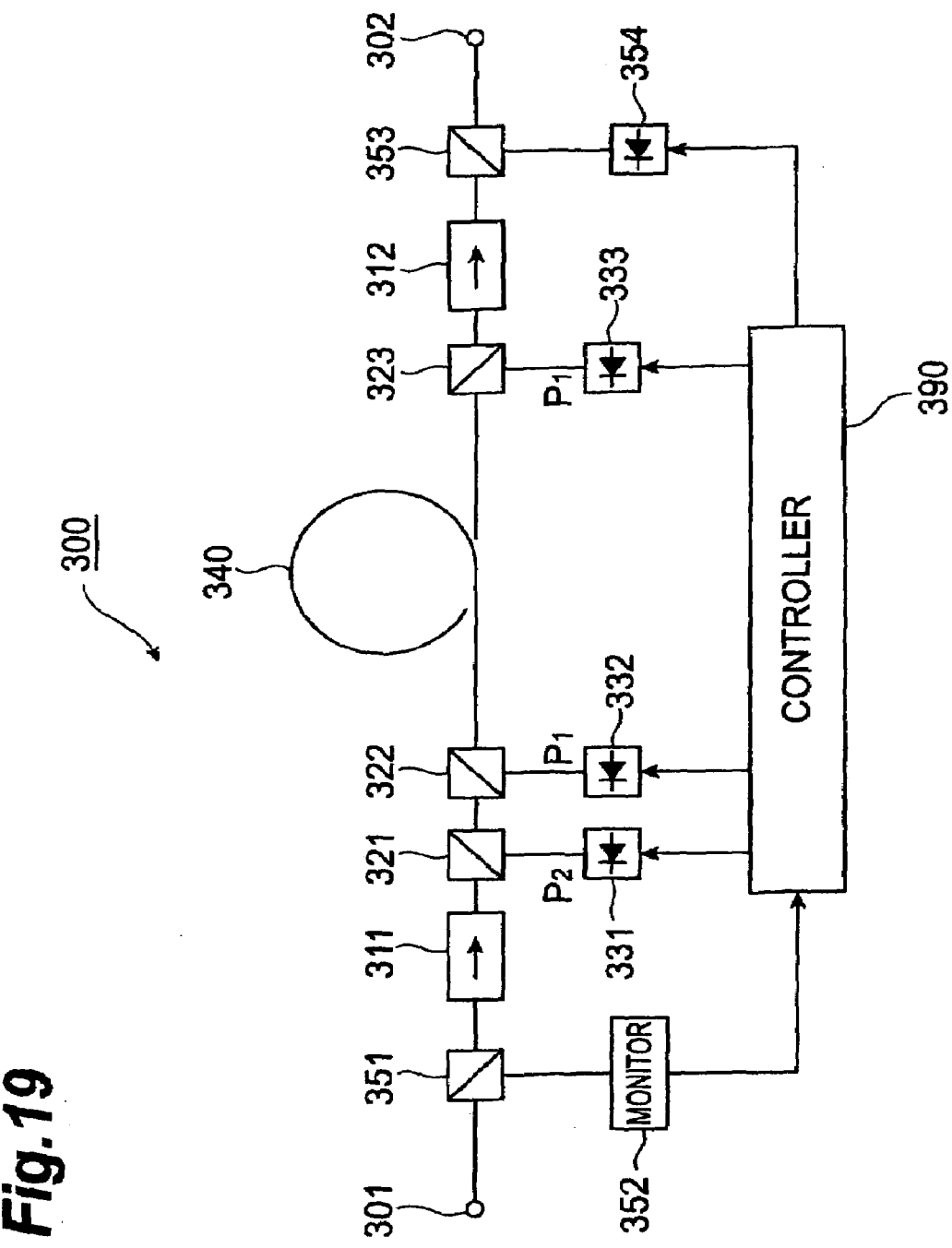
FIG. 19 is a diagram showing the configuration of a third embodiment of the optical amplifier according to the present invention.

A third embodiment of the optical amplifier according to the present invention will now be explained. FIG. 19 is a diagram showing the optical amplifier 300 according to the third embodiment. The optical amplifier 300 shown in this drawing comprises, successively from an input port 301 to an output port 302, an optical coupler 351, an optical isolator 311, an optical coupler 321, an optical coupler 322, an optical amplification fiber 340, an optical coupler 323, an optical isolator 312, and an optical coupler 353. Also, the optical amplifier 300 comprises a pumping light source 331 connected to the optical coupler 321, a pumping light source 332 connected to the optical coupler 322, a pumping light source 333 connected to the optical coupler 323, a monitor light monitor system 352 connected the optical coupler 351, a monitor light source 354 connected to the optical coupler 353, and a controller 390.

The optical amplification fiber 340 is an optical waveguide using fluoride glass or tellurite glass as its host glass, and is a TDF in which at least a core region is doped with Tm element. The optical amplification fiber 340 amplifies signal light having a wavelength within a predetermined wavelength band (1455 to 1485 nm) when pumping light is supplied thereto.

The optical couplers 321 to 323 and pumping light sources 331 to 333 act as pumping light supply means for supplying the optical amplification fiber 340 with pumping light. The pumping light source 331 outputs pumping light $P_2$ in the wavelength band of 1.55 to 1.65 µm. As the pumping light source 331, a semiconductor laser light source or the like is used suitably. On the other hand, each of the pumping light sources 332, 333 outputs pumping light $P_1$ in the wavelength band of 1.05 µm or 1.4 µm. As the pumping light sources 332, 333, semiconductor laser pumping Nd:YLF laser light sources, Nd:YAG laser light sources, Yb laser light sources, and the like are used favorably.

The optical coupler 321 outputs toward the optical coupler 322 not only the pumping light $P_2$ outputted from the pumping light source 331 but also the signal light inputted from the optical isolator 311. The optical coupler 322 forwardly supplies the optical amplification fiber 340 with the pumping light $P_1$ outputted from the pumping light source 332 and outputs toward the amplification optical fiber 340 the signal light and pumping light $P_2$ inputted from the optical coupler 321. The optical coupler 323 backwardly supplies the optical amplification fiber 340 with the pumping light $P_1$ outputted from the pumping light source 333, and outputs toward the optical isolator 312 the signal light inputted from the optical amplification fiber 340.

Each of the optical isolators 311, 312 transmits light therethrough only in the forward direction (from the input port 301 to the output port 302) but not in the backward direction.

The optical add/drop coupler 351 is disposed on the optical path between the input port 301 and the optical isolator 311, outputs toward the optical isolator 311 the signal light in the light (including the signal light and monitor light) inputted from the input port 301, and outputs the monitor light toward the monitor light monitor system 352. According to the monitor light having arrived from the optical coupler 351, the monitor light monitor system 352 monitors the power or number of channels of signal light fed into the optical amplifier 300. The monitor light source 354 outputs monitor light having a wavelength different from the signal light wavelength. The optical coupler 353 multiplexes the signal light having arrived from the optical isolator 312 and the signal light having arrived from the monitor light source 354, and outputs thus multiplexed light toward the output port 302.

The controller 390 receives the result of monitoring obtained by the monitor light monitor system 352 and, according to the result of monitoring, regulates respective powers of pumping light outputted from the pumping light sources 331 to 333 and controls the output of monitor light from the monitor light source 354.

The optical amplifier 300 operates under the control of the controller 390. The pumping light $P_2$ outputted from the pumping light source 331 is forwardly supplied to the optical amplification fiber 340 by way of the optical couplers 321 and 322. The pumping light $P_1$ outputted from the pumping light source 332 is forwardly supplied to the optical amplification fiber 340 by way of the optical coupler 322. The pumping light $P_1$ outputted from the pumping light source 333 is backwardly supplied to the optical amplification fiber 340 by way of the optical coupler 323. The signal light fed into the input port 301 enters the optical amplification fiber 340 by way of the optical coupler 351, optical isolator 311, optical coupler 321, and optical coupler 322, and is amplified by the optical amplification fiber 340. The signal light amplified by the optical amplification fiber 340 travels the optical coupler 323, optical isolator 312, and optical coupler 353, so as to be outputted from the output port 302. The monitor light inputted from the input port 301 is demultiplexed by the optical coupler 351, so as to be fed into the monitor light monitor system 352. According to the monitor light, the monitor light monitor system 352 monitors the power or number of channels of signal light fed into the optical amplifier 300. Then, according to the result of monitoring, the controller 390 adjusts respective powers of pumping light outputted from the pumping light sources 331 to 333.

Control operations of the controller 390 in the optical amplifier 300 according to the third embodiment will now be explained. The control carried out by the controller 390 is feedforward control effected according to the power or number of channels of input signal light obtained by monitoring the monitor light, and adjusts the power of pumping light outputted from any of the pumping light sources 331 to 333. The control scheme in the optical amplifier 300 according to the third embodiment is feedforward control substantially the same as the first to third control operations in the optical amplifier 200 according to the second embodiment. Not only the first to third control operations, but also VOA and VASC control operations, and a plurality of these control operations in combination are possible in the third embodiment as well.

Namely, in the first control operation (auxiliary pumping light control), the power of pumping light $P_2$ at the time of ALC is approximated well by a linear or quadratic function of the input signal light power as shown in FIG. 9, whereas the power of pumping light $P_2$ at the time of AGC is approximated well by a linear or quadratic function of the number of channels of input signal light as shown in FIG. 11. In the second or third control operation (FW/BW control), the forward pumping light power at the time of ALC is approximated well by a linear function of the input signal light power as shown in FIG. 14, whereas the forward pumping light power at the time of AGC is approximated well by a quadratic function of the number of channels of input signal as shown in FIG. 17. Therefore, according to the power or number of channels of input signal light, the controller 390 adjusts the power of pumping light outputted from one of the pumping light sources 331 to 333, thereby executing one of the first to third control operations. As a consequence, even when the input signal light power changes at the time of ALC, the gain flatness is maintained, and the output signal light power is held constant. Also, even when the number of channels of input signal light changes at the time of AGC, the gain flatness is maintained, and the output signal light power is held constant.

According to the above-mentioned first to third embodiments, a pumping light supply system supplies pumping light (in the wavelength band of 1.05 µm, 1.4 µm, or 1.55 to 1.65 µm) to an optical waveguide having a light-guiding region doped with Tm element, signal light in a predetermined wavelength band (1455 to 1485 nm) is amplified by the optical waveguide, and thus amplified signal light is outputted therefrom. The power of light outputted from the optical waveguide or the power of spontaneously emitted light generated in the optical waveguide is monitored by a monitor system at two or more wavelengths. Then, according to the result of monitoring obtained by the monitor system, the controller adjusts the power of pumping light supplied from the pumping light supply system to the optical waveguide, whereby not only the gain flatness of the optical waveguide but also the power of signal light outputted from the optical waveguide is constantly controlled in a feedback fashion.

Preferably, in particular, the power of pumping light in the wavelength band of 1.55 to 1.65 µm outputted from the second pumping light source so as to be supplied to the optical waveguide is adjusted, whereby the gain flatness of optical waveguide is regulated so as to become constant. Also, the power of pumping light in the wavelength band of 1.05 µm or 1.4 µm outputted from the first pumping light source so as to be supplied to the optical waveguide is adjusted, whereby the power of signal light outputted from the optical waveguide is regulated so as to become constant.

Preferably, the power of pumping light in the wavelength band of 1.05 µm or 1.4 µm forwardly supplied to the optical waveguide is adjusted, whereby the gain flatness of optical waveguide is regulated so as to become constant. Also, the power of pumping light in the wavelength band of 1.05 µm or 1.4 µm backwardly supplied to the optical waveguide is adjusted, whereby the power of signal light outputted from the optical waveguide is regulated so as to become constant.

Preferably, the ratio between respective powers of pumping light in the wavelength band of 1.05 µm or 1.4 µm forwardly and backwardly supplied to the optical waveguide is adjusted, whereby the gain flatness of optical waveguide is regulated so as to become constant. Also, the sum of respective powers of pumping light in the wavelength band of 1.05 µm or 1.4 µm forwardly and backwardly supplied to the optical waveguide is adjusted, whereby the power of signal light outputted from the optical waveguide is regulated so as to become constant.

The foregoing feedback control constantly regulates the gain flatness of optical waveguide and the power of signal light outputted from the optical waveguide, thereby allowing stable operations.

The power of pumping light outputted from the second pumping light source so as to be supplied to the optical waveguide is adjusted according to the number of channels or power of signal light fed into the optical waveguide, whereby the gain flatness of optical waveguide and output signal light power are constantly regulated in a feedforward fashion. Also, the power of pumping light supplied to the optical waveguide in one or both of the forward and backward directions is adjusted, whereby the gain flatness and output signal light power are constantly regulated in a feedforward fashion. The case carrying out such feedforward control is favorable in that the optical amplifier becomes smaller in size and less expensive.

Comparative Example of Optical Amplifier

Figure 20:
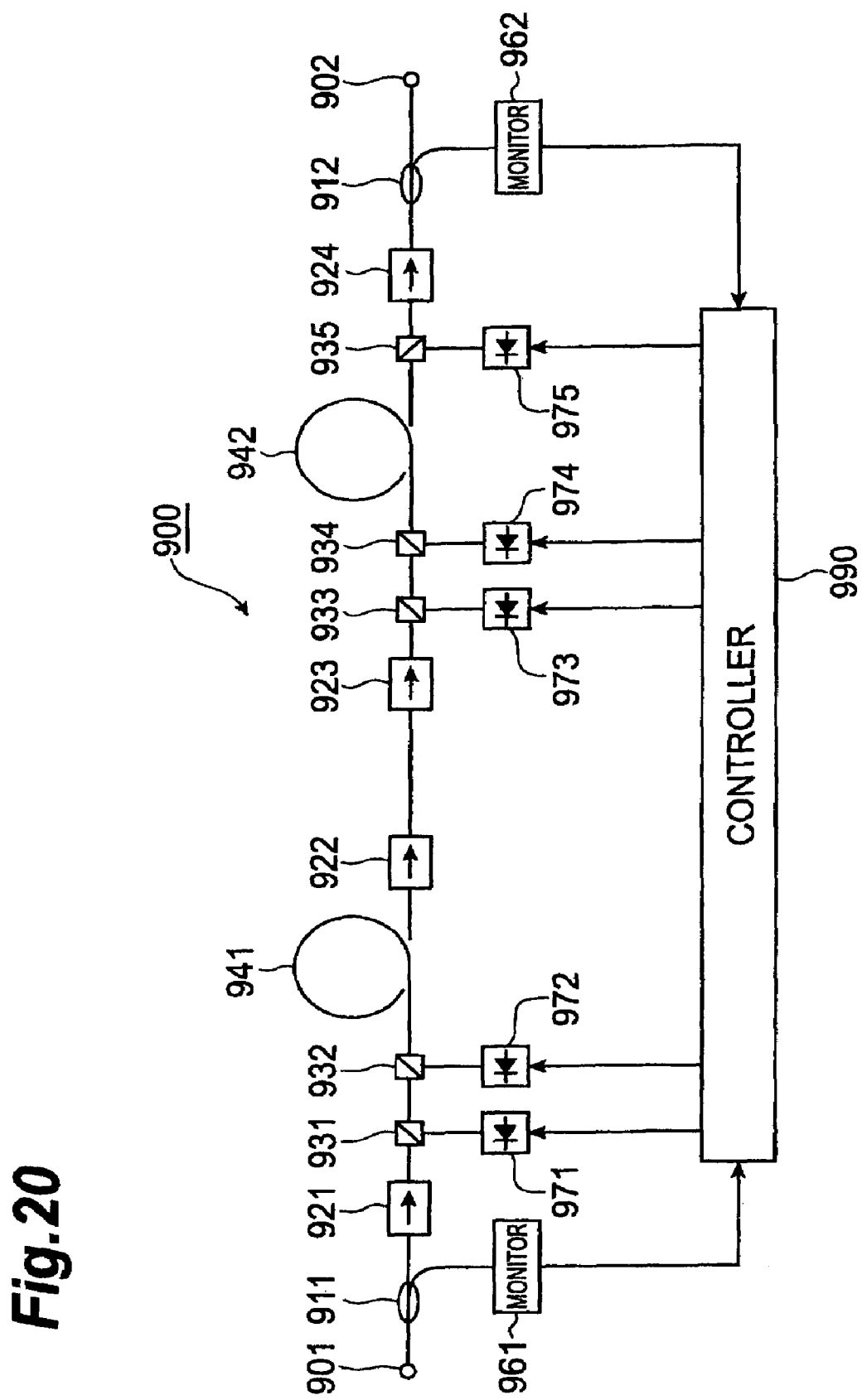
FIG. 20 is a diagram showing the configuration of the optical amplifier according to a comparative example.

The optical amplifier according to a comparative example to be compared with the optical amplifier according to the present invention will now be explained. FIG. 20 is a diagram showing the optical amplifier 900 according to the comparative example. The optical amplifier 900 shown in this drawing comprises, successively from an input end 901 to an output end 902, an optical branching device 911, an optical isolator 921, an optical coupler 931, an optical coupler 932, an optical amplification fiber 941, an optical isolator 922, an optical isolator 923, an optical coupler 933, an optical coupler 934, an optical amplification fiber 942, an optical coupler 935, an optical isolator 924, and an optical branching device 912. Also, the optical amplifier 900 comprises a signal light monitor system 961 connected to the optical branching device 911, a signal light monitor system 962 connected to the optical branching device 912, a pumping light source 971 connected to the optical coupler 931, a pumping light source 972 connected to the optical coupler 932, a pumping light source 973 connected to the optical coupler 933, a pumping light source 974 connected to the optical coupler 934, a pumping light source 975 connected to the optical coupler 935, and a controller 990.

Each of the optical amplification fibers 941 and 942 is an optical waveguide using fluoride glass or tellurite glass as its host glass, and is a TDF in which at least a core region is doped with Tm element. The optical amplification fibers 941, 942 amplify signal light having a wavelength within a predetermined wavelength band (1455 to 1485 nm) when pumping light is supplied thereto.

The optical couplers 931 to 935 and pumping light sources 971 to 975 act as a pumping light supply system for supplying the optical amplification fibers 941, 942 with pumping light. The wavelength band of pumping light is in the band of 1.05 µm, 1.2 µm, 1.4 µm, or 1.55 to 1.65 µm. As the pumping light sources 971 to 975, semiconductor laser pumping Nd:YLF laser light sources, Nd:YAG laser light sources, Yb laser light sources, semiconductor laser light sources, and the like are used favorably.

The optical coupler 931 outputs toward the optical coupler 932 not only the pumping light source outputted from the pumping light source 971 but also the signal light having arrived from the optical isolator 921. The optical coupler 932 outputs toward the optical amplification fiber 941 not only the pumping light source outputted from the pumping light source 972 but also the light having arrived from the optical coupler 931.

The optical coupler 933 outputs toward the optical coupler 934 not only the pumping light outputted from the pumping light source 973 but also the signal light having arrived from the optical isolator 923. The optical coupler 934 outputs toward the optical amplification fiber 942 not only the pumping light outputted from the pumping light source 974 but also the light having arrived from the optical coupler 933. The optical coupler 935 outputs toward the optical amplification fiber 942 the pumping light outputted from the pumping light source 975, and outputs toward the optical isolator 924 the light having arrived from the optical amplification fiber 942.

Each of the optical isolators 921 to 924 transmits light therethrough only in the forward direction (from the input port 901 to the output port 902) but not in the backward direction.

The optical branching device 911 is disposed on the optical path between the input end 901 and the optical isolator 921, causes a part of the power of light fed into the input end 901 to branch out, and outputs thus branched light toward the signal light monitor system 961. The signal light monitor system 961 inputs the light having arrived from the optical branching device 911, thereby detecting the power of signal light fed into the input end 901. The signal light monitor system 961 may also detect the number of channels of signal light.

The optical branching device 912 is disposed on the optical path between the optical isolator 924 and the output end 902, causes a part of the power of light outputted from the output end 902 to branch out, and outputs thus branched light toward the signal light monitor system 962. The signal light monitor system 962 inputs the light having arrived from the optical branching device 912, thereby detecting the power of signal light outputted from the output end 902. The signal light monitor system 962 may also detect the number of channels of signal light.

The controller 990 receives the results of detection obtained by the signal light monitor systems 961, 962, and adjusts respective powers of pumping light outputted from the pumping light sources 971 to 975.

In the optical amplifier 900, the pumping light outputted from each of the pumping light sources 971, 972 is forwardly supplied to the optical amplification fiber 941. The pumping light outputted from each of the pumping light sources 973, 974 is forwardly supplied to the optical amplification fiber 942. The pumping light outputted from the pumping light source 975 is backwardly supplied to the optical amplification fiber 942.

The signal light fed into the input end 901 is fed into the optical amplification fiber 941 by way of the optical branching device 911, optical isolator 921, optical coupler 931, and optical coupler 932 in succession, and is amplified by the optical amplification fiber 941. The signal light amplified by the optical amplification fiber 941 is fed into the optical amplification fiber 942 by way of the optical isolator 922, optical isolator 923, optical coupler 933, and optical coupler 934 in succession, and is amplified by the optical amplification fiber 942. The signal light amplified by the optical amplification fiber 942 successively travels the optical coupler 935, optical isolator 924, and optical branching device 912, so as to be outputted from the output end 902.

The optical branching device 911 causes a part of the power of signal light to branch out, whereas thus branched part of signal light is fed into the signal light monitor system 961, whereby the signal light monitor system 961 detects the power of input signal light. Also, the optical branching device 912 causes a part of the power of signal light to branch out, whereas thus branched part of signal light is fed into the signal light monitor system 962, whereby the signal light monitor system 962 detects the power of output signal light. Then, according to the results of detection obtained by the signal light monitor systems 961, 962, the controller 990 adjusts respective powers of pumping light outputted from the pumping light sources 971 to 975, thus regulating the gain of signal light amplification or output signal light power in the optical amplifier 900.

A more specific configuration of the optical amplifier 900 in the comparative example will now be explained. The signal light fed into the input end 901 of the optical amplifier 900 is assumed to have 32 channels (with intervals of 100 GHz) at the maximum within the wavelength band of 1470.3 to 1493.0 nm, whereas the power in each signal channel is assumed to be −29±4 dBm. On the other hand, the target power of signal light in each channel to be outputted from the output end 902 is assumed to be +3.5 dBm. The power fluctuation (±4 dBm) of input signal light at each wavelength corresponds to the loss fluctuation of the previous span when the optical amplifier is used as a repeater. The optical amplification fiber 941 in the upstream stage is assumed to have a Tm concentration of 2000 ppm and a total length of 20 mm. The optical amplification fiber 942 in the downstream stage is assumed to have a Tm concentration of 2000 ppm and a total length of 25 mm.

The pumping light forwardly supplied from the pumping light source 972 to the upstream optical amplification fiber 941 is assumed to have a wavelength of 1.42 µm and a constant power of 140 mW. The pumping light forwardly supplied from the pumping light source 974 to the downstream optical amplification fiber 942 is assumed to have a wavelength of 1.42 µm and a maximum power of 80 mW. The pumping light backwardly supplied from the pumping light source 975 to the downstream optical amplification fiber 942 is assumed to have a wavelength of 1.42 µm and a maximum power of 150 mW. Each of them can be realized by a single semiconductor laser light source which is commercially available at present.

The pumping light forwardly supplied from the pumping light source 971 to the upstream optical amplification fiber 941 is assumed to have a wavelength of 1.56 µm and a constant power of +11 dBm. The pumping light forwardly supplied from the pumping light source 973 to the upstream optical amplification fiber 942 is assumed to have a wavelength of 1.56 µm and a constant power of +11 dBm. Commercially available semiconductor laser light sources outputting light having a wavelength of 1.56 µm at present include those having a maximum output power of +13 dBm. In view of the sum of insertion losses of two optical couplers (somewhat exceeding 1 dB), the pumping light power of +11 dBm at the input point for the optical amplification fibers 941, 942 falls within an appropriate range.

Figure 21:
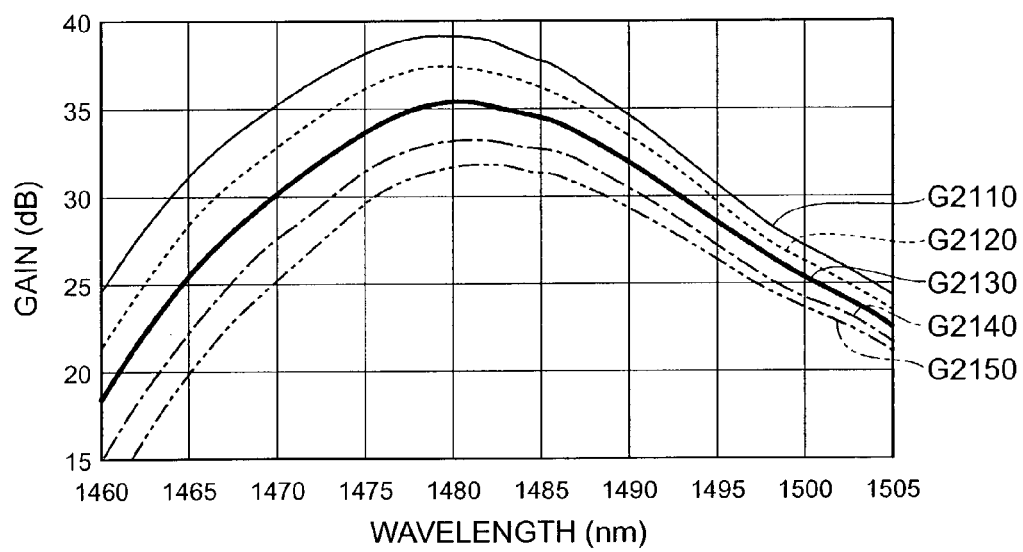
FIG. 21 shows gain spectra of input signal light (having 32 channels) in the optical amplifier of the comparative example shown in FIG. 20.
Figure 22:
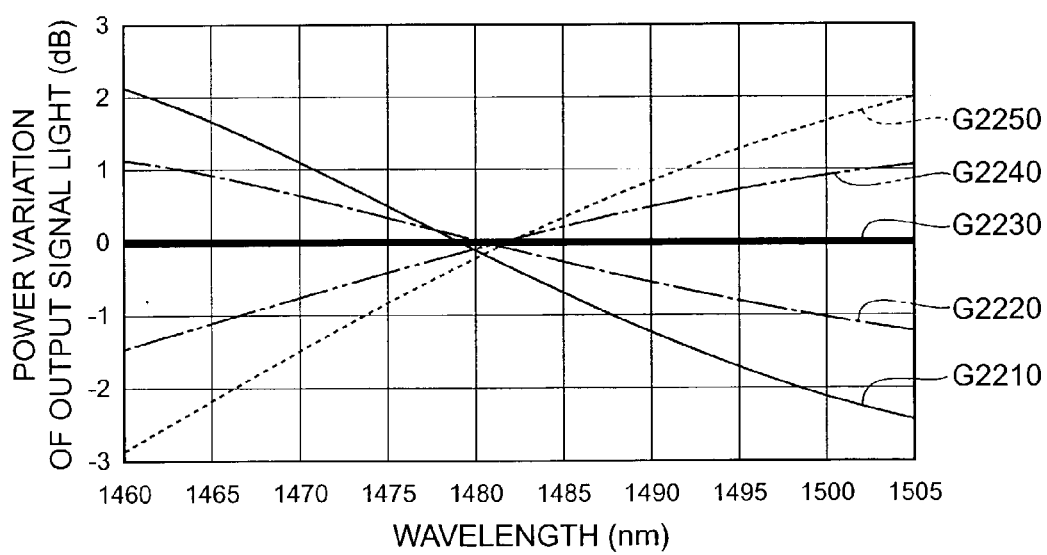
FIG. 22 shows output spectra of input signal light (having 32 channels) in the optical amplifier of the comparative example shown in FIG. 20.
Figure 23:
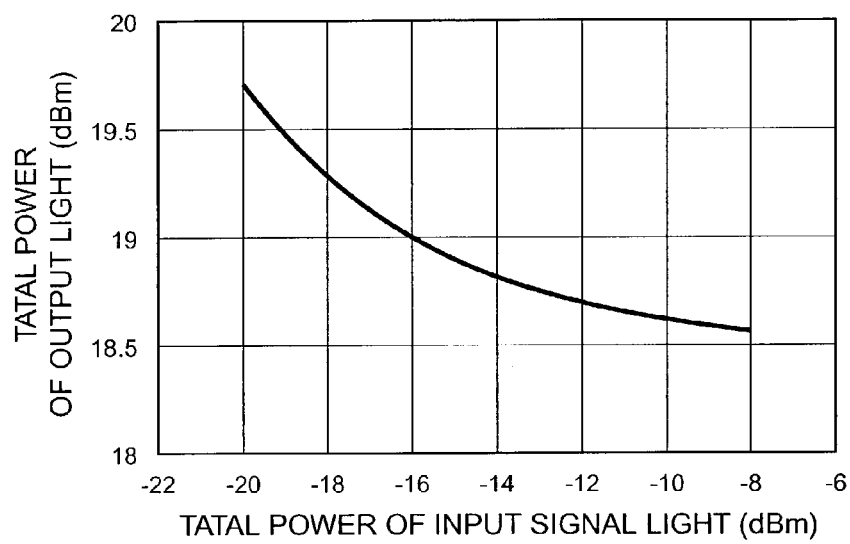
FIG. 23 is a graph showing the relationship between the total output light power and total input signal light power in the optical amplifier of the comparative example shown in FIG. 20.

FIG. 21 shows gain spectra of input signal light (having 32 channels) in the optical amplifier 900 according to the comparative example. FIG. 22 shows output spectra of input signal light (having 32 channels) in the optical amplifier 900 according to the comparative example. These charts show gain and output spectra in each of cases where the total input signal light power is ~18 dBm (curves G2110 and G2210 in FIGS. 21 and 22, respectively), ~16 dBm (curves G2120 and G2220 in FIGS. 21 and 22, respectively), ~14 dBm (curves G2130 and G2230 in FIGS. 21 and 22, respectively), ~12 dBm (curves G2140 and G2240 in FIGS. 21 and 22, respectively), and ~10 dBm (curves G2150 and G2250 in FIGS. 21 and 22, respectively) when the number of channels of input signal light is 32. FIG. 22 shows deviations from a reference obtained when the total input signal light power is ~14 dBm. As can be seen from FIG. 21, the gain spectrum shifts toward the longer wavelength side as the input signal light power is greater. Also, as can be seen from FIG. 22, the slope of output spectrum increases from a negative value to a positive value while keeping a substantially linear form in the signal wavelength region. In particular, the output signal light power fluctuates by ±1 dB or more at both ends of the signal wavelength region.

Here, powers of pumping light supplied from the pumping light sources 974, 975 to the optical amplification fiber 942 are adjusted such that the total power of output light including ASE (Amplified Spontaneous Emission) light becomes a function of the total input signal light power (FIG. 23), whereby the total output signal light power is regulated so as to become +18.5 dBm. The deviation of total output light power from a target value of total output signal light power is ASE light power $P_{ASE}$ represented by the following expression:

$$P_{ASE} = \int G(P_{in},\lambda) \cdot NF(P_{in},\lambda) \cdot d\lambda \qquad (1)$$

where $P_{in}$ is the input signal light power, $\lambda$ is the wavelength, G is the gain, and NF is the noise figure.

In particular, when the dependence of noise figure NF on the input signal light power $P_{in}$ is negligibly small, the ASE light power $P_{ASE}$ can simply be expressed as a linear function of gain G. For lowering the dependence of noise figure NF on the input signal light power $P_{in}$, it will be sufficient if the power of pumping light supplied to the upstream optical amplification fiber 941 is made so high that the optical amplification fiber 941 is saturated in terms of gain.

In the foregoing control scheme, it will be sufficient if the respective total powers of input signal light and output light are detected by the signal light monitor systems 961, 962, whereby the control will be easy. In actual optical communication systems, however, not only the loss in repeating sections fluctuates but also the number of channels of signal light may fluctuate according to the volume of information to be transmitted/received and the like. Therefore, influences of fluctuations in the number of channels of signal light will be explained in the following.

Figure 24:
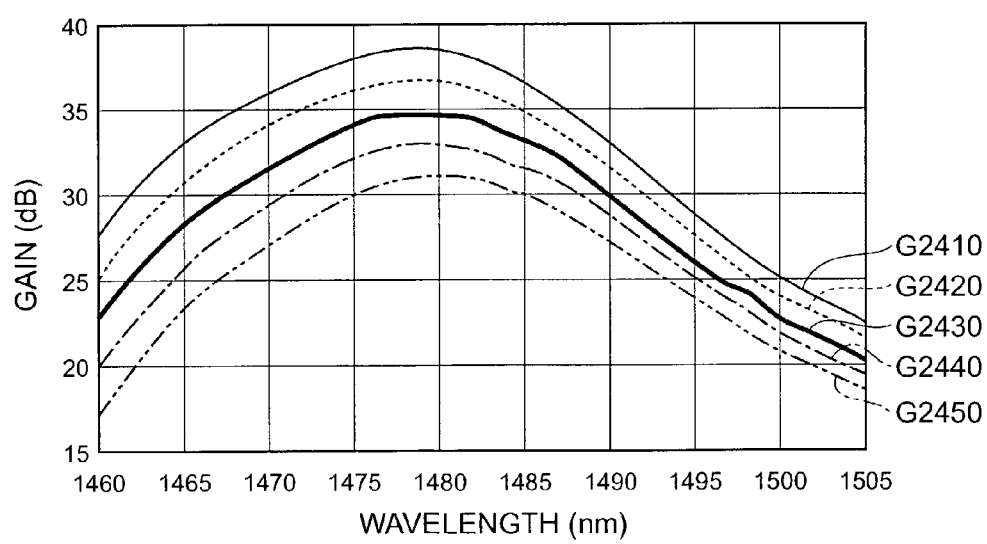
FIG. 24 shows gain spectra of input signal light (having 8 channels) in the optical amplifier of the comparative example shown in FIG. 20.
Figure 25:
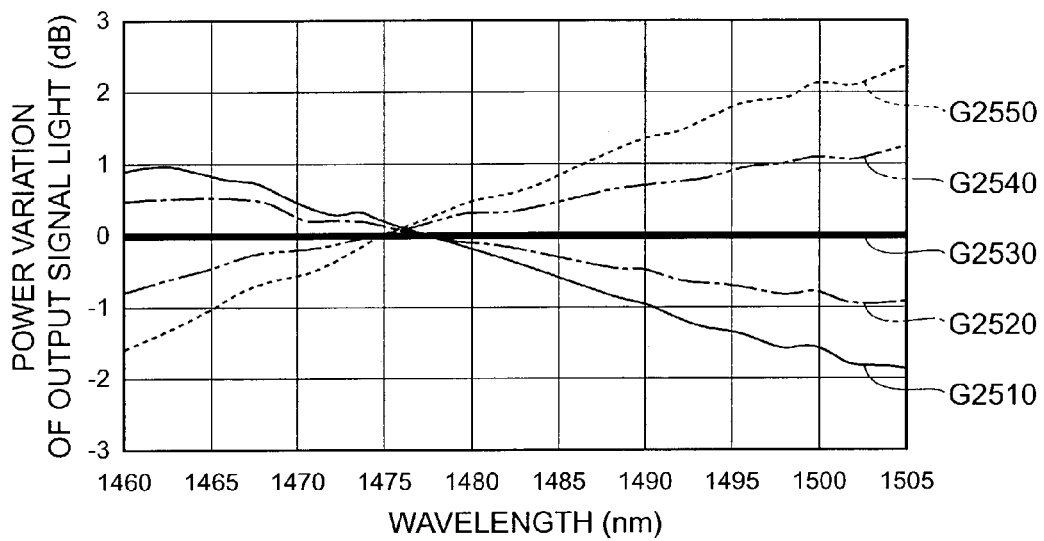
FIG. 25 shows output spectra of input signal light (having 8 channels) in the optical amplifier of the comparative example shown in FIG. 20.

FIG. 24 shows gain spectra of input signal light (having 8 channels) in the optical amplifier 900 according to the comparative example. FIG. 25 shows output spectra of input signal light (having 8 channels) in the optical amplifier 900 according to the comparative example. These charts show gain and output spectra in each of cases where the total input signal light power is −24 dBm (curves G2410 and G2410 in FIGS. 24 and 25, respectively), −22 dBm (curves G2420 and G2520 in FIGS. 24 and 25, respectively), −20 dBm (curves G2430 and G2530 in FIGS. 24 and 25, respectively), −18 dBm (curves G2440 and G2540 in FIGS. 24 and 25, respectively), and −16 dBm (curves G2450 and G2550 in FIGS. 24 and 25, respectively) when the number of channels of input signal light is 8. FIG. 25 shows deviations from a reference obtained when the total input signal light power is −20 dBm. As can be seen from FIG. 24, the gain spectrum shifts toward the longer wavelength side as the input signal light power is greater. Also, as can be seen from FIG. 25, the slope of output spectrum increases from a negative value to a positive value while keeping a substantially linear form in the signal wavelength region. In particular, the output signal light power fluctuates by ±1 dB or more near a wavelength of 1493 nm.

When the gain spectrum in the case where the number of channels of input signal light is 32 (FIG. 21) and the gain spectrum in the case where the number of channels of input signal light is 8 (FIG. 24) are compared with each other, the gain spectra differ from each other even when the input signal light power for each signal channel is held constant. Such a phenomenon is not seen in EDFA, but is peculiar to TDFA utilizing the four-level type transition of Tm ion.

Figure 26:
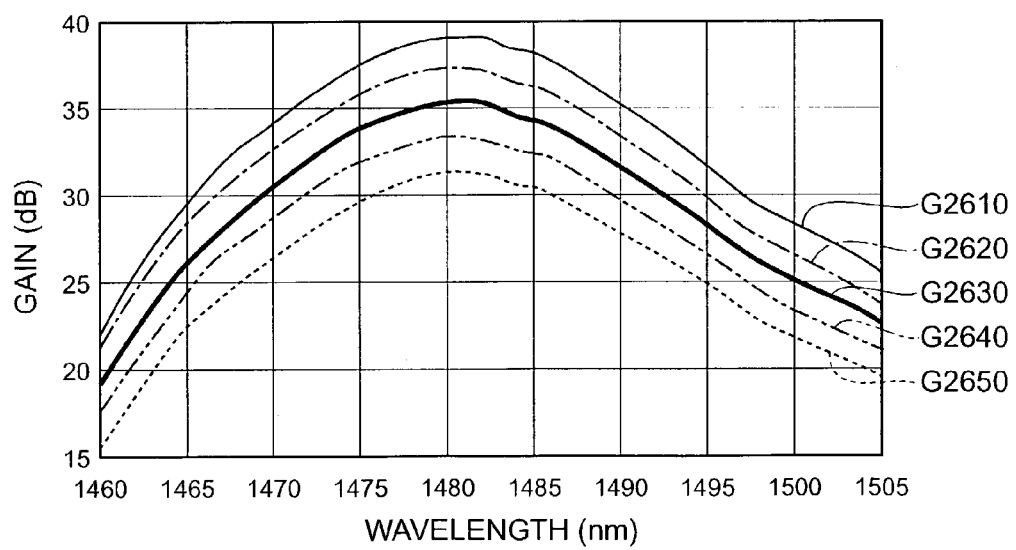
FIG. 26 shows gain spectra of input signal light (having 32 channels) in the optical amplifier of the comparative example shown in FIG. 20 obtained when the pumping light power at a wavelength of 1.56 µm is regulated.
Figure 27:
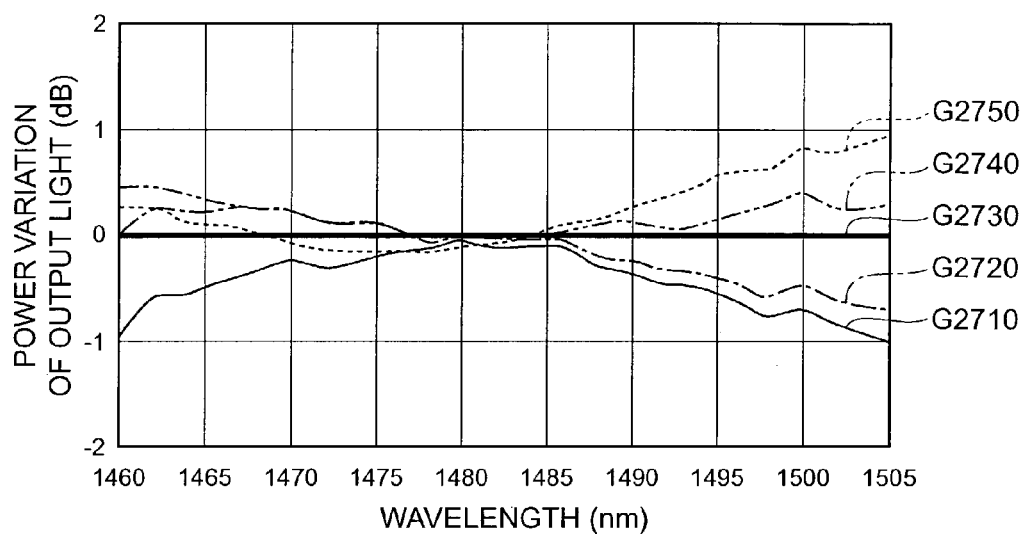
FIG. 27 shows output spectra of input signal light (having 32 channels) in the optical amplifier of the comparative example shown in FIG. 20 obtained when the pumping light power at a wavelength of 1.56 µm is regulated.
Figure 28:
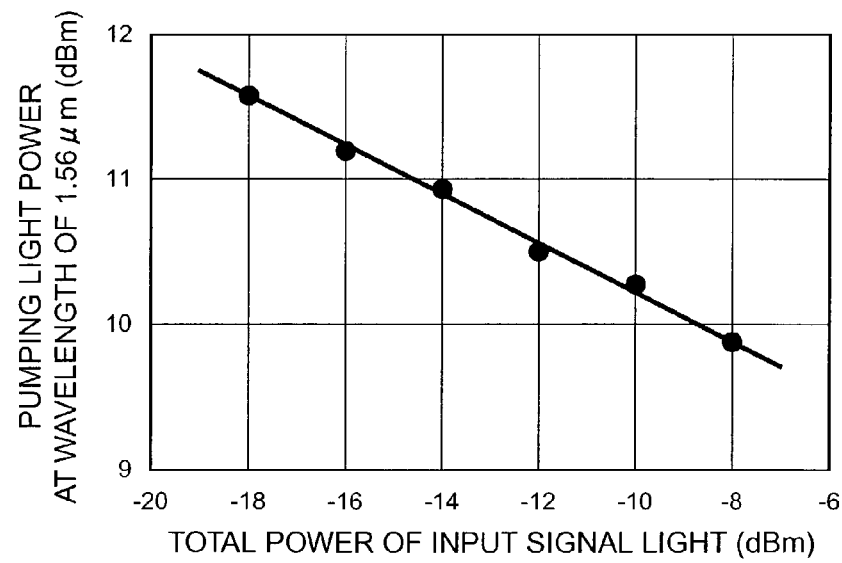
FIG. 28 is a graph showing the relationship between the pumping light power at the wavelength of 1.56 µm and total input signal light power in the optical amplifier of the comparative example shown in FIG. 20.

As means for suppressing the fluctuation of output spectra such as that seen in FIG. 22, the power of pumping light having a wavelength of 1.56 μm supplied from the pumping light sources 971, 973 to the optical amplification fibers 941, 942 may be regulated such that the deviation of output signal light power near both ends of the signal wavelength region becomes zero (i.e., the gain slope becomes zero). FIG. 26 shows gain spectra of input signal light (having 32 channels) in the optical amplifier 900 according to the comparative example in the case where the pumping light power at a wavelength of 1.56 μm is regulated. FIG. 27 shows output spectra of input signal light (having 32 channels) in the optical amplifier 900 according to the comparative example in the case where the pumping light power at the wavelength of 1.56 μm is regulated. FIG. 28 is a graph showing the relationship between the pumping light power at a wavelength of 1.56 μm and the total input signal light power in the optical amplifier 900 according to the comparative example. In FIGS. 26 and 27, curves G2610 and G2710, G2620 and G2720, G2630 and G2730, G2640 and G2740, and G2650 and G2750 indicate output spectra obtained when the total input signal light power is −18 dBm, −16 dBm, −14 dBm, −12 dBm, and −10 dBm, respectively.

As shown in FIG. 28, the power of pumping light having a wavelength of 1.56 μm supplied from the pumping light sources 971, 973 to the optical amplification fibers 941, 942 is made smaller as the total input signal light power is greater. At this time, the wavelength shift depending on the input signal light power is suppressed in gain spectra as shown in FIG. 26. The output spectra at this time yield an output signal light power fluctuation of about ±0.4 dB near a wavelength of 1493 nm, though the fluctuation of slope is suppressed as shown in FIG. 27.

In an optical amplifier as a repeater used on land, the gain deviation is preferably not greater than 1 $dB_{p-p}$. In the example mentioned above, a tolerance of the gain deviation will nearly be exceeded if only the input signal light power fluctuates. Therefore, when a gain equalizing filter for equalizing the gain of optical amplifier 900 is inserted, for example, a required margin may be lost due to variations in the making of the gain equalizing filter. Also, there are cases where the range of fluctuation of input signal light power at each wavelength is required to be set greater than 8 $db_{p-p}$, whereby the fluctuation of output signal light power exceeds ±0.4 dB or so in such a case. Thus, the optical amplifier 900 according to the comparative example is insufficient for use under the condition expected in the state of actual use.

Fourth Embodiment of Optical Amplifier

Figure 29:
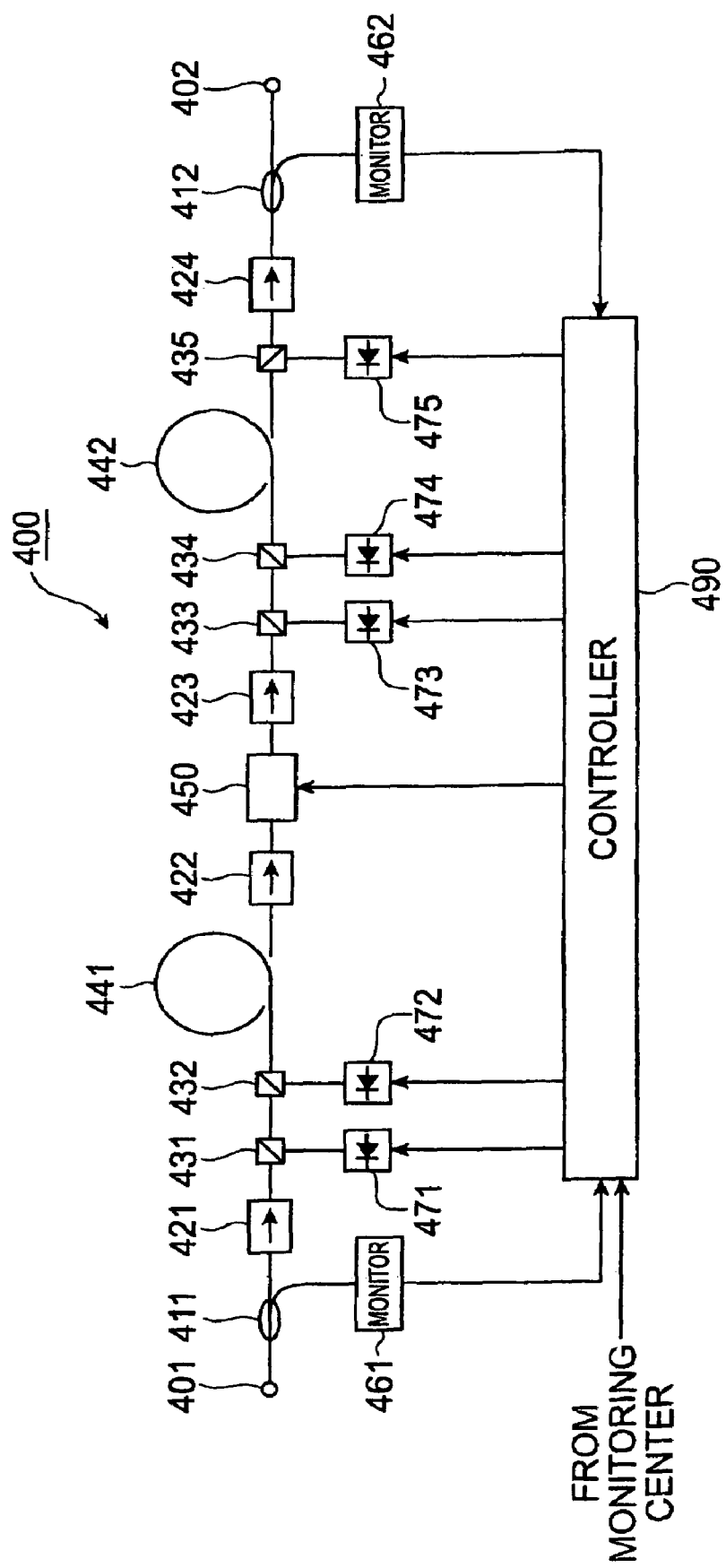
FIG. 29 is a diagram showing the configuration of a fourth embodiment of the optical amplifier according to the present invention.

A fourth embodiment of the optical amplifier according to the present invention will now be explained. FIG. 29 is a diagram of the optical amplifier 400 according to the fourth embodiment. The optical amplifier 400 shown in this drawing comprises, successively from an input end 401 to an output end 402, an optical branching device 411, an optical isolator 421, an optical coupler 431, an optical coupler 432, an optical amplification fiber 441, an optical isolator 422, a transmission characteristic variable optical member 450, an optical isolator 423, an optical coupler 433, an optical coupler 434, an optical amplification fiber 442, an optical coupler 435, an optical isolator 424, and an optical branching device 412. Also, the optical amplifier 400 comprises a signal light monitor system 461 connected to the optical branching device 411, a signal light monitor system 462 connected to the optical branching device 412, a pumping light source 471 connected to the optical coupler 431, a pumping light source 472 connected to the optical coupler 432, a pumping light source 473 connected to the optical coupler 433, a pumping light source 474 connected to the optical coupler 434, a pumping light source 475 connected to the optical coupler 435, and a controller 490.

The optical amplifier 400 according to the fourth embodiment differs from the optical amplifier 900 (FIG. 20) of the comparative example in that the transmission characteristic variable optical member 450 is disposed between the optical isolators 422 and 423, and in that the controller 490 is provided in place of the controller 990. The transmission characteristic variable optical member 450 is VOA whose transmittance at the signal wavelength is variable, whereas its transmittance is regulated by the controller 490 (VOA control). The controller 490 receives the results of detection (input signal light power, number of channels of signal light, and output signal light power) obtained by the signal light monitor systems 461, 462 or receives information about the number of channels of signal light from a monitor center (means for monitoring the state of communication of the whole optical communication system including the optical amplifier according to the present invention), for example, outside the signal light main line and, according to any of them, regulates the power of pumping light outputted from each of the pumping light sources 471 to 475 and controls the transmittance of the transmission characteristic variable optical member 450.

The signal light monitor systems 461, 462 detect any of the output signal light power, optical amplification gain, and ASE light power at two or more wavelengths in the amplification gain bands of the optical amplification fibers 441, 442. The signal light monitor system 461 may detect the total power of input signal light, whereas the signal light monitor system 462 may detect the total power of output signal light. Alternatively, the power of spontaneously emitted light laterally released from the optical amplification fibers 441, 442 may be detected, so as to determine the gain of optical amplification in the optical amplification fibers 441, 442. Also, the number of channels of signal light may be detected according to the information provided from the monitor center.

Figure 30:
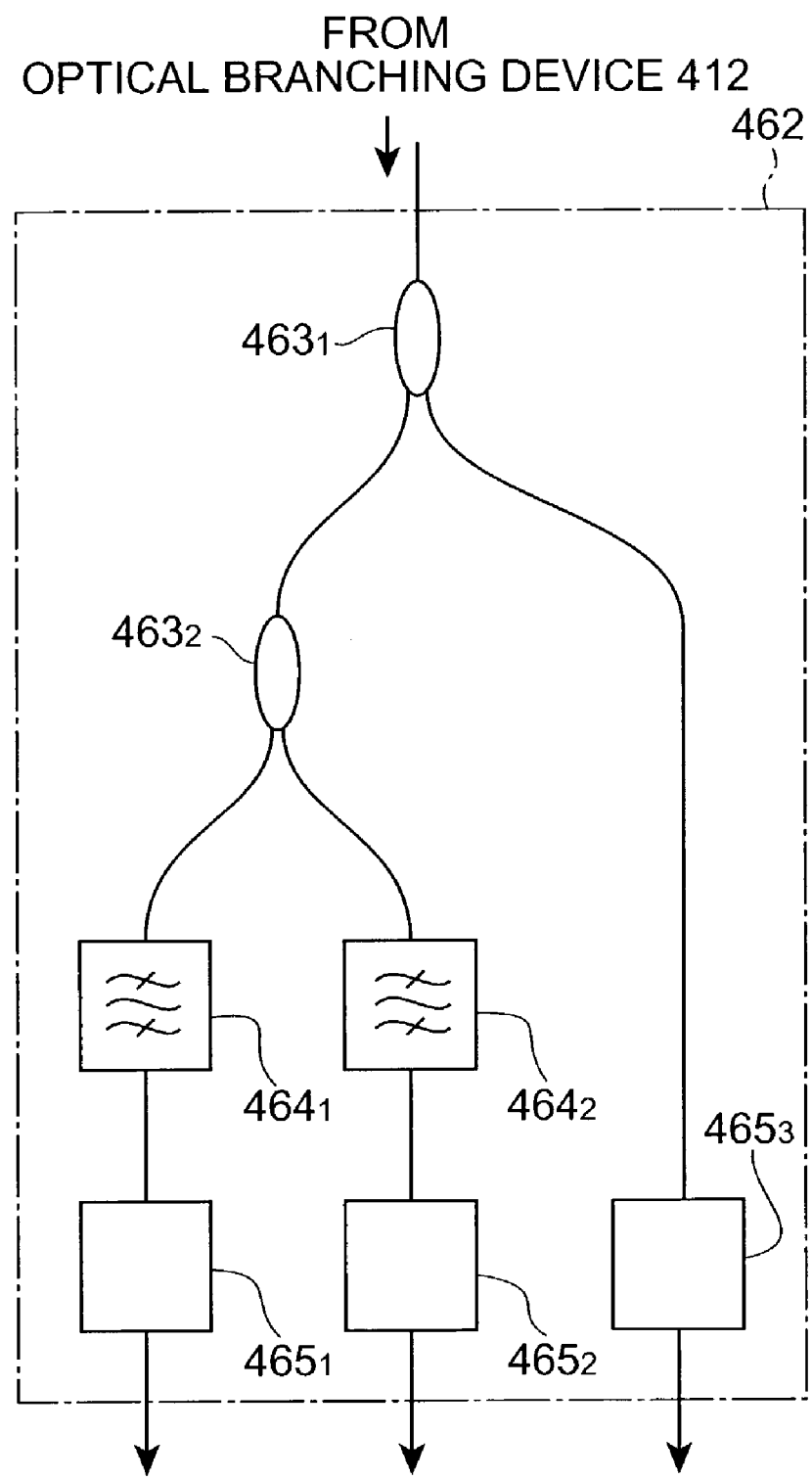
FIG. 30 is a diagram showing a configurational example of a monitor system 462 in the optical amplifier 400 shown in FIG. 29.

FIG. 30 is a diagram showing a configurational example of the signal light monitor system 462 in the optical amplifier 400 according to the fourth embodiment. The signal light monitor system 462 shown in this drawing has optical branching devices $463_1$, $463_2$, optical filters $464_1$, $464_2$, and light-receiving devices $465_1$ to $465_3$. The optical branching device $463_1$ splits the light having arrived from the optical branching device 412 into two, and outputs one of thus split parts of light to the optical branching device $463_2$ and the other to the light-receiving device $465_3$. The optical branching device $463_2$ splits the light having arrived from the optical branching device $463_1$ into two, and outputs one of thus split parts of light to the optical branching device $464_1$ and the other to the light-receiving device $464_2$.

The optical filter $464_1$ inputs the light having arrived from the optical branching device $463_2$, and selectively transmits therethrough a specific wavelength of light on the shorter wavelength side in the wavelength band of signal light amplified by the optical amplification fiber 442. The optical filter $464_2$ inputs the light having arrived from the optical branching device $463_2$, and selectively transmits therethrough a specific wavelength of light on the longer wavelength side in the signal wavelength band.

The light-receiving device $465_1$ receives the light transmitted through the optical filter $464_1$, and outputs toward the controller 490 an electric signal corresponding to the power of thus received light. The light-receiving device $465_2$ receives the light transmitted through the optical filter $464_2$, and outputs toward the controller 490 an electric signal corresponding to the power of thus received light. The light-receiving device $465_3$ receives the light having arrived from the optical branching device $463_1$, and outputs toward the controller 490 an electric signal corresponding to the power of thus received light.

Therefore, by using the light-receiving devices $465_1$ and $465_2$, the signal light monitor system 462 shown in FIG. 30 can monitor the power of light having arrived from the optical branching device 412 at two wavelengths, thus being able to monitor the gain slope. Also, by using the light-receiving device $465_3$, the signal light monitor system 462 can monitor the total power of light having arrived from the optical branching device 412. The signal light monitor system 462 is favorable in that it has a simple configuration with a low cost. In FIG. 30, as the optical filter $464_1$, one having a variable transmission wavelength range may be used without providing the optical filter $464_2$ and light-receiving device $465_2$.

Figure 31:
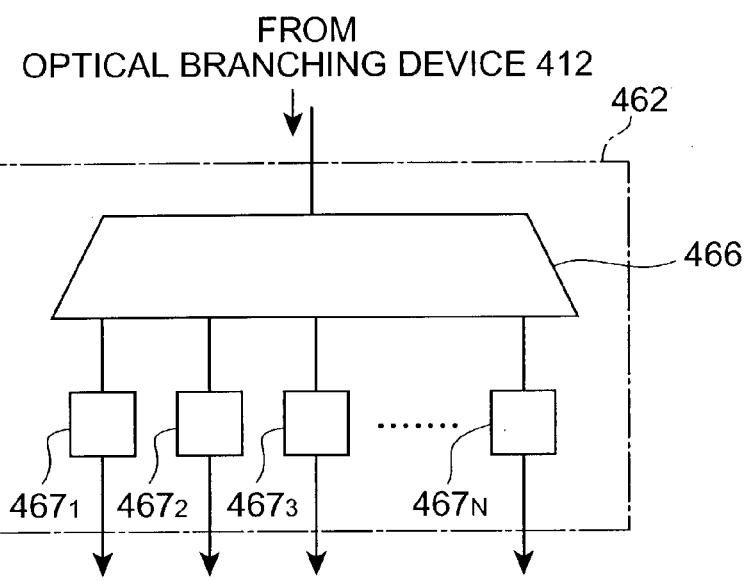
FIG. 31 is a diagram showing another configurational example of the monitor system 462 in the optical amplifier 400 shown in FIG. 29.

FIG. 31 is a diagram showing another configurational example of the signal light monitor system 462 in the optical amplifier 400 according to the fourth embodiment. The signal light monitor system 462 shown in this drawing has an arrayed waveguide grating (AWG) 466 and light-receiving devices $467_1$ to $467_N$, where N is an integer of 2 or greater.

The AWG 466 is a diffraction grating in which a plurality of optical waveguides are formed into an array on a flat substrate, and can multiplex or demultiplex inputted light and output the resulting light. Here, the AWG 466 is used as an optical demultiplexer. Namely, the AWG 466 demultiplexes the light having arrived from the optical branching device 412, and outputs thus demultiplexed individual wavelengths of light to the light-receiving devices $467_1$ to $467_N$. The light-receiving devices $467_1$ to $467_N$ receive the respective wavelengths of light having reached there after being outputted from the AWG 466, and output toward the controller 490 electric signals corresponding to the power of thus received light.

Therefore, by using the light-receiving devices $467_1$ to $467_N$, the output light monitor system 462 shown in FIG. 31 can monitor the power of light having arrived from the optical branching device 412 at N wavelengths, whereby the gain slope can be monitored. Also, according to the respective results of monitoring obtained by the light-receiving devices $467_1$ to $467_N$, the output light monitor system 462 can monitor the total power of light having arrived from the optical branching device 412. The output light monitor system 462 is favorable in that it enables highly accurate monitoring at a number of wavelengths and can detect the number of channels of signal light.

A more specific configuration of the optical amplifier 400 according to the fourth embodiment will now be explained. The signal light fed into the input end 401 of the optical amplifier 400 is assumed to have 32 channels (with intervals of 100 GHz) at the maximum within the wavelength band of 1470.3 to 1493.0 nm, whereas the power in each signal channel is assumed to be −29±4 dBm. On the other hand, the target power of signal light in each channel to be outputted from the output end 402 is assumed to be +3.5 dBm. The optical amplification fiber 441 in the upstream stage is assumed to have a Tm concentration of 2000 ppm and a total length of 20 mm. The optical amplification fiber 442 in the downstream stage is assumed to have a Tm concentration of 2000 ppm and a total length of 25 mm.

The pumping light forwardly supplied from the pumping light source 472 to the upstream optical amplification fiber 441 is assumed to have a wavelength of 1.42 μm and a constant power of 140 mW. The pumping light forwardly supplied from the pumping light source 474 to the downstream optical amplification fiber 442 is assumed to have a wavelength of 1.42 μm and a maximum power of 80 mW. The pumping light backwardly supplied from the pumping light source 475 to the downstream optical amplification fiber 442 is assumed to have a wavelength of 1.42 μm and a maximum power of 150 mW. The powers of pumping light outputted from the pumping light sources 474, 475 are regulated as in the above-mentioned comparative example.

The pumping light forwardly supplied from the pumping light source 471 to the upstream optical amplification fiber 441 is assumed to have a wavelength of 1.56 μm and a constant power of +11 dBm. The pumping light forwardly supplied from the pumping light source 473 to the upstream optical amplification fiber 442 is assumed to have a wavelength of 1.56 μm and a constant power of +11 dBm.

The amount of fluctuation of loss ΔA (dB) in the transmission characteristic variable optical member 450 is regulated according to the following expression:

$$\Delta A = X \cdot \Delta P_{in} \quad (2)$$

where $\Delta P_{in}$ (dB) is the amount of fluctuation of input signal light power, and X is a coefficient having a value corresponding to the number of channels of signal light. When the amount of fluctuation in the target power of output signal light is required to be changed depending on the kind of optical fibers laid in a repeating span and the like, the amount of fluctuation of loss ΔA (dB) in the transmission characteristic variable optical member 450 is regulated according to the following expression:

$$\Delta A = X \cdot (\Delta P_{in} - \Delta P_{out}) \quad (3)$$

where $\Delta P_{out}$ (dB) is the amount of fluctuation in the target power of output signal light.

Figure 32:
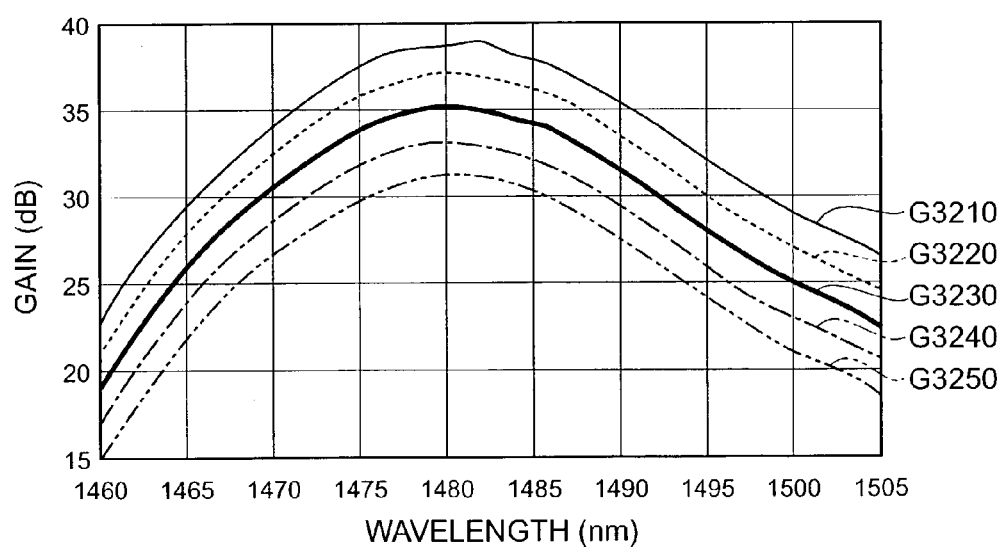
FIG. 32 shows gain spectra of input signal light (having 32 channels) in the optical amplifier 400 shown in FIG. 29.
Figure 33:
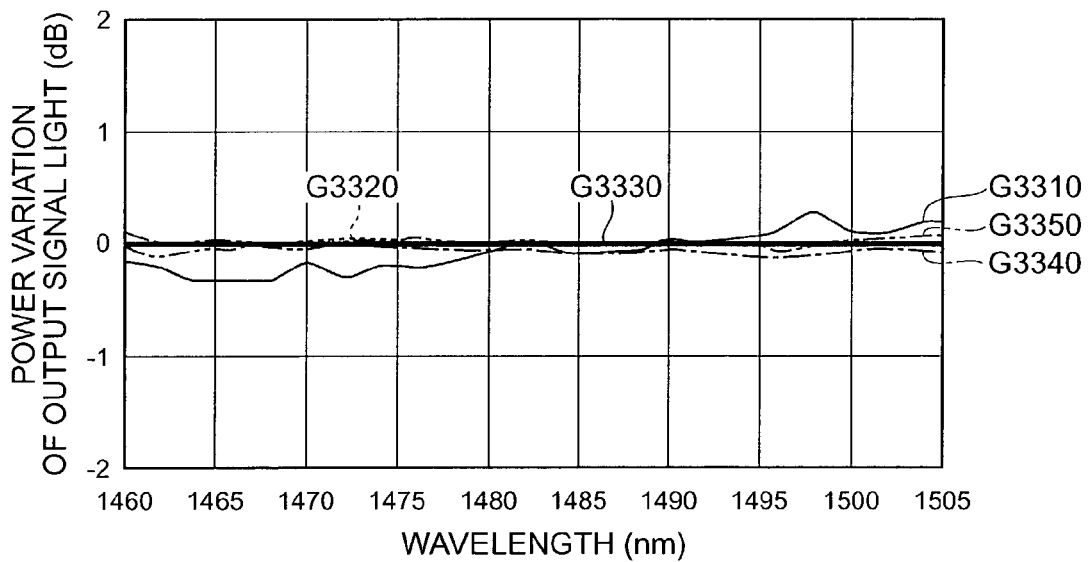
FIG. 33 shows output spectra of input signal light (having 32 channels) in the optical amplifier 400 shown in FIG. 29.

FIG. 32 shows gain spectra of input signal light (having 32 channels) in the optical amplifier 400 according to the fourth embodiment. FIG. 33 shows output spectra of input signal light (having 32 channels) in the optical amplifier 400 according to the fourth embodiment. These charts show gain and output spectra in each of cases where the total input signal light power is −18 dBm (curves G3210 and G3310 in FIGS. 32 and 33, respectively), −16 dBm (curves G3220 and G3320 in FIGS. 32 and 33, respectively), −14 dBm (curves G3230 and G3330 in FIGS. 32 and 33, respectively), −12 dBm (curves G3240 and G3340 in FIGS. 32 and 33, respectively), and −10 dBm (curves G3250 and G3350 in FIGS. 32 and 33, respectively) when the value of X is 1 while the number of channels of input signal light is 32. As can be seen from FIG. 33, the fluctuation of output signal light power in the signal wavelength region is suppressed so as to fall within the range of −0.3 dB to +0.1 dB.

Figure 34:
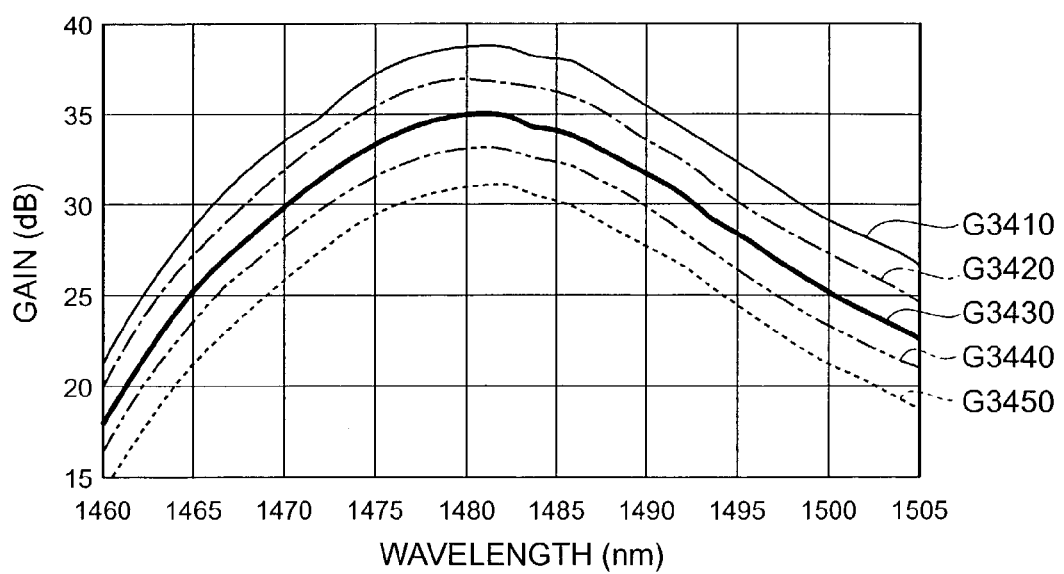
FIG. 34 shows gain spectra of input signal light (having 8 channels) in the optical amplifier 400 shown in FIG. 29.
Figure 35:
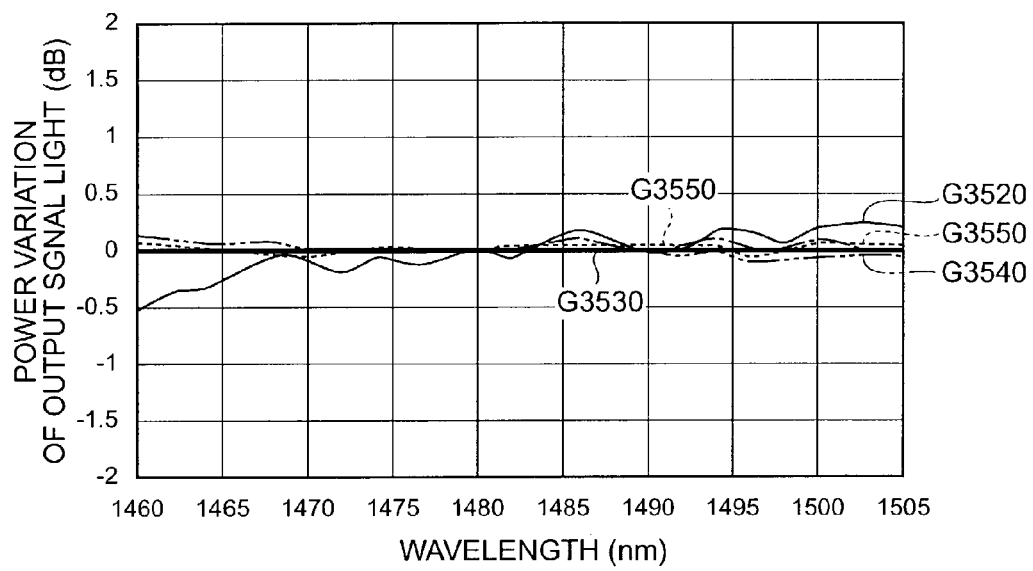
FIG. 35 shows output spectra of input signal light (having 8 channels) in the optical amplifier 400 shown in FIG. 29.

FIG. 34 shows gain spectra of input signal light (having 8 channels) in the optical amplifier 400 according to the fourth embodiment. FIG. 35 shows output spectra of input signal light (having 8 channels) in the optical amplifier 400 according to the fourth embodiment. These charts show gain and output spectra in each of cases where the total input signal light power is −24 dBm (curves G3410 and G3510 in FIGS. 34 and 35, respectively), −22 dBm (curves G3420 and G3520 in FIGS. 34 and 35, respectively), −20 dBm (curves G3430 and G3530 in FIGS. 34 and 35, respectively), −18 dBm (curves G3440 and G3540 in FIGS. 34 and 35, respectively), and −16 dBm (curves G3450 and G3550 in FIGS. 34 and 35, respectively) when the value of X is 0.9 while the number of channels of input signal light is 8. Here, each of the power of pumping light having a wavelength of 1.56 μm supplied from the pumping light source 471 to the optical amplification fiber 441 and the power of pumping light having a wavelength of 1.56 μm supplied from the pumping light source 473 to the optical amplification fiber 442 is set to +12 dBm in order to compensate for the shift of gain spectrum toward the shorter wavelength side due to the decrease in the number of channels of signal light. Also, since the slope of gain spectrum becomes smaller as the number of signal channels decreases, the value of X is set to 0.9. In this case, the fluctuation of output signal light power in the signal wavelength region is suppressed so as to fall within the range of ±0.2 dB.

However, in both of the cases where the number of signal channels is 32 (FIGS. 32 and 33) and 8 (FIGS. 34 and 35), a gain slope still occurs when the input signal light power for each channel is −33 dBm. This results from the fact that, while the above-mentioned expression (3) holds in principle in the case of EDFA (where X always has a value of 1 regardless of the number of channels), ΔA is a nonlinear function with respect to $(\Delta P_{in} - \Delta P_{out})$ in the strict sense. Therefore, in the case where the fluctuation of input signal light power for each wavelength is presumed to exceed 8 dB$_{p-p}$ in the above-mentioned example, a quadratic (or higher-order) function may be used in place of the above-mentioned expression (3), which is a linear function, whereby better output spectra can be maintained.

Figure 36:
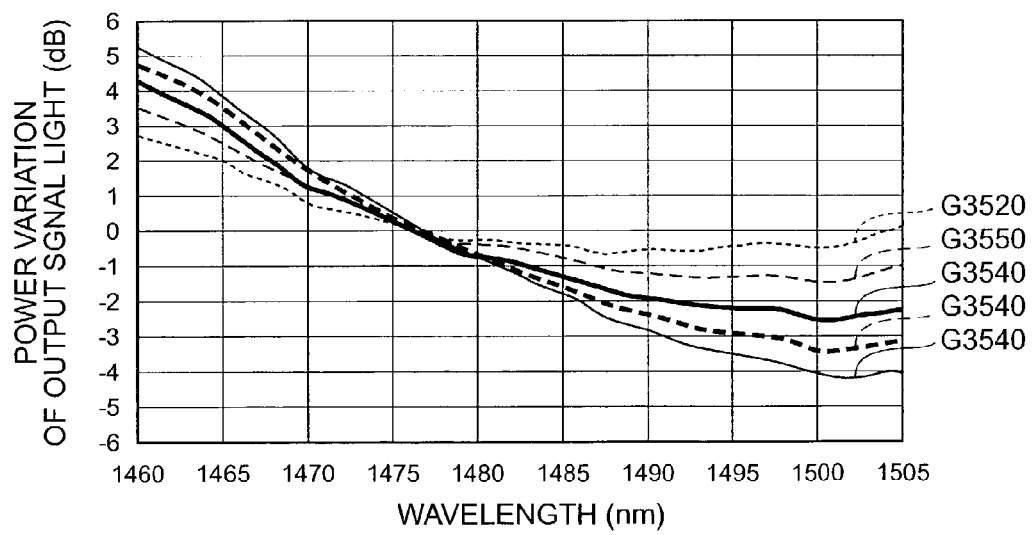
FIG. 36 shows respective output spectra for individual values of total input signal light power in the optical amplifier 400 shown in FIG. 29.

The power of pumping light having a wavelength of 1.42 μm outputted from each of the pumping light sources 472, 474, 475 and the transmittance of transmission characteristic variable optical member 450 maybe regulated while constantly keeping the power of pumping light having a wavelength of 1.56 μm outputted from each of the pumping light sources 471, 473 or without outputting the pumping light having a wavelength of 1.56 μm from the pumping light sources 471, 473. In this case, however, a gain slope occurs when the number of signal channels fluctuates as shown in FIG. 36. FIG. 36 is a chart showing respective output signal spectra at input signal light powers of $P_{in}$=−24 dBm (curve G3610), $P_{in}$=−22 dBm (curve G3620), $P_{in}$=−20 dBm (curve G3630), $P_{in}$=−18 dBm (curve G3640), and $P_{in}$=−16 dBm (curve G3650). Here, the case where $P_{in}$=−14 dBm and $P_{out}$=+18.5 dBm is taken as a reference. In the case where a gain slope such as that shown in FIG. 36 is to be compensated for by adjusting the transmittance of the transmission characteristic variable optical member 450, the transmission characteristic variable optical member 450 is required to change its transmittance by a large amount of 5 dB when the number of signal channels changes from 32 to 8 (or vice versa). If the amount of fluctuation of input signal light power for each signal channel is 8 dB$_{p-p}$, it will be necessary for the transmission characteristic variable optical member 450 to change its transmittance by 10 dB or more. This is disadvantageous in terms of noise characteristic and pumping efficiency, and thus is unfavorable.

In each of the cases where the number of signal channels fluctuates or the input signal light power for each wavelength varies, it will be unfavorable if the power of pumping light having a wavelength of 1.56 μm outputted from the pumping light sources 471, 473 is regulated. This is because of the fact that, as explained with reference to FIGS. 26 to 28 in the foregoing, a high power of +11.6 dBm is necessary for the pumping light having a wavelength of 1.56 μm when the input signal light power for each signal channel is low even if the number of signal channels is 32. When the number of signal channels decreases, the pumping light having a wavelength of 1.56 μm requires a high power of +12 dBm or more. However, commercially available semiconductor laser light sources outputting light having a wavelength of 1.56 µm exhibit a maximum output power of about +13 dBm, which makes it difficult for the pumping light having a wavelength of 1.56 µm to yield a power of +12 dBm or more at the time when it enters the optical amplification fibers 441, 442. As a consequence, it is unfavorable to regulate the power of pumping light having a wavelength of 1.56 µm outputted from the pumping light sources 471, 473.

Therefore, as mentioned above, it is preferred that, when the number of signal channels fluctuates while it is sufficient for the gain to be held constant, the power of pumping light supplied from each pumping light source to the optical amplification fibers 441, 442 be adjusted according to the number of signal channels and that, when the input signal light power for each wavelength or the output signal light power target value fluctuates, the transmittance of transmission characteristic variable optical member 450 be adjusted, so as to regulate the gain spectrum form of signal light amplification. Preferably, the power of pumping light in the wavelength band of 1.42 µm is adjusted, so as to regulate the output signal light power at each wavelength. This decreases the amount of fluctuation in the transmittance of transmission characteristic variable optical member 450, thus yielding excellent noise characteristic and pumping efficiency, and alleviates the value required for the power of pumping light having a wavelength of 1.56 µm outputted from the light sources 471, 473.

Though the pumping light sources 471, 473 are supposed to output pumping light having a wavelength of 1.56 µm in the foregoing, they may output pumping light having a wavelength falling within the wavelength band of 1.55 to 1.65 µm, which yields a pumping efficiency on a par with that in the former case. The pumping light sources 471, 473 may output pumping light in the wavelength band of 1.2 µm as well.

Though the VOA control is explained as a controlling method in the fourth embodiment, the above-mentioned auxiliary pumping light control and FW/BW control, VASC control which will be explained later, and combinations of a plurality of these controlling methods may also be carried out.

Fifth Embodiment of Optical Amplifier

Figure 37:
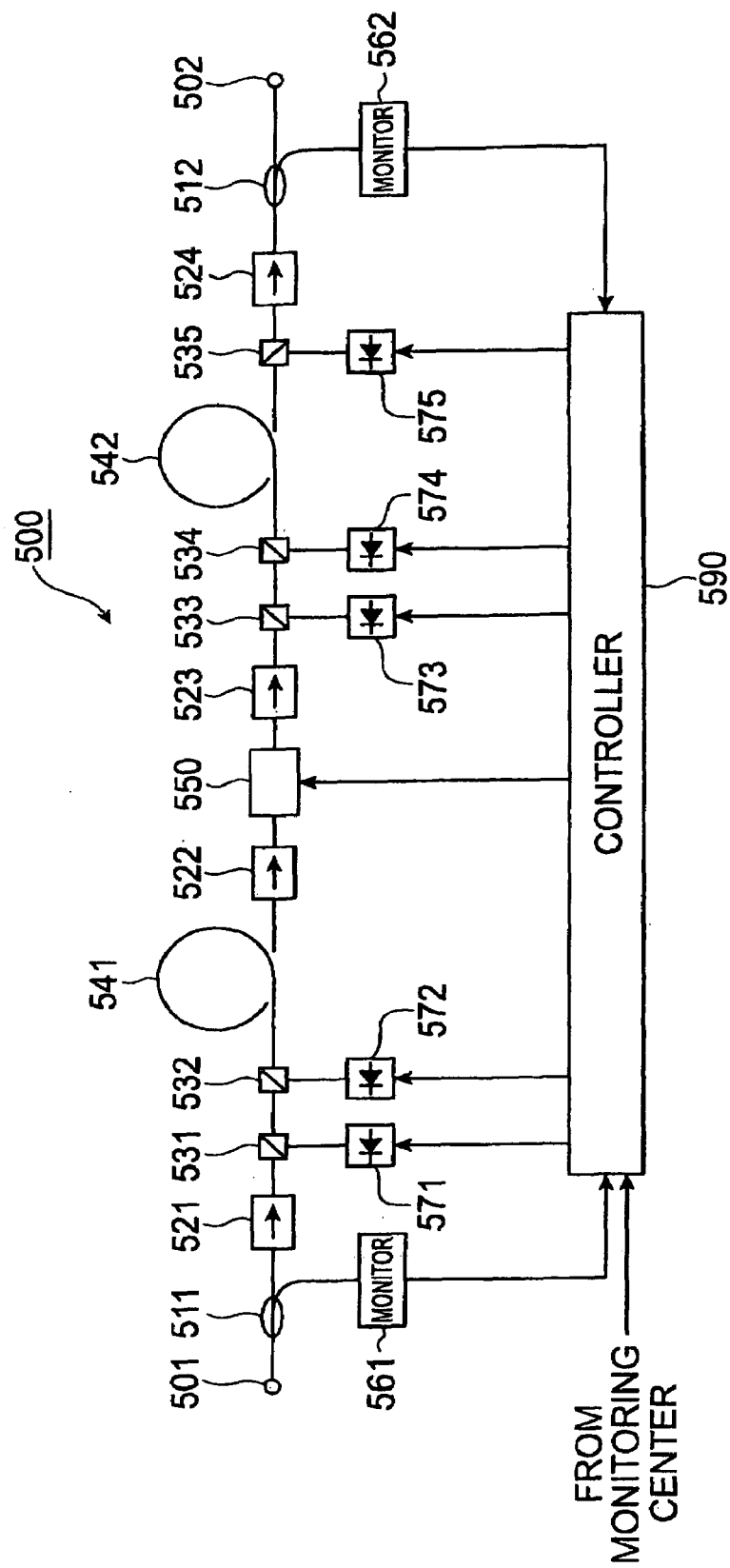
FIG. 37 is a diagram showing the configuration of a fifth embodiment of the optical amplifier according to the present invention.

A fifth embodiment of the optical amplifier according to the present invention will now be explained. FIG. 37 is a diagram showing the optical amplifier 500 according to the fifth embodiment. The optical amplifier 500 shown in this drawing comprises, successively from an input end 501 to an output end 502, an optical branching device 511, an optical isolator 521, an optical coupler 531, an optical coupler 532, an optical amplification fiber 541, an optical isolator 522, a transmission characteristic variable optical member 550, an optical isolator 523, an optical coupler 533, an optical coupler 534, an optical amplification fiber 542, an optical coupler 535, an optical isolator 524, and an optical branching device 512. Also, the optical amplifier 500 comprises a signal light monitor system 531 connected to the optical branching device 511, a signal light monitor system 562 connected to the optical branching device 512, a pumping light source 571 connected to the optical coupler 531, a pumping light source 572 connected to the optical coupler 532, a pumping light source 573 connected to the optical coupler 533, a pumping light source 574 connected to the optical coupler 534, a pumping light source 575 connected to the optical coupler 535, and a controller 590.

The optical amplifier 500 according to the fifth embodiment differs from the optical amplifier 400 according to the fourth embodiment (FIG. 29) in that the transmission characteristic variable optical member 550 is disposed in place of the transmission characteristic variable optical member 450 between the optical isolators 522 and 523, and in that the controller 590 is provided in place of the controller 490. The transmission characteristic variable optical member 550 is VASC in which the slope of loss spectrum at the signal light wavelength is variable, whereas the loss slope is controlled by the controller 590 (VASC control). The controller 590 receives the results of detection (input signal light power, number of signal channels, and output signal light power) obtained by the signal light monitor systems 561, 562 or receives information about the number of signal channels from a monitor center and, according to any of them, regulates the power of pumping light outputted from each of the pumping light sources 571 to 575 and controls the loss slope of the transmission characteristic variable optical member 550.

Figure 38:
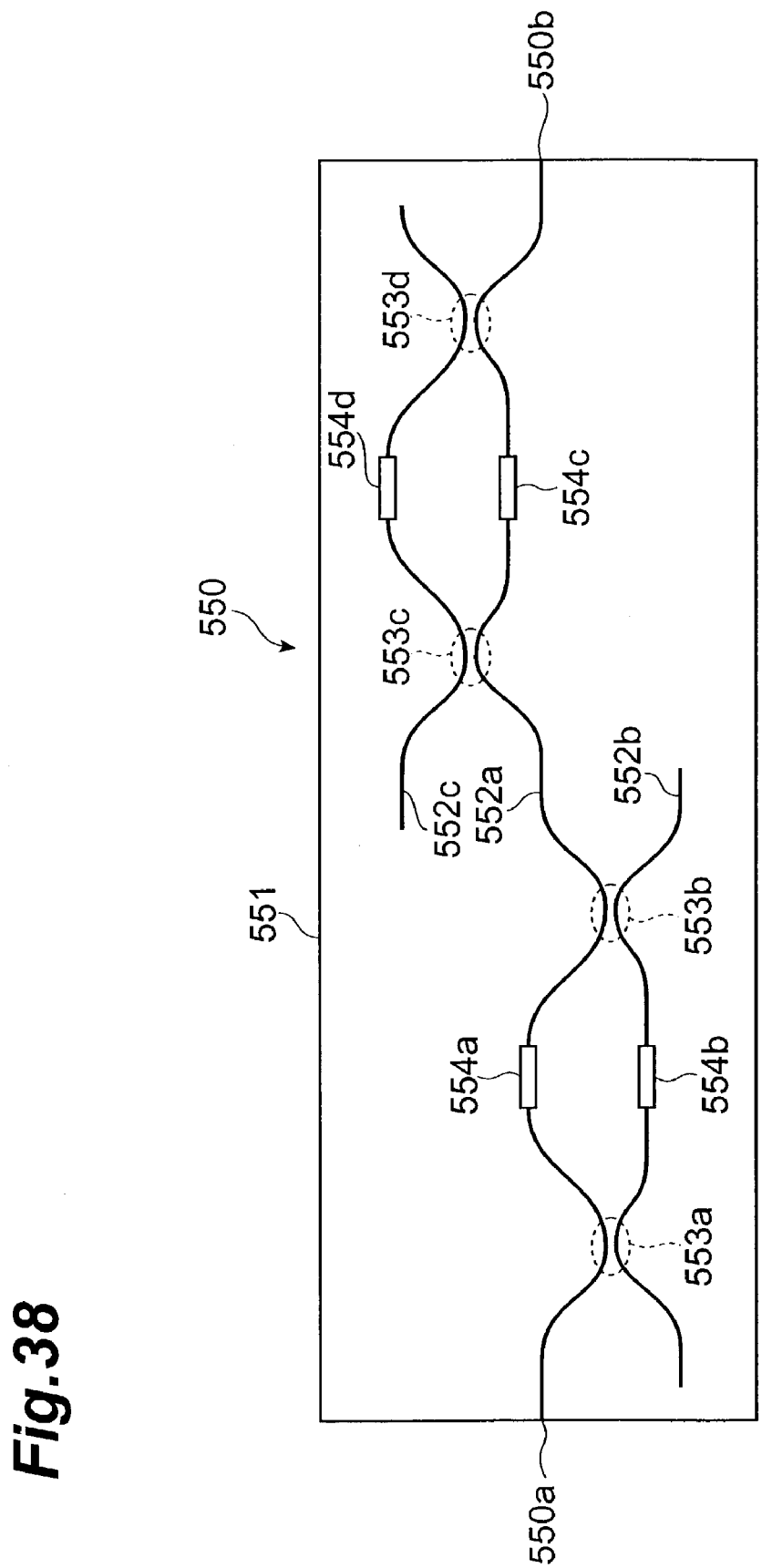
FIG. 38 is a diagram showing a configurational example of the transmission characteristic variable optical member 550 in the optical amplifier 500 shown in FIG. 37.

FIG. 38 is a diagram showing a configurational example of the transmission characteristic variable optical member 550 in the optical amplifier 500 according to the fifth embodiment. The transmission characteristic variable optical member 550 shown in this drawing is one in which three optical waveguides 552a to 552c are formed on a flat substrate 551. The first optical waveguide 552a is formed so as to extend from an input end 550a to an output end 550b which are positioned at respective end faces of the substrate 551. The second optical waveguide 552b is optically coupled with the first optical waveguide 552a at optical couplers 553a, 553b, thus constituting a first Mach-Zehnder interferometer. The third waveguide 552c is optically coupled with the first optical waveguide 552a at optical couplers 553c, 553d, thus constituting a second Mach-Zehnder interferometer. Between the optical couplers 553a and 553b, heaters 554a, 554b are disposed on the first and second optical waveguides 552a, 552b, respectively. Between the optical couplers 553c and 553d, heaters 554c, 554d are disposed on the first and third optical waveguides 552a, 552c, respectively.

In thus configured transmission characteristic variable optical member 550, the difference between the optical path lengths of the first optical waveguide 552a and second optical waveguide 552b between the optical couplers 553a and 553b depends on the temperature adjustment of the first optical waveguide 552a effected by the heater 554a and the temperature adjustment of the second optical waveguide 552b effected by the heater 554b. The difference between the optical path lengths of the first optical waveguide 552a and third optical waveguide 552c between the optical couplers 553c and 553d depends on the temperature adjustment of the first optical waveguide 552a effected by the heater 554a and the temperature adjustment of the third optical waveguide 552c effected by the heater 554d. The transmission characteristic of light from the input end 550a to the output end 550b depends on these optical path length differences and respective optical coupling ratios of optical couplers 553a to 553d.

Figure 39:
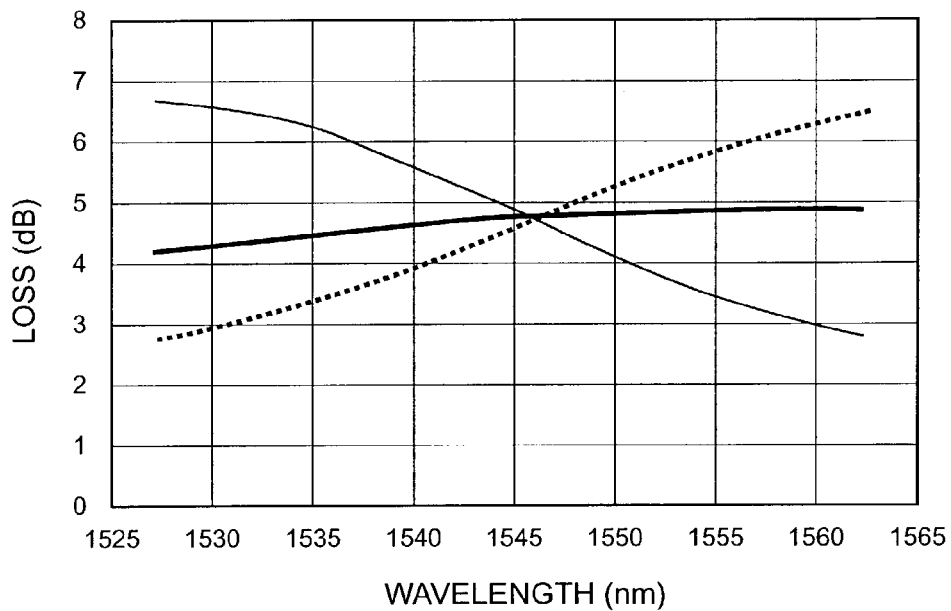
FIG. 39 shows loss spectra of the transmission characteristic variable optical member 550 in the optical amplifier 500 shown in FIG. 37.

FIG. 39 is an example of loss spectra in the transmission characteristic variable optical member 550 in the optical amplifier 500 according to the fifth embodiment. As shown in this chart, the loss spectrum of transmission characteristic variable optical member 550 can be regulated by the temperature adjustment of the first optical waveguide 552a effected by the heaters 554a, 554b. In particular, the loss slope can be changed while keeping the loss at a specific wavelength substantially constant, whereas the loss (unit: dB) is substantially linear with respect to wavelength. Therefore, the transmission characteristic variable optical member 550 is suitably used for compensating for slopes of output spectra having a substantially linear form (FIGS. 22 and 25) in the signal light wavelength region at the time of simple output constant control.

A more specific configuration of the optical amplifier 500 according to the fifth embodiment will now be explained. The signal light fed into the input end 501 of the optical amplifier 500 is assumed to have 32 channels (with intervals of 100 GHz) at the maximum within the wavelength band of 1470.3 to 1493.0 nm, whereas the power in each signal channel is assumed to be −29±4 dBm. On the other hand, the target power of signal light in each channel to be outputted from the output end 502 is assumed to be +3.5 dBm. The optical amplification fiber 541 in the upstream stage is assumed to have a Tm concentration of 2000 ppm and a total length of 20 mm. The optical amplification fiber 542 in the downstream stage is assumed to have a Tm concentration of 2000 ppm and a total length of 25 mm.

The pumping light forwardly supplied from the pumping light source 572 to the upstream optical amplification fiber 541 is assumed to have a wavelength of 1.42 μm and a constant power of 140 mW. The pumping light forwardly supplied from the pumping light source 574 to the downstream optical amplification fiber 542 is assumed to have a wavelength of 1.42 μm and a maximum power of 80 mW. The pumping light backwardly supplied from the pumping light source 575 to the downstream optical amplification fiber 542 is assumed to have a wavelength of 1.42 μm and a maximum power of 150 mW. The powers of pumping light outputted from the pumping light sources 574, 575 are regulated as in the above-mentioned comparative example.

The pumping light forwardly supplied from the pumping light source 571 to the upstream optical amplification fiber 541 is assumed to have a wavelength of 1.56 μm and a constant power of +11 dBm. The pumping light forwardly supplied from the pumping light source 573 to the upstream optical amplification fiber 542 is assumed to have a wavelength of 1.56 μm and a constant power of +11 dBm.

The amount of fluctuation of loss ΔS (dB) in the transmission characteristic variable optical member 550 is regulated according to the following expression:

$$\Delta S = Y \cdot (\Delta P_{in} - \Delta P_{out}) \quad (4)$$

where $\Delta P_{in}$ (dB) is the amount of fluctuation of input signal light power, $\Delta P_{out}$ (dB) is the amount of fluctuation in the target power of output signal light, and Y is a coefficient having a value corresponding to the number of signal channels. The value of coefficient Y decreases as the number of signal channels is smaller. This is because of the fact that the influence of input signal light upon the degree of saturation of Tm ion in the optical amplification fibers 574, 575 becomes weaker as the number of signal channels decreases.

Figure 40:
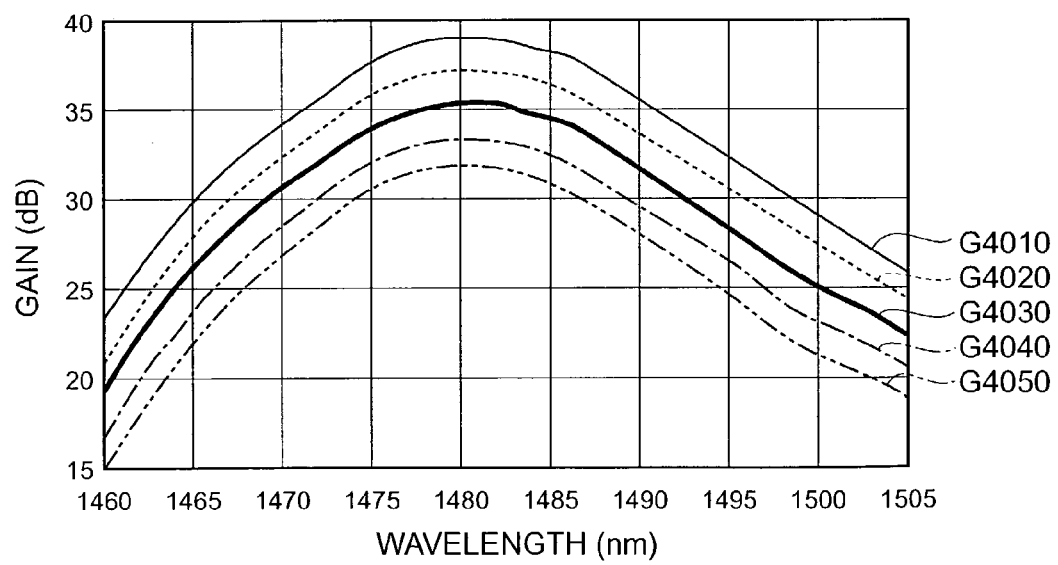
FIG. 40 shows gain spectra of input signal light (having 32 channels) in the optical amplifier 500 shown in FIG. 37.
Figure 41:
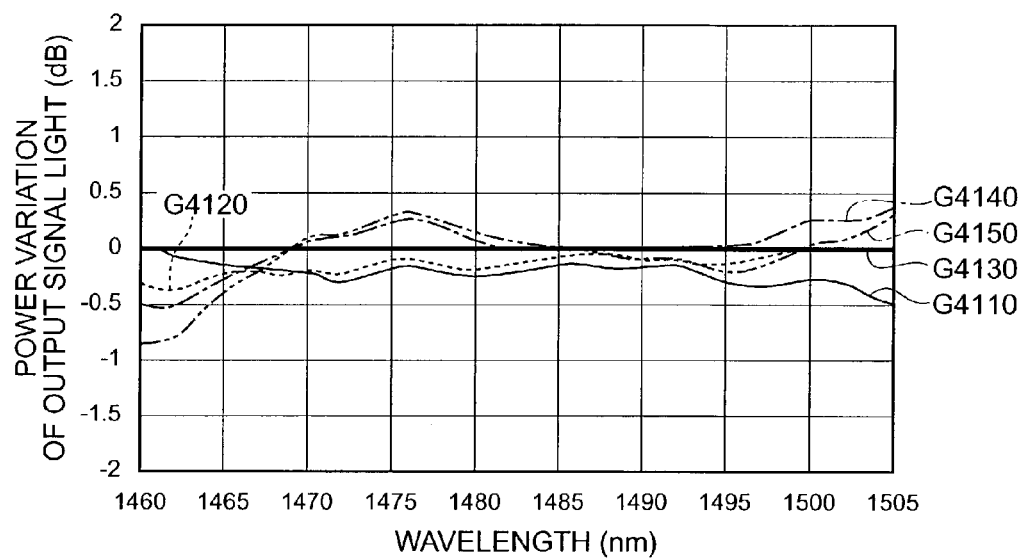
FIG. 41 shows output spectra of input signal light (having 32 channels) in the optical amplifier 500 shown in FIG. 37.
Figure 42:
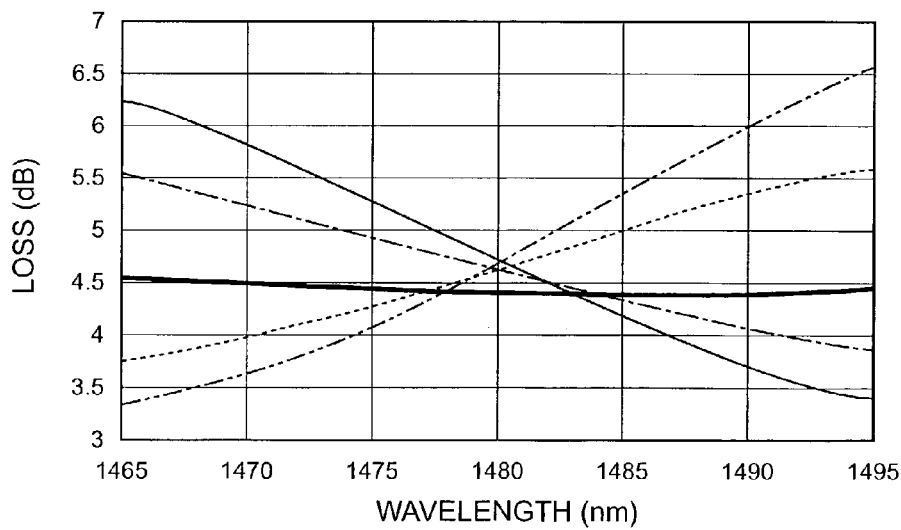
FIG. 42 shows loss spectra of input signal light (having 32 channels) in the transmission characteristic variable optical member 550 in the optical amplifier 500 shown in FIG. 37.

FIG. 40 shows gain spectra of input signal light (having 32 channels) in the optical amplifier 500 according to the fifth embodiment. FIG. 41 shows output spectra of input signal light (having 32 channels) in the optical amplifier 500 according to the fifth embodiment. These charts show gain, output, and loss spectra in each of cases where the total input signal light power is −18 dBm (curves G4010 and G4110 in FIGS. 40 and 41, respectively), −16 dBm (curves G4020 and G4120 in FIGS. 40 and 41, respectively), −14 dBm (curves G4030 and G4130 in FIGS. 32 and 33, respectively), −12 dBm (curves G4040 and G4140 in FIGS. 40 and 41, respectively), and −10 dBm (curves G4050 and G4150 in FIGS. 40 and 41, respectively) when the value of Y is 0.7 while the number of channels of input signal light is 32. As can be seen from FIG. 41, the fluctuation of output signal light power in the signal wavelength region is suppressed so as to fall within the range of ±0.3 dB by the control according to the above-mentioned expression (4).

In the case where both of the number of channels of signal light and the signal light input/output power for each signal channel fluctuate, as explained in the fourth embodiment, it is preferred that, when the number of signal channels fluctuates while it is sufficient for the gain to be held constant, the power of pumping light outputted from the pumping light sources 571, 573 be adjusted according to the number of signal channels and that, when the input signal light power for each wavelength or the output signal light power target value fluctuates, the input signal of transmission characteristic variable optical member 550 be adjusted, so as to regulate the gain spectrum form of signal light. Such VASC control lowers the value required for the power of pumping light in the wavelength band of 1.56 μm outputted from the light sources 571, 573, and decreases the maximum value of loss spectrum slope to be realized in the transmission characteristic variable optical member 550.

If the power of pumping light outputted from the pumping light sources 571, 573 is held constant while no transmission characteristic variable optical member having a variable transmission characteristic is provided in the optical amplifier 500, a gain slope will occur as shown in FIG. 36 if the number of signal channels changes from 32 to 8. On the other hand, the transmission characteristic variable optical member 550 having the configuration shown in FIG. 38 has not only a variable loss slope but also a loss spectrum form shiftable in the wavelength axis direction. Namely, the specific wavelength (cross point) at which the loss is kept substantially constant when the loss slope is changed is variable in the transmission characteristic variable optical member 550. Therefore, if a gain slope occurs with a cross point at a wavelength of 1476 nm as shown in FIG. 36 when the number of signal channels fluctuates, the fluctuation of output signal light power can be suppressed to a low level by changing both of the loss slope and cross point of the transmission characteristic variable optical member 550.

Figure 43:
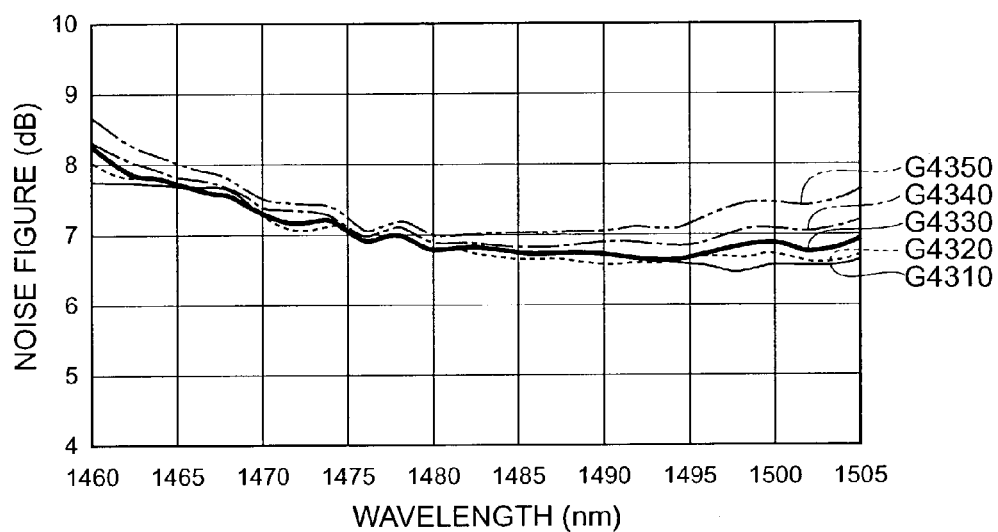
FIG. 43 is a graph showing noise figure characteristics of the optical amplifier 400 (fourth embodiment) shown in FIG. 29.
Figure 44:
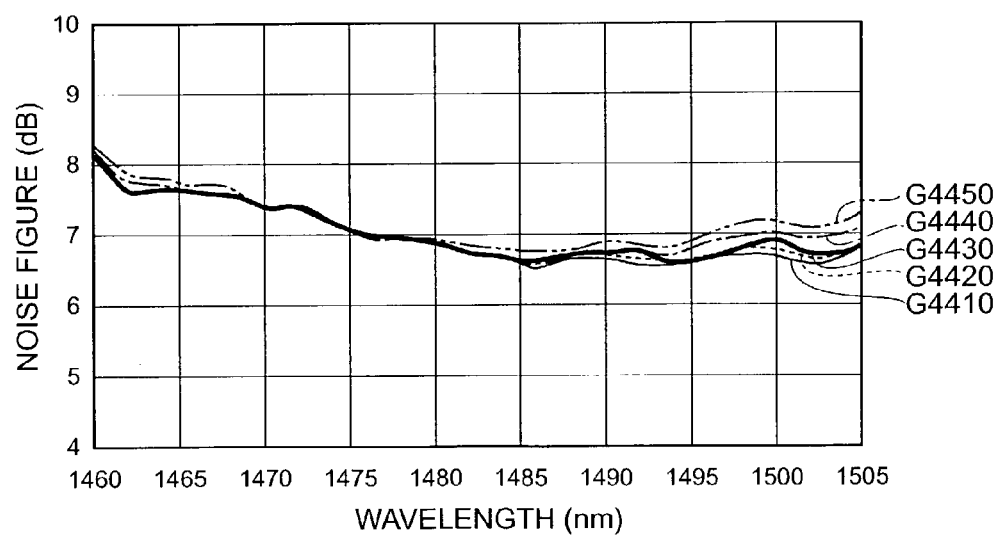
FIG. 44 is a graph showing noise figure characteristics of the optical amplifier 500 (fifth embodiment) shown in FIG. 37.

As compared with the transmission characteristic variable optical member 450 whose transmittance is variable (VOA) in the fourth embodiment, the transmission characteristic variable optical member 550 in which the slope of loss spectrum is thus variable is preferable in that the average loss in the signal wavelength region is small and in that the noise figure is improved when the input signal light power for each signal channel is high. FIG. 43 is a graph showing noise figure characteristics of the optical amplifier 400 according to the fourth embodiment. FIG. 44 is a graph showing noise figure characteristics of the optical amplifier 500 according to the fifth embodiment. These graphs show wavelength dependence characteristics of noise figure when the number of channels of signal light is 32. In FIGS. 43 and 44, curves G4310 and G4410, G4320 and G4420, G4330 and G4430, G4350 and G4450 indicate noise figures (dB) obtained when the input signal light power is −18 dBm, −16 dBm, −14 dBm, −12 dBm, and −10 dBm, respectively. As can be seen when these graphs are compared with each other, the optical amplifier 500 according to the fifth embodiment having the transmission characteristic variable optical member 550 with a variable loss spectrum slope yields a better noise figure when the input signal light power for each signal channel has a large value of −25 dBm. When the width of fluctuation of input signal light power for each signal channel is further greater, the optical amplifier 500 becomes further superior in terms of noise figure.

Though the VASC control is explained as a controlling method in the fifth embodiment, the above-mentioned auxiliary pumping light control, FW/BW control, VOA control, and combinations of a plurality of these controlling methods may be employed as well.

Sixth Embodiment of Optical Amplifier

Figure 45:
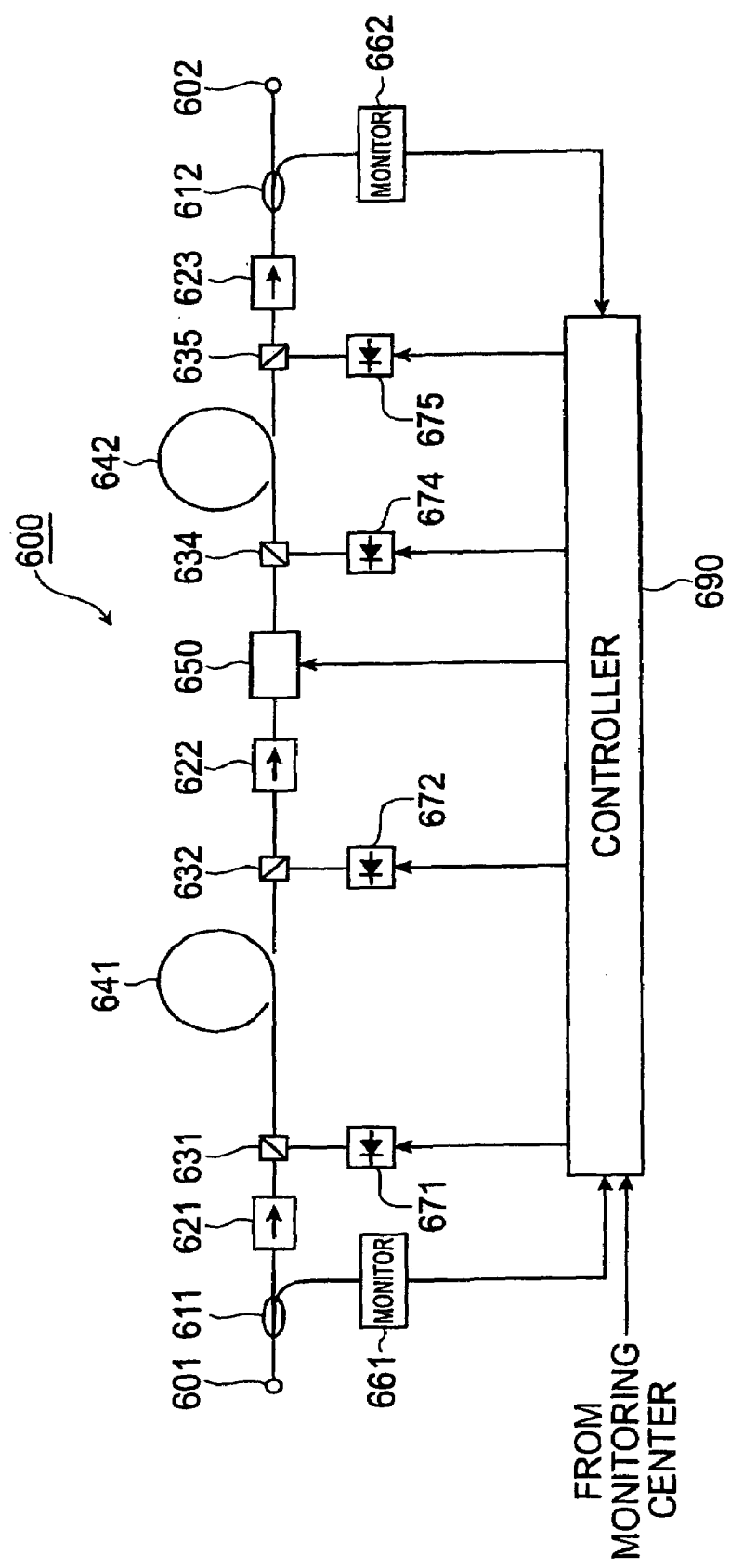
FIG. 45 is a diagram showing the configuration of a sixth embodiment of the optical amplifier according to the present invention.

A sixth embodiment of the optical amplifier according to the present invention will now be explained. FIG. 45 is a diagram of the optical amplifier 600 according to the sixth embodiment. The optical amplifier 600 shown in this drawing comprises, successively from an input end 601 to an output end 602, an optical branching device 611, an optical isolator 621, an optical coupler 631, an optical amplification fiber 641, an optical coupler 632, an optical isolator 622, a transmission characteristic variable optical member 650, an optical coupler 634, an optical amplification fiber 642, an optical coupler 635, an optical isolator 623, and an optical branching device 612. Also, the optical amplifier 600 comprises a signal light monitor system 661 connected to the optical branching device 611, a signal light monitor system 662 connected to the optical branching device 612, a pumping light source 671 connected to the optical coupler 631, a pumping light source 672 connected to the optical coupler 632, a pumping light source 674 connected to the optical coupler 634, a pumping light source 675 connected to the optical coupler 635, and a controller 690.

Each of the optical amplification fibers 641 and 642 is an optical waveguide using fluoride glass or tellurite glass as its host glass, and is a TDF in which at least a core region is doped with Tm element. The optical amplification fibers 641, 642 amplify signal light having a wavelength within a predetermined wavelength band (1455 to 1485 nm) when pumping light is supplied thereto.

The optical couplers 631 to 635 and pumping light sources 671 to 675 act as pumping light supply means for supplying the optical amplification fibers 641, 642 with pumping light. The wavelength band of pumping light is in the bands of 1.05 μm, 1.2 μm, 1.4 μm, and 1.55 to 1.65 μm. As the pumping light sources 671 to 675, semiconductor laser pumping Nd:YLF laser light sources, Nd:YAG laser light sources, Yb laser light sources, semiconductor laser light sources, and the like are used favorably.

The optical coupler 631 outputs toward the optical amplification fiber 641 not only the pumping light outputted from the pumping light source 671 but also the signal light having arrived from the optical isolator 621. The optical coupler 632 outputs toward the optical amplification fiber 641 the pumping light outputted from the pumping light 672, and outputs toward the optical isolator 622 the light having arrived from the optical amplification fiber 641.

The optical coupler 634 outputs toward the optical amplification fiber 642 not only the pumping light outputted from the pumping light source 674 but also the signal light having arrived from the transmission characteristic variable optical member 650. The optical coupler 635 outputs toward the optical amplification fiber 642 the pumping light outputted from the pumping light source 675, and outputs toward the optical isolator 624 the light having arrived from the optical amplification fiber 642.

Each of the optical isolators 621 to 623 transmits light therethrough only in the forward direction (from the input port 601 to the output port 602) but not in the backward direction.

The optical branching device 611 is disposed on the optical path between the input end 601 and the optical isolator 621, causes a part of the power of light fed into the input end 601 to branch out, and outputs thus branched light toward the signal light monitor system 661. The signal light monitor system 661 inputs the light having arrived from the optical branching device 611, thereby detecting the power of signal light fed into the input end 601. The optical branching device 612 is disposed on the optical path between the optical isolator 623 and the output end 602, causes a part of the power of light outputted from the output end 602 to branch out, and outputs thus branched light toward the signal light monitor system 662. The signal light monitor system 662 inputs the light having arrived from the optical branching device 612, thereby detecting the power of signal light outputted from the output end 602. The signal light monitor systems 661, 662 may also detect the number of signal channels. The signal light monitor system 662 is configured similar to that explained in the fourth embodiment.

The signal light monitor systems 661, 662 detect any of the output signal light power, optical amplification gain, and ASE light power at two or more wavelengths in the amplification gain bands of the optical amplification fibers 641, 642. The signal light monitor system 661 may detect the total power of input signal light, whereas the signal light monitor system 662 may detect the total power of output light. Alternatively, the power of spontaneously emitted light laterally released from the optical amplification fibers 641, 642 may be detected, so as to determine the gain of amplification in the optical amplification fibers 641, 642. Also, the number of signal channels may be detected according to the information provided from a monitor center, for example, outside the signal main line.

The transmission characteristic variable optical member 650 is VASC in which the slope of loss spectrum at the signal wavelength is variable, whereas the loss slope is regulated by the controller 690. The transmission characteristic variable optical member 650 is configured similar to that explained in the fifth embodiment. The controller 690 receives the results of detection (input signal light power, number of channels of signal light, and output signal light power) obtained by the signal light monitor systems 661, 662 or receives information about the number of signal channels from the monitor center and, according to any of them, regulates the power of pumping light outputted from each of the pumping light sources 671 to 674 and controls the transmittance of the transmission characteristic variable optical member 650.

In the optical amplifier 600, the pumping light outputted from the pumping light source 671 is forwardly supplied to the optical amplification fiber 641. The pumping light outputted from the pumping light source 672 is backwardly supplied to the optical amplification fiber 641. The pumping light outputted from the pumping light source 674 is forwardly supplied to the optical amplification fiber 642. The pumping light outputted from the pumping light source 675 is backwardly supplied to the optical amplification fiber 642.

The signal light fed into the input end 601 is inputted to the optical amplification fiber 641 by way of the optical branching device 611, optical isolator 621, and optical coupler 631 in succession, and is amplified in the optical amplification fiber 641. The signal light amplified in the optical amplification fiber 641 is fed into the optical amplification fiber 642 by way of the optical coupler 632, optical isolator 622, transmission characteristic variable optical member 650, and optical coupler 634 in succession, and is amplified in the optical amplification fiber 642. The signal light amplified by the optical amplification fiber 642 successively travels the optical coupler 635, optical isolator 623, and optical coupler 612, so as to be outputted from the output end 602.

A part of the power of signal light is caused to branch out by the optical branching device 611, whereas thus branched signal light is fed into the signal light monitor system 661, whereby the power of input signal light is detected by the signal light monitor system 661. Also, a part of the power of signal light is caused to branch out by the optical branching device 612, whereas thus branched signal light is fed into the signal light monitor system 662, whereby the power of output signal light is detected by the signal light monitor system 662. Then, according to the result of detection obtained by the signal light monitor systems 661, 662, the controller 690 adjusts the power of pumping light outputted from each of the pumping light sources 671 to 674 and regulates the loss slope of the transmission characteristic variable optical member 650, thus controlling the gain of signal light amplification or output signal light power in the optical amplifier 600.

A more specific configuration of the optical amplifier 600 according to the sixth embodiment will now be explained. The signal light fed into the input end 601 of the optical amplifier 600 is assumed to have 32 channels (with intervals of 100 GHz) at the maximum within the wavelength band of 1457.4 to 1479.7 nm, whereas the power in each signal channel is assumed to be −29±4 dBm. On the other hand, the target power of signal light in each channel to be outputted from the output end 602 is assumed to be +3.5 dBm. The optical amplification fiber 641 in the upstream stage is assumed to have a Tm concentration of 2000 ppm and a total length of 20 mm. The optical amplification fiber 642 in the downstream stage is assumed to have a Tm concentration of 2000 ppm and a total length of 25 mm.

The pumping light forwardly supplied from the pumping light source 671 to the upstream optical amplification fiber 641 is assumed to have a wavelength of 1.05 μm and a constant power of 120 mW. The pumping light backwardly supplied from the pumping light source 672 to the upstream optical amplification fiber 641 is assumed to have a wavelength of 1.05 μm and a constant power of 40 mW. The pumping light forwardly supplied from the pumping light source 674 to the downstream optical amplification fiber 642 is assumed to have a wavelength of 1.05 μm and a maximum power of 100 mW. The pumping light backwardly supplied from the pumping light source 675 to the downstream optical amplification fiber 642 is assumed to have a wavelength of 1.50 μm and a maximum power of 200 mW. The powers of pumping light outputted from the pumping light sources 674, 675 are regulated as in the above-mentioned comparative example (FIG. 20). Each of them can be realized by a single semiconductor laser light source developed in recent years. Since the pumping light outputted from the pumping light source 671 and that outputted from the pumping light source 672 have the same wavelength while yielding respective constant powers, whose sum is 160 mW, a single pumping light source and an optical branching device (with a branching ratio of 3:1) may be provided in place of the two pumping light sources 671, 672, such that the pumping light outputted from the single pumping light source is split into two by the optical branching device so as to be outputted to the optical couplers 631, 632, respectively. The amount of fluctuation of loss slope ΔS (dB) in the transmission characteristic variable optical member 650 is regulated according to the above-mentioned expression (4).

Figure 46:
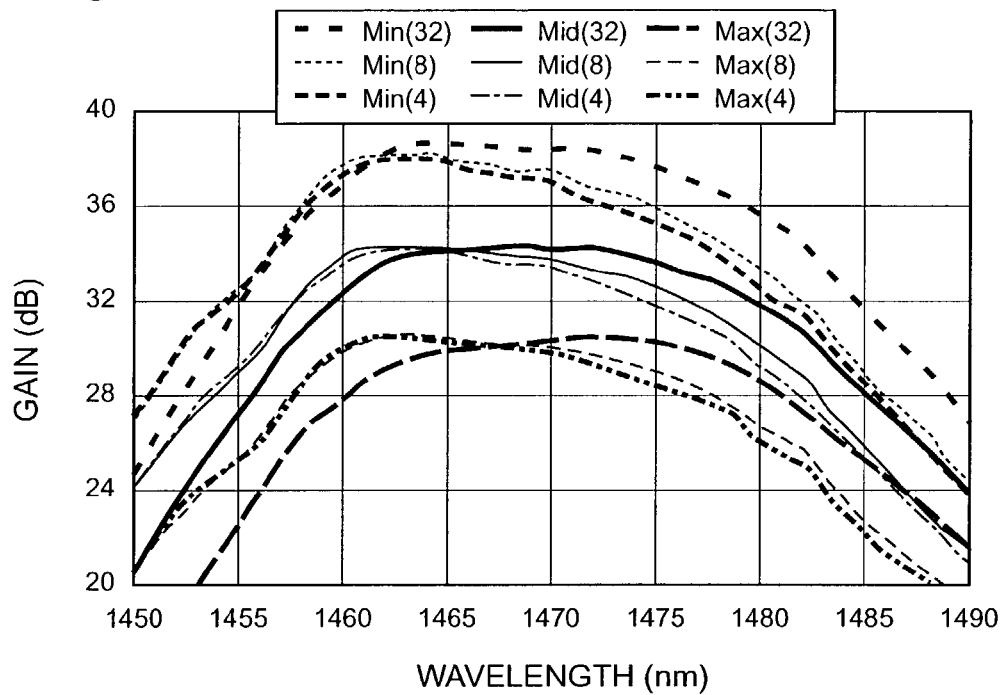
FIG. 46 shows gain spectra of the optical amplifier 600 shown in FIG. 45.
Figure 47:
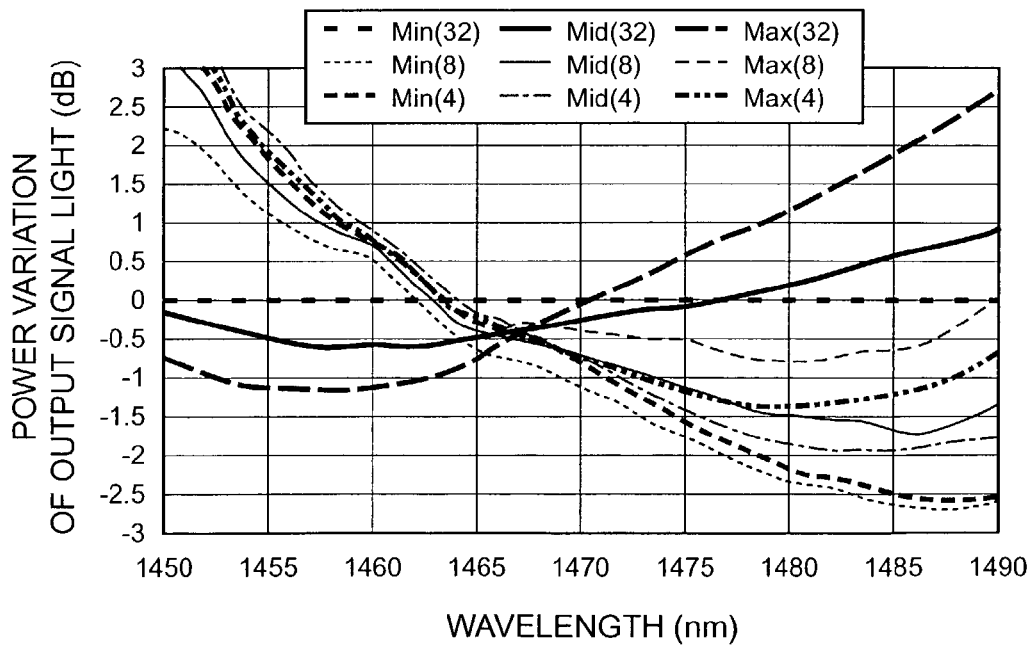
FIG. 47 shows output spectra of the optical amplifier 600 shown in FIG. 45.

FIG. 46 shows gain spectra of the optical amplifier 600 according to the sixth embodiment. FIG. 47 shows output spectra of the optical amplifier 600 according to the sixth embodiment. Here, the loss slope of the transmission characteristic variable optical member 650 is made flat regardless of the number of signal channels. In these charts, Min, Mid, and Max indicate respective cases where the input signal light power for each signal channel is −33 dBm, −29 dBm, and −25 dBm. The parenthesized values following Min, Mid, and Max indicate the numbers of signal channels. For example, Min(32) indicates the case where the input signal light power for each signal channel is −33 dBm while the number of channels is 32, Mid(8) indicates the case where the input signal light power for each signal channel is −29 dBm while the number of channels is 8, and Min(4) indicates the case where the input signal light power for each signal channel is −25 dBm while the number of channels is 4. As can be seen from these charts, the output spectrum obtained by using pumping light having a wavelength of 1.05 μm can be approximated by a line within the signal light wavelength region, though it is not so linear as compared with that in the case using pumping light having a wavelength of 1.45 μM.

Figure 48:
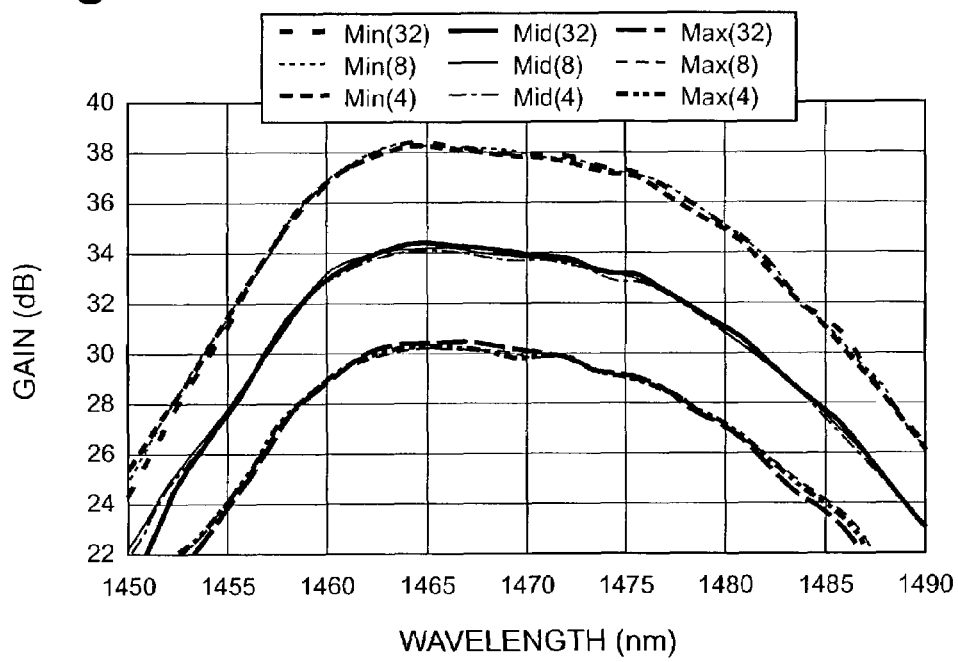
FIG. 48 shows gain spectra of the optical amplifier 600 shown in FIG. 45.
Figure 49:
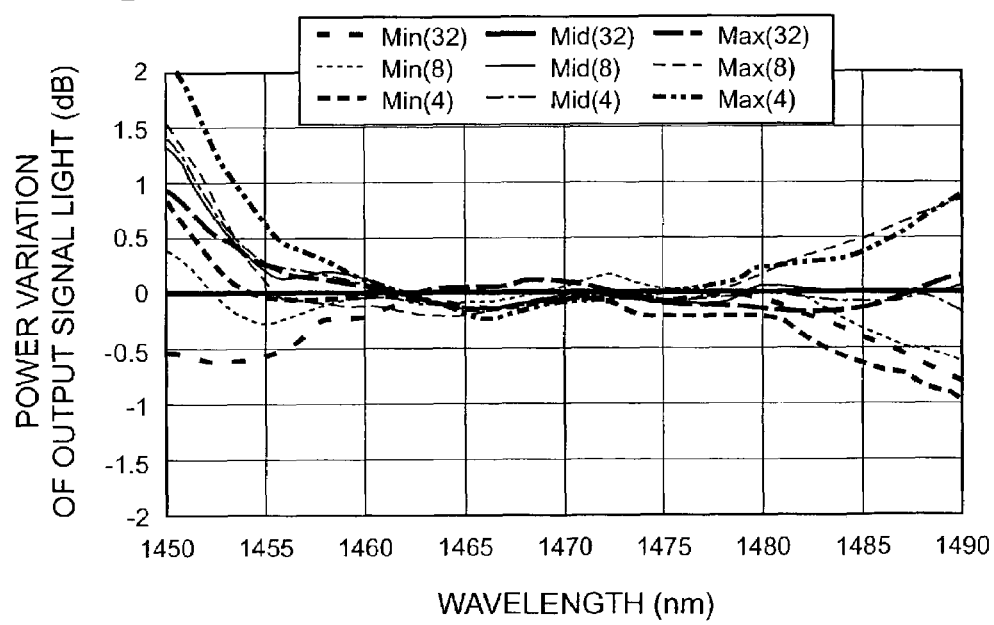
FIG. 49 shows output spectra of the optical amplifier 600 shown in FIG. 45.
Figure 50:
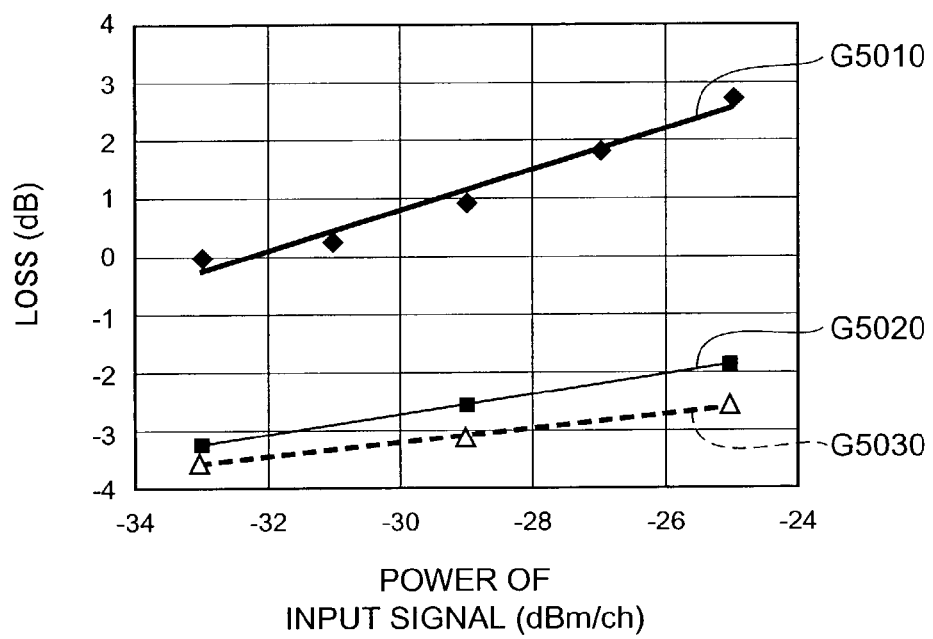
FIG. 50 is a graph showing loss characteristics of a transmission characteristic variable optical member 650 in the optical amplifier 600 shown in FIG. 45.
Figure 51:
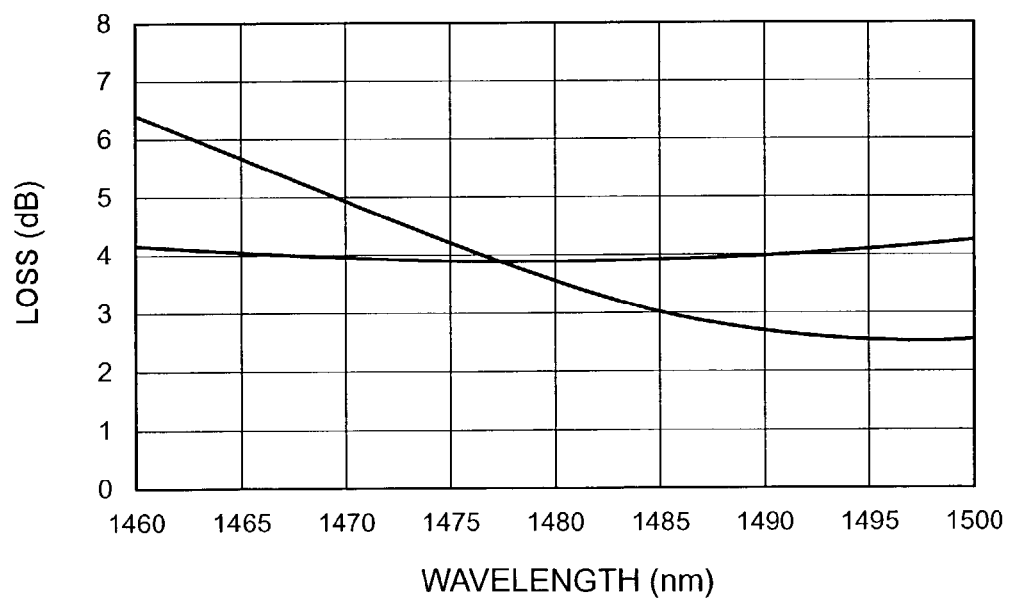
FIG. 51 is a graph showing loss characteristics of the transmission characteristic variable optical member 650 in the optical amplifier 600 shown in FIG. 45.

FIG. 48 shows gain spectra of the optical amplifier 600 according to the sixth embodiment. FIG. 49 shows output spectra of the optical amplifier 600 according to the sixth embodiment. FIG. 50 shows loss characteristics of the transmission characteristic variable optical member 650 in the optical amplifier 600 according to the sixth embodiment. In FIG. 50, curves G5010, G5020, and G5030 indicate respective losses obtained when the input signal light power has minimum values of −33 dBm, −29 dBm, and −25 dBm. Here, the loss slope of the transmission characteristic variable optical member 650 is adjusted according to the number of signal channels, and is set such that the loss slope becomes flat when the input signal light power is at the minimum value of −33 dBm while the number of signal channels is at the maximum channel number of 32. The value of coefficient Y in the above-mentioned expression (4) is 0.35, 0.17, and 0.13 when the number of signal channels is 32, 8, and 4, respectively. As can be seen from these charts, the fluctuation of output signal light power in the signal wavelength region is suppressed by the control according to the above-mentioned expression (4) so as to fall within the range of ±0.3 dB in the whole fluctuation range for each of the input signal light power and the number of signal channels. Here, no pumping light in the wavelength bands of 1.2 μm and 1.55 to 1.65 μm is necessary.

Since the wavelength shift of cross point in output spectrum slope fluctuations such as that seen in the case using pumping light in the wavelength band of 1.4 μm is milder in the case using pumping light in the wavelength band of 1.05 μm as in the sixth embodiment, the wavelength shift of cross point in the transmission characteristic variable optical member 650 is hardly necessary. When the transmission characteristic variable optical member 650 employed has a configuration in which two Mach-Zehnder interferometers are connected in series as shown in FIG. 38, its transmission characteristic can be realized by superimposition of sinusoidal functions. Therefore, the transmission characteristic variable optical member 650 can realize nonlinear loss spectra such as those shown in FIG. 51, thus making it possible to compensate form on linear output spectra such as those shown in FIG. 47.

Though the VASC control is explained as a controlling method in the sixth embodiment, the above-mentioned auxiliary pumping light control, FW/BW control, VOA control, and combinations of a plurality of these controlling methods may be employed as well.

Seventh Embodiment of Optical Amplifier

Figure 52:
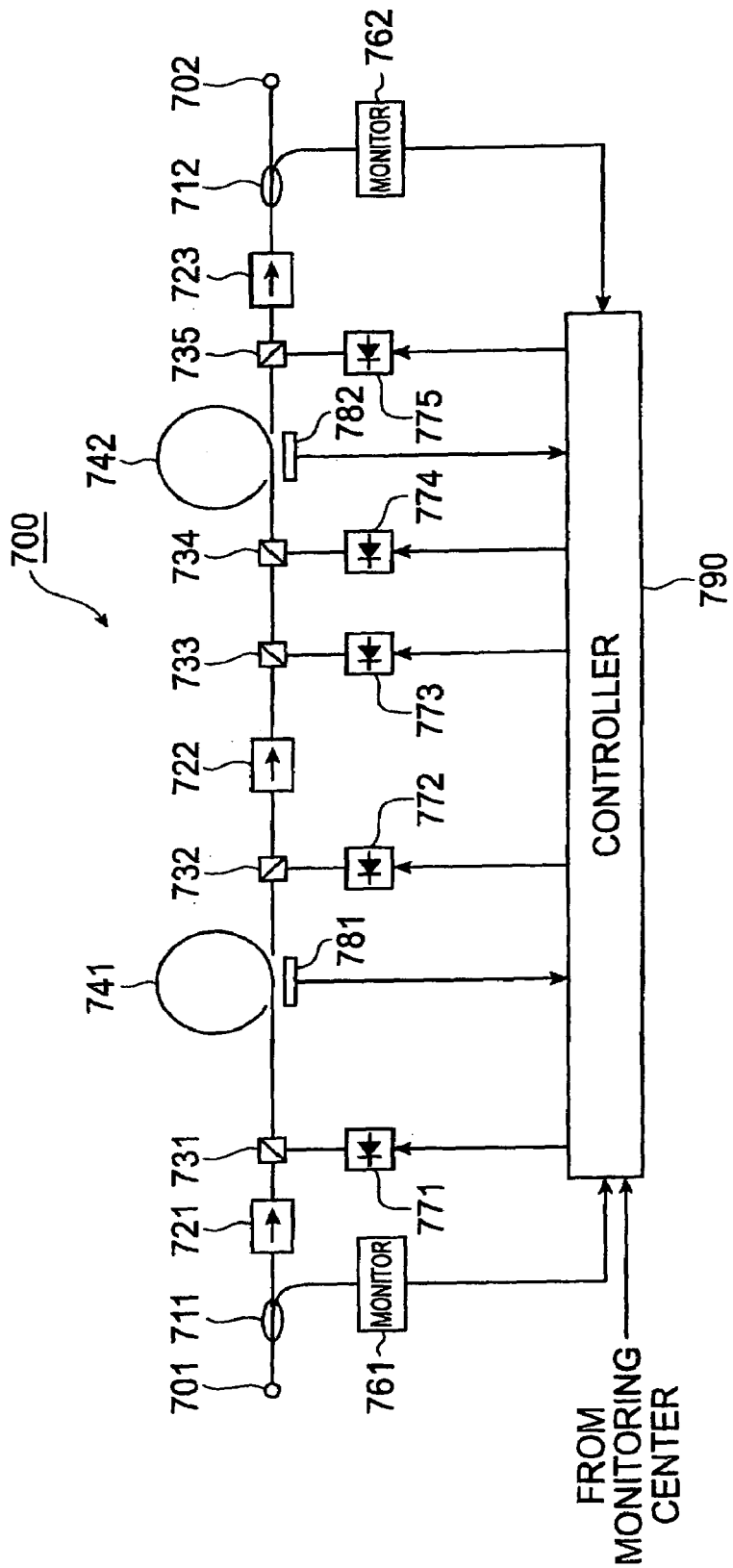
FIG. 52 is a diagram showing the configuration of a seventh embodiment of the optical amplifier according to the present invention.

A seventh embodiment of the optical amplifier according to the present invention will now be explained. FIG. 52 is a diagram of the optical amplifier 700 according to the seventh embodiment. The optical amplifier 700 shown in this drawing comprises, successively from an input end 701 to an output end 702, an optical branching device 711, an optical isolator 721, an optical coupler 731, an optical amplification fiber 741, an optical coupler 732, an optical isolator 722, an optical coupler 733, an optical coupler 734, an optical amplification fiber 742, an optical coupler 735, an optical isolator 723, and an optical branching device 712. Also, the optical amplifier 700 comprises a signal light monitor system 761 connected to the optical branching device 711, a signal light monitor system 762 connected to the optical branching device 712, a pumping light source 771 connected to the optical coupler 731, a pumping light source 772 connected to the optical coupler 732, a pumping light source 773 connected to the optical coupler 733, a pumping light source 774 connected to the optical coupler 734, a pumping light source 775 connected to the optical coupler 735, a temperature detecting section 781 for detecting the temperature of the optical amplification fiber 741 or its vicinity, a temperature detecting section 782 for detecting the temperature of the optical amplification fiber 742 or its vicinity, and a controller 790.

The optical amplifier 700 according to the seventh embodiment differs from the optical amplifier 600 according to the sixth embodiment (FIG. 45) in that no transmission characteristic variable optical member is provided, in that the optical coupler 733 is disposed between the optical isolator 722 and the optical coupler 734, in that the pumping light source 773 connected to the optical coupler 733 is provided, in that the temperature detecting sections 781, 782 are provided, and in that the controller 790 is provided in place of the controller 690. The controller 790 receives the results of detection (input signal light power, number of signal channels, and output signal light power) obtained by the signal light monitor systems 761, 762 and the results of temperature detection obtained by the temperature detecting sections 781, 782 or information about the number of signal channels from a monitor center and, according to any of them, regulates the power of pumping light outputted from each of the pumping light sources 771 to 775.

A more specific configuration of the optical amplifier 700 according to the seventh embodiment will now be explained. The signal light fed into the input end 701 of the optical amplifier 700 is assumed to have 32 channels (with intervals of 100 GHz) at the maximum within the wavelength band of 1462.4 to 1484.9 nm, whereas the power in each signal channel is assumed to be −25±4 dBm. On the other hand, the target power of signal light in each channel to be outputted from the output end 702 is assumed to be +3.5 dBm. The optical amplification fiber 741 in the upstream stage is assumed to have a Tm concentration of 2000 ppm and a total length of 20 mm. The optical amplification fiber 742 in the downstream stage is assumed to have a Tm concentration of 2000 ppm and a total length of 25 mm.

The pumping light forwardly supplied from the pumping light source 771 to the upstream optical amplification fiber 741 is assumed to have a wavelength of 1.05 µm and a constant power of 120 mW. The pumping light backwardly supplied from the pumping light source 772 to the upstream optical amplification fiber 741 is assumed to have a wavelength of 1.05 µm and a constant power of 40 mW. The pumping light forwardly supplied from the pumping light source 773 to the downstream optical amplification fiber 742 is assumed to have a wavelength of 1.56 µm. The pumping light forwardly supplied from the pumping light source 774 to the downstream optical amplification fiber 742 is assumed to have a wavelength of 1.05 µm and a maximum power of 100 mW. The pumping light backwardly supplied from the pumping light source 775 to the downstream optical amplification fiber 742 is assumed to have a wavelength of 1.05 µm and a maximum power of 200 mW. The respective powers of pumping light outputted from the pumping light sources 773 to 775 are regulated as in the above-mentioned comparative example. A single pumping light source and an optical branching device (with a branching ratio of 3:1) may be provided in place of the two pumping light sources 771, 772, such that the pumping light outputted from the single pumping light source is split into two by the optical branching device so as to be outputted to the optical couplers 731, 732, respectively.

Figure 53:
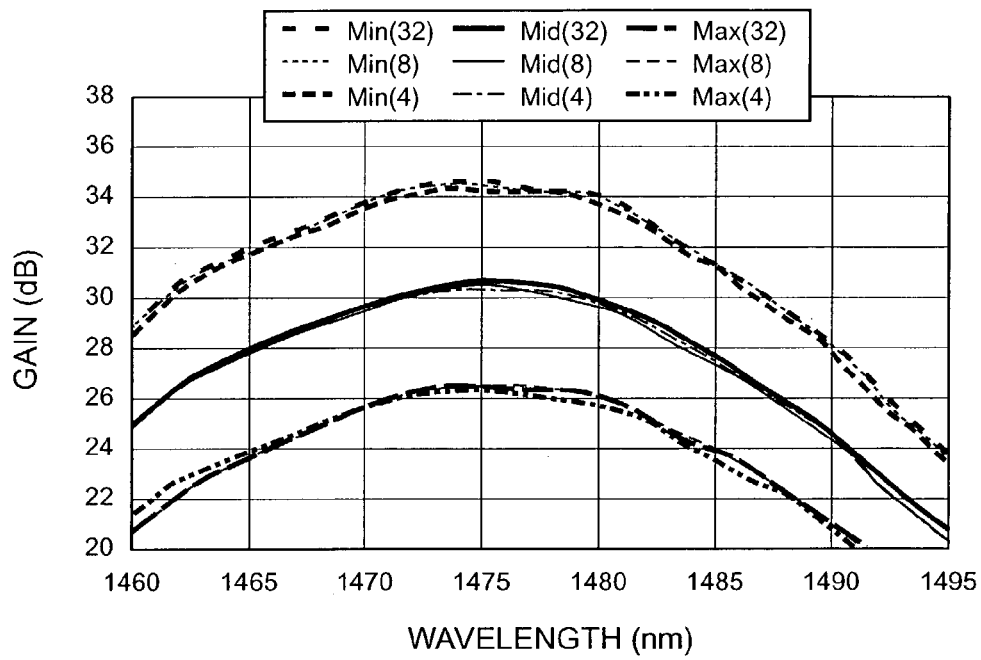
FIG. 53 shows gain spectra of the optical amplifier 700 shown in FIG. 52.
Figure 54:
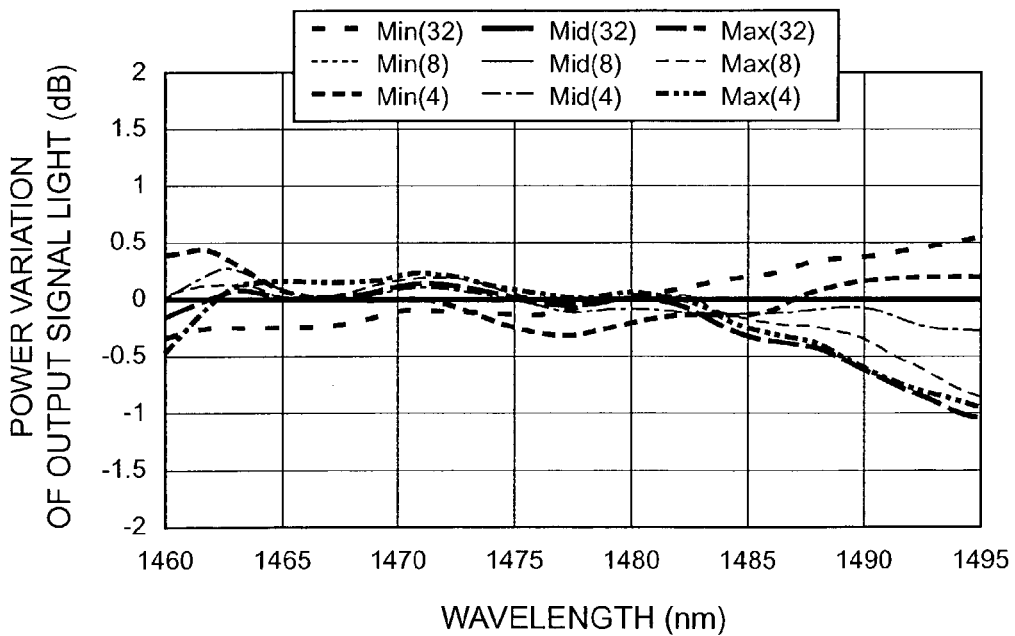
FIG. 54 shows output spectra of the optical amplifier 700 shown in FIG. 52.

FIG. 53 shows gain spectra of the optical amplifier 700 according to the seventh embodiment. FIG. 54 shows output spectra of the optical amplifier 700 according to the seventh embodiment. In these charts, Min, Mid, and Max indicate respective cases where the input signal light power for each signal channel is −33 dBm, −29 dBm, and −25 dBm. The parenthesized values following Min, Mid, and Max indicate the numbers of signal channels. As can be seen from these charts, the fluctuation of output signal light power in the signal wavelength region is suppressed so as to fall within the range of ±0.3 dB in the whole fluctuation range for each of the input signal light power and the number of signal channels.

Figure 55:
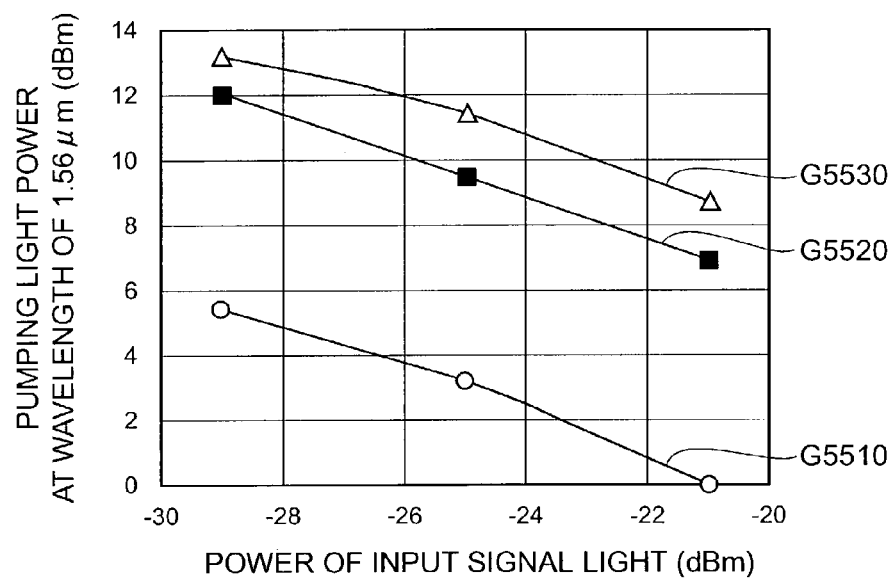
FIG. 55 is a graph showing relationships between the input signal light power and the power of pumping light at a wavelength of 1.56 µm forwardly supplied from a pumping light source 773 to its downstream optical amplification fiber 742 in the optical amplifier 700 shown in FIG. 52.

FIG. 55 is a graph showing the relationship between the power of pumping light having a wavelength of 1.56 µm forwardly supplied from the pumping light source 773 to the downstream optical amplification fiber 742 in the optical amplifier 700 according to the seventh embodiment and the input signal light power. In FIG. 55, curves G5510, G5520, and G5530 indicate respective cases where the number of signal channels is 32, 8, and 4. Here, the power of pumping light having a wavelength of 1.56 µm is set so as to become zero when the input signal light power is at the maximum value of −21 dBm (i.e., the saturation in the optical amplification fiber 742 is maximized) while the number of channels of signal light is at the maximum channel number of 32. If the input signal light power is at the minimum value of −29 dBm while the number of signal channels is at the minimum channel number of 4, the required power of pumping light having a wavelength of 1.56 µm to be supplied to the optical amplification fiber 742 will be the maximum value of +11.3 mW. Commercially available semiconductor laser light sources outputting pumping light having a wavelength of 1.56 µm at present include those yielding a maximum output power of +13 dBm. In view of the sum of insertion losses of two optical couplers (somewhat exceeding 1 dB), a pumping light power of +11.3 dBm at the input point to the optical amplification fiber 742 can be realized.

Figure 56A:
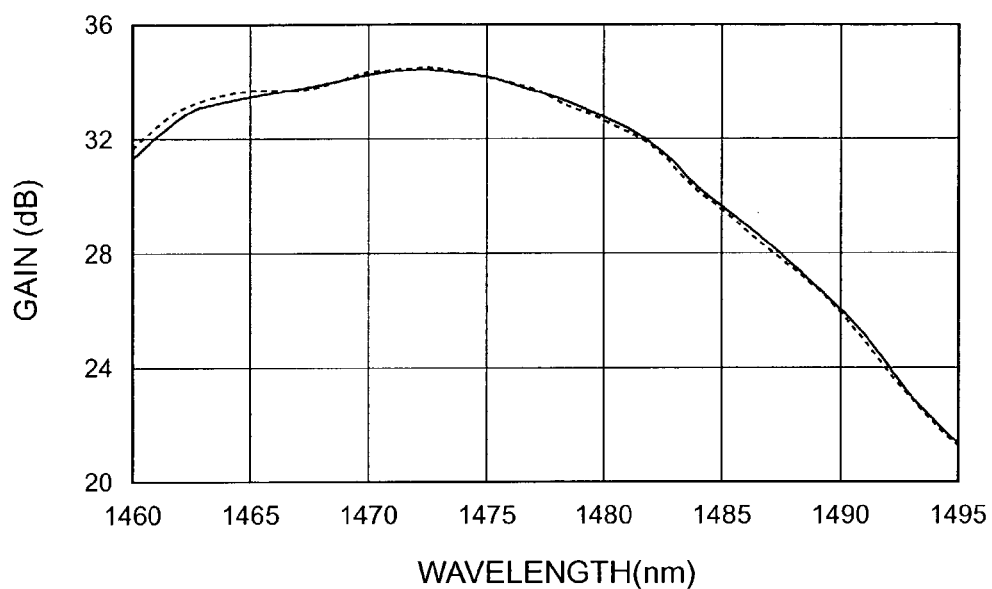
FIGS. 56A and 56B are graphs showing gain characteristics and noise figure characteristics of the optical amplifier 700 shown in FIG. 52, respectively.
Figure 56B:
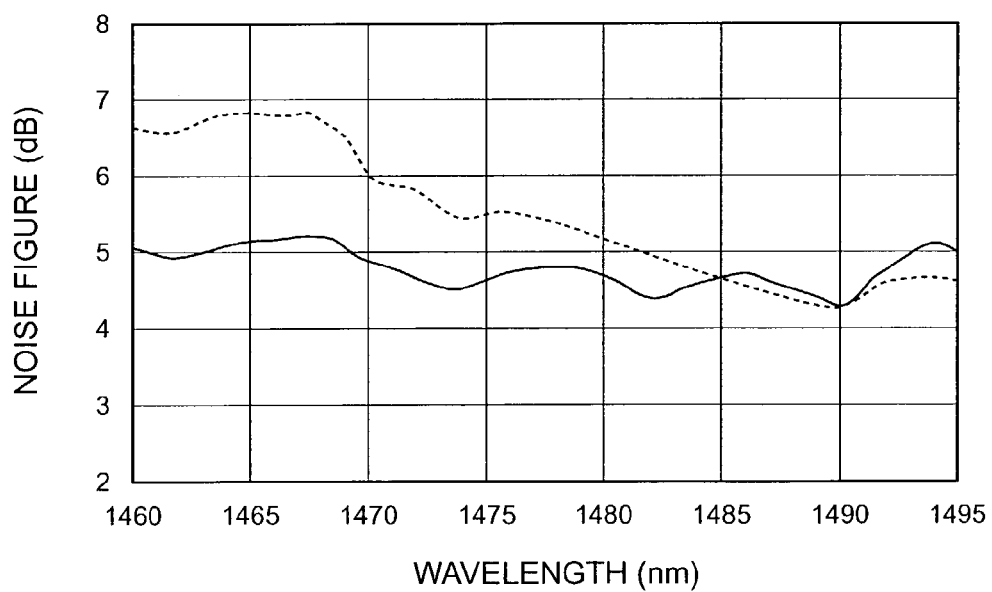

Here, the pumping light having a wavelength of 1.56 µm is preferably supplied to the downstream optical amplification fiber 742 rather than the upstream optical amplification fiber 741. FIGS. 56A and 56B are graphs showing gain and noise figure characteristics of the optical amplifier 700 according to the seventh embodiment. FIG. 56A shows gain characteristics, whereas FIG. 56B shows noise figure characteristics. Each of these graphs shows the case (solid line)

where pumping light having a wavelength of 1.56 μm at a power of 7.3 mW is supplied only to the downstream optical amplification fiber 742 and the case (broken line) where pumping light having a wavelength of 1.56 μm at a power of 3.3 mW is supplied to each of the optical amplification fibers 741, 742, when the input signal light power for each signal channel is −29 dBm while the number of signal channels is 8. As can be seen from these graphs, the noise figure is lower in the case where the pumping light having a wavelength of 1.56 μm is supplied only to the downstream optical amplification fiber 742, though their gain characteristics substantially coincide with each other.

Figure 57A:
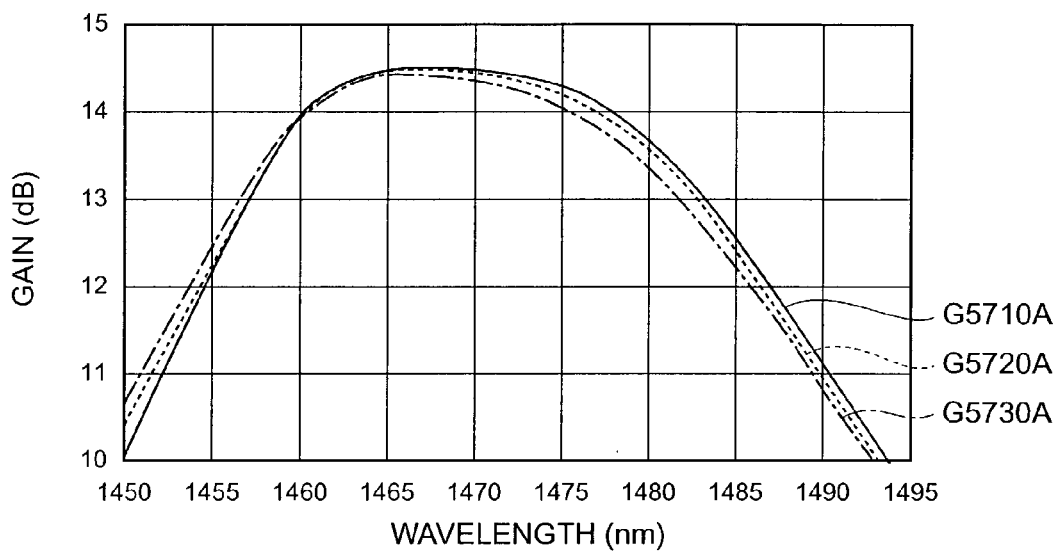
FIGS. 57A and 57B are graphs showing temperature dependence characteristics of the optical amplifier 700 shown in FIG. 52.
Figure 57B:
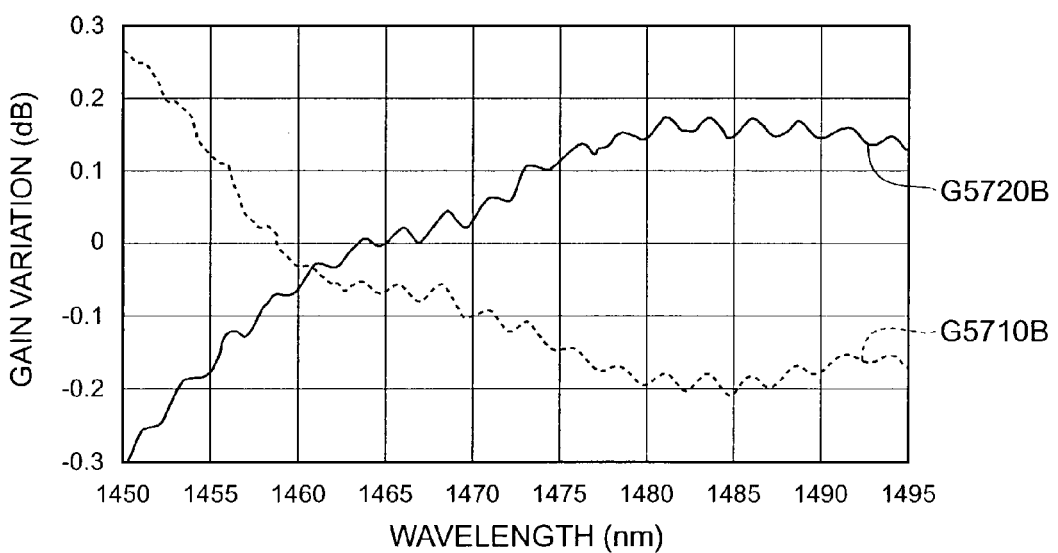
Figure 58:
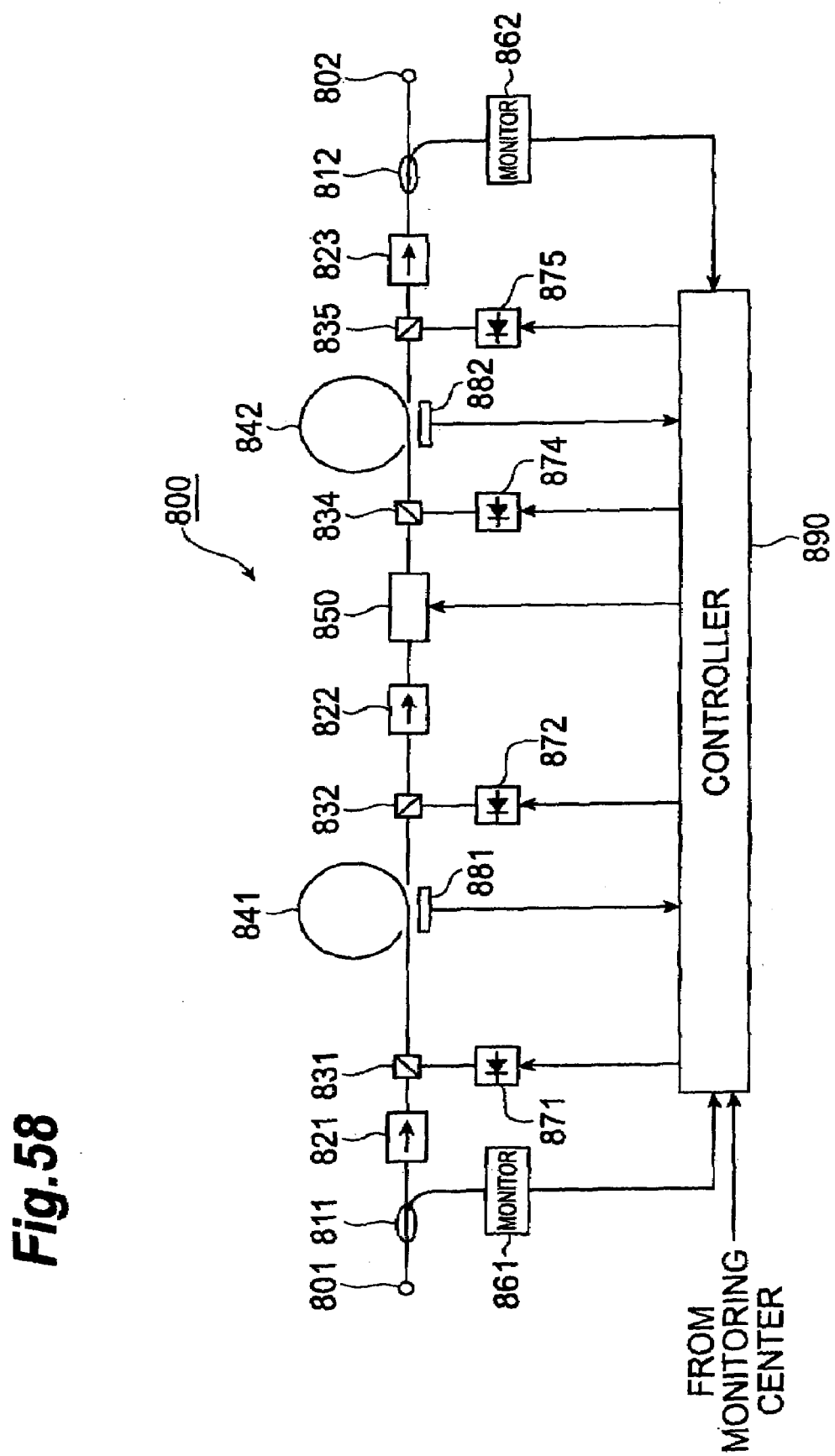
FIG. 58 is a diagram showing the configuration of an eighth embodiment of the optical amplifier according to the present invention.

FIGS. 57A and 57B are graphs showing the temperature dependence of gain characteristic in the optical amplifier 700 according to the seventh embodiment. FIG. 57A shows respective gain characteristics obtained when the temperature of the optical amplification fibers 741, 742 is 5° C. (curve G5710A), 25° C. (curve G5720A), and 55° C. (curve G5730A). FIG. 57B shows respective deviations of gain characteristic at temperatures of 5° C. (curve G5720B) and 55° C. (curve G5710B) with reference to the case where the temperature is 25° C. As can be seen from these charts, the gain spectrum changes when the temperature of optical amplification fibers 741, 742 fluctuates. Therefore, when the power of pumping light outputted from each of the pumping light sources 771 to 775 is adjusted not only according to the input signal light power and the number of signal channels but also according to the temperatures of optical amplification fibers 741, 742 detected by the temperature detecting sections 781, 782, the magnitude of gain and the gain spectrum form can be regulated. This alleviates the temperature dependence of gain characteristic.

Eighth Embodiment of Optical Amplifier

An eighth embodiment of the optical amplifier according to the present invention will now be explained. FIG. 8 is a diagram showing the optical amplifier 800 according to the eighth embodiment. The optical amplifier 800 shown in this drawing comprises, successively from an input end 801 to an output end 802, an optical branching device 811, an optical isolator 821, an optical coupler 831, an optical amplification fiber 841, an optical coupler 832, an optical isolator 822, a transmission characteristic variable optical member 850, an optical coupler 834, an optical amplification fiber 842, an optical coupler 835, an optical isolator 823, and an optical branching device 812. Also, the optical amplifier 800 comprises a signal light monitor system 861 connected to the optical branching device 811, a signal light monitor system 862 connected to the optical branching device 812, a pumping light source 871 connected to the optical coupler 831, a pumping light source 872 connected to the optical coupler 832, a pumping light source 874 connected to the optical coupler 834, a pumping light source 875 connected to the optical coupler 835, a temperature detecting section 881 for detecting the temperature of the optical amplification fiber 841 or in its vicinity, a temperature detecting section 882 for detecting the temperature of the optical amplification fiber 842 or in its vicinity, and a controller 890.

The optical amplifier 800 according to the eighth embodiment differs from the optical amplifier 600 according to the sixth embodiment (FIG. 45) in that the temperature detecting sections 881, 882 are provided, and in that the controller 890 is provided in place of the controller 690. The controller 890 receives the results of detection (input signal light power, number of signal channels, and output signal light power) obtained by the signal light monitor systems 861, 862 and the results of temperature detection obtained by the temperature detecting sections 881, 882 or information about the number of signal channels from a monitor center and, according to any of them, regulates the power of pumping light outputted from each of the pumping light sources 871 to 875 and controls the loss slope of the transmission characteristic variable optical member 850. In the optical amplifier 800 according to the eighth embodiment, a control operation similar to that explained in each of the sixth and seventh embodiments is carried out.

Embodiment of Optical Communication System

Figure 59:
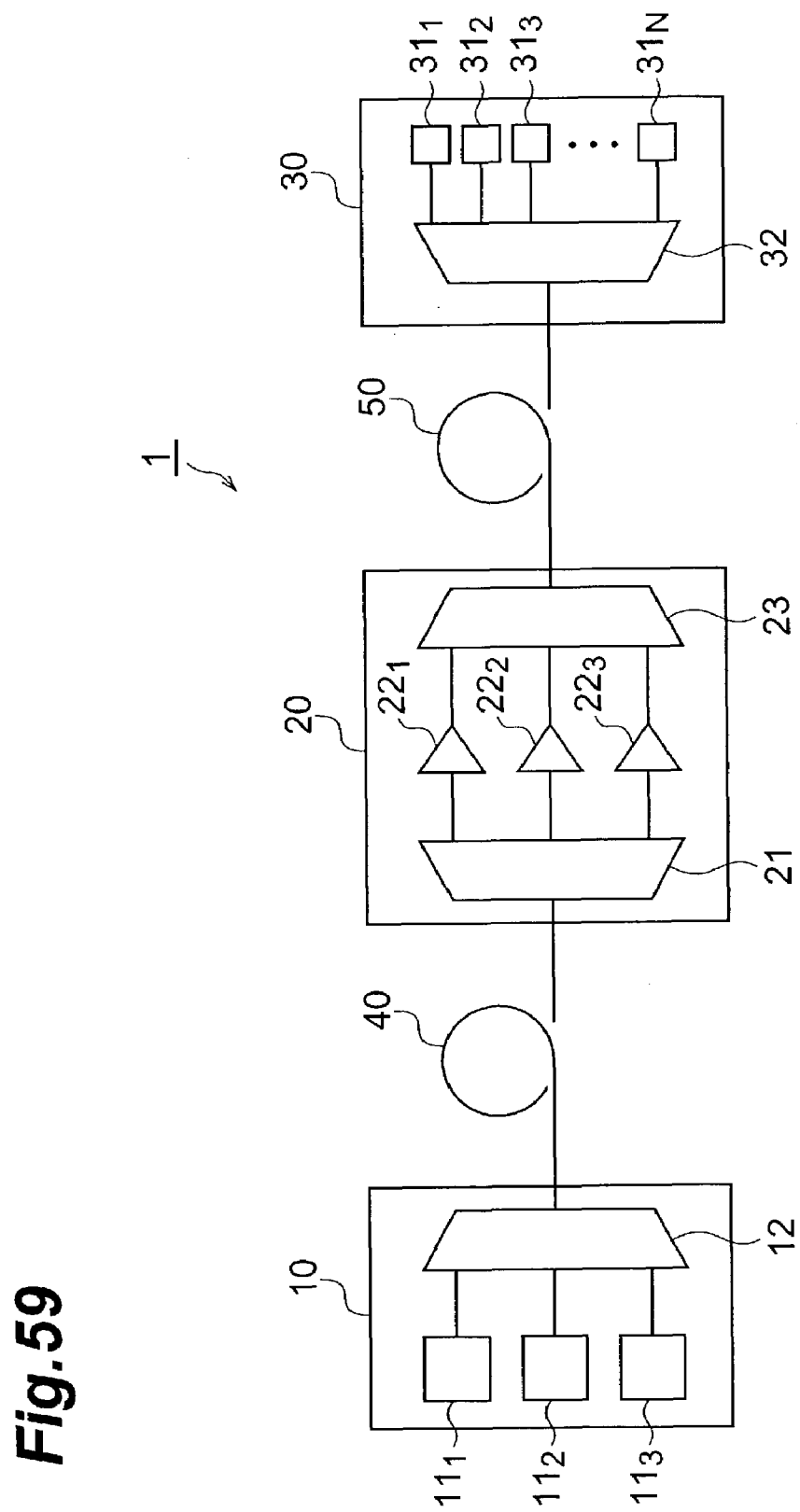
FIG. 59 is a diagram showing the configuration of an optical communication system according to the present invention.

An embodiment of the optical communication system according to the present invention will now be explained. FIG. 59 is a diagram showing an embodiment of the optical communication system according to the present invention. This optical communication system 1 comprises an optical transmitter 10, an optical repeater 20, an optical receiver 30, an optical fiber transmission line 40 laid between the optical transmitter 10 and the optical receiver 20, and an optical fiber transmission line 50 laid between the optical repeater 20 and the optical receiver 30.

Disposed within the optical transmitter 10 are light source sections $11_1$ to $11_3$ and an optical multiplexer 12. The light source section $11_1$ generates a plurality of channels of signal light within S band, multiplexes them, and outputs thus multiplexed light. The light source section $11_2$ generates a plurality of channels of signal light within C band, multiplexes them, and outputs thus multiplexed light. The light source section $11_3$ generates a plurality of channels of signal light within L band, multiplexes them, and outputs thus multiplexed light. The multiplexer 12 inputs the multiplexed signal light in C band outputted from the light source section $11_1$, the multiplexed signal light in S band outputted from the light source section $11_2$, and the multiplexed signal light in L band outputted from the light source section $11_3$, multiplexes them, and sends thus multiplexed light to the optical fiber transmission line 40.

Disposed within the optical repeater 20 are an optical demultiplexer 21, optical amplifiers $22_1$ to $22_3$, and an optical multiplexer 23. The optical demultiplexer 21 inputs S, C, and L bands of signal light having arrived after propagating through the optical fiber transmission line 40, demultiplexes them into the individual bands, and outputs thus demultiplexed bands of signal light. The optical amplifier $22_1$ inputs the S band of multiplexed signal light outputted from the optical demultiplexer 21, amplifies it collectively, and outputs thus amplified signal light. The optical amplifier $22_2$ inputs the C band of multiplexed signal light outputted from the optical demultiplexer 21, amplifies it collectively, and outputs thus amplified signal light. The optical amplifier $22_3$ inputs the L band of multiplexed signal light outputted from the optical demultiplexer 21, amplifies it collectively, and outputs thus amplified signal light. The optical multiplexer 23 inputs the S band of multiplexed signal light amplified by the optical amplifier $22_1$, the C band of multiplexed signal light amplified by the optical amplifier $22_2$, and the L band of multiplexed signal light amplified by the optical amplifier $22_3$, multiplexes them, and sends thus multiplexed light to the optical fiber transmission line 50.

Disposed within the optical receiver 30 are light-receiving sections $31_1$ to $31_N$ (N being an integer of 2 or greater) and an optical demultiplexer 32. The optical demultiplexer 32 inputs the S, C, and L bands of multiplexed signal light having arrived after propagating through the optical fiber transmission line 50, demultiplexes them into the individual signal channels, and outputs thus demultiplexed channels of signal light. The light-receiving section $31_n$ inputs and receives a wavelength $\lambda_n$ of signal light (n being an integer of at least 1 but not greater than N) outputted from the optical demultiplexer 32.

Among the three optical amplifiers shown in this drawing, the optical amplifier $22_1$ for S band is one having the same configuration (TDFA) as that of any of the optical amplifiers 100 to 800 according to the above-mentioned embodiments of the present invention. Each of the optical amplifiers $22_2$ and $22_3$ for C and L bands is EDFA which amplifies signal light by supplying EDF with pumping light in the wavelength band of 0.98 μm or 1.48 μm.

The optical communication system 1 operates as will be explained in the following. In the optical transmitter 10, the S band of multiplexed signal light outputted from the light source section $11_1$, the C band of multiplexed signal light outputted from the light source section $11_2$, and the L band of multiplexed signal light outputted from the light source section $11_3$ are multiplexed by the optical multiplexer 12, and thus multiplexed light is sent to the optical fiber transmission line 40. In the optical repeater 20, the S, C, and L bands of multiplexed signal light having arrived after propagating through the optical fiber transmission line 40 are demultiplexed by the optical demultiplexer 21 into the individual bands. The S band of multiplexed signal light outputted after being demultiplexed by the optical demultiplexer 21 is amplified by the optical amplifier $22_1$. The C band of multiplexed signal light outputted after being demultiplexed by the optical demultiplexer 21 is amplified by the optical amplifier $22_2$. The L band of multiplexed signal light outputted after being demultiplexed by the optical demultiplexer 21 is amplified by the optical amplifier $22_3$. Thus amplified S, C, and L bands of multiplexed signal light are multiplexed by the optical multiplexer 23, and thus multiplexed light is sent to the optical fiber transmission line 50. In the optical receiver 30, the S, C, and L bands of multiplexed signal light having arrived after propagating through the optical fiber transmission line 50 are demultiplexed into the individual signal channels by the optical demultiplexer 32. The wavelength $\lambda_n$ of signal light outputted after being demultiplexed by the optical demultiplexer 32 is received by the light-receiving section $31_n$.

Thus, the optical communication system 1 multiplexes the S, C, and L bands of multiplexed signal light and causes the resulting multiplexed signal light to propagate through the optical fiber transmission lines 40, 50, thereby being able to transmit a large volume of information at a high speed. Since the optical amplifier $22_1$ for S band has the same configuration (TDFA) as that of each of the optical amplifiers according to the above-mentioned embodiments, it can constantly keep the output signal light power and the gain flatness. Therefore, the optical communication system 1 is excellent in the transmission quality of S-band signal light.

Without being restricted to the above-mentioned embodiments, the optical amplifier and optical communication system according to the present invention can be modified in various manners. For example, though the optical amplification medium included in the optical amplifiers 100 to 800 is an optical fiber doped with Tm element in the above-mentioned embodiments, it is not restrictive, whereas one in which an optical waveguide formed on a flat substrate is doped with Tm element may be employed as well. However, TDF is preferred in that its waveguide length can easily be elongated.

Optical Transmission Characteristic Variable Optical Member with Variable Loss Slope The optical transmission characteristic variable optical member 550 (FIG. 38) in the configuration of the fifth embodiment will now be explained in detail. The same applies to the optical transmission characteristic variable optical members 650, 850 in the respective configurations of the sixth and eighth embodiments as well. As mentioned above, not only the loss slope in the signal wavelength region but also the cross point (center wavelength of loss slope) is variable in the optical transmission characteristic variable optical member 550. As shown in FIG. 38, the optical transmission characteristic variable optical member 550 is one in which two stages of Mach-Zehnder interferometers are cascaded to each other, whereas loss characteristics can be regulated by adjusting respective temperatures of individual optical waveguides by four heaters 554a to 554d.

Figure 60A:
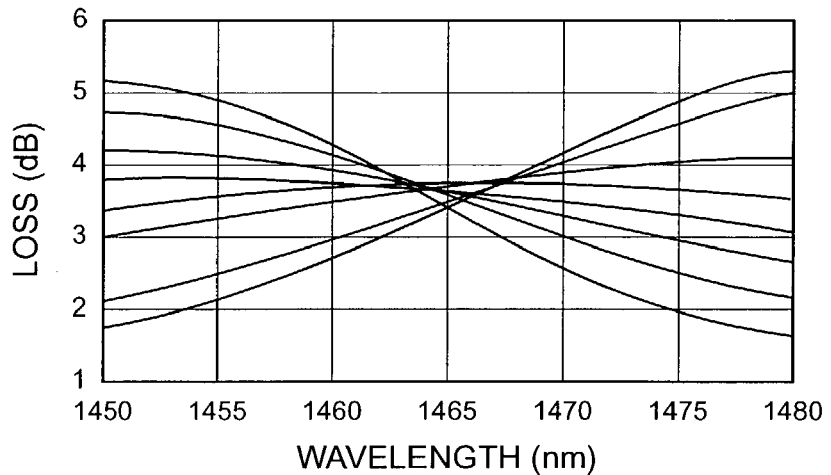
FIGS. 60A to 60C are graphs showing loss characteristics of the transmission characteristic variable optical member 550.
Figure 60B:
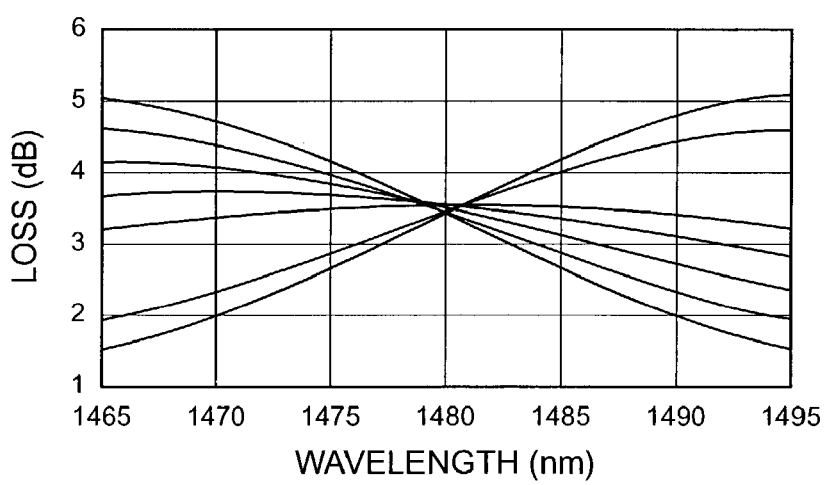
Figure 60C:
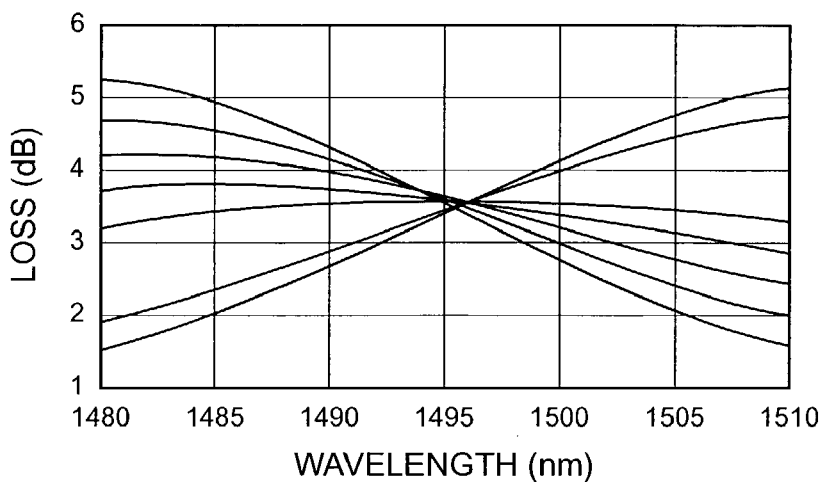
Figure 61A:
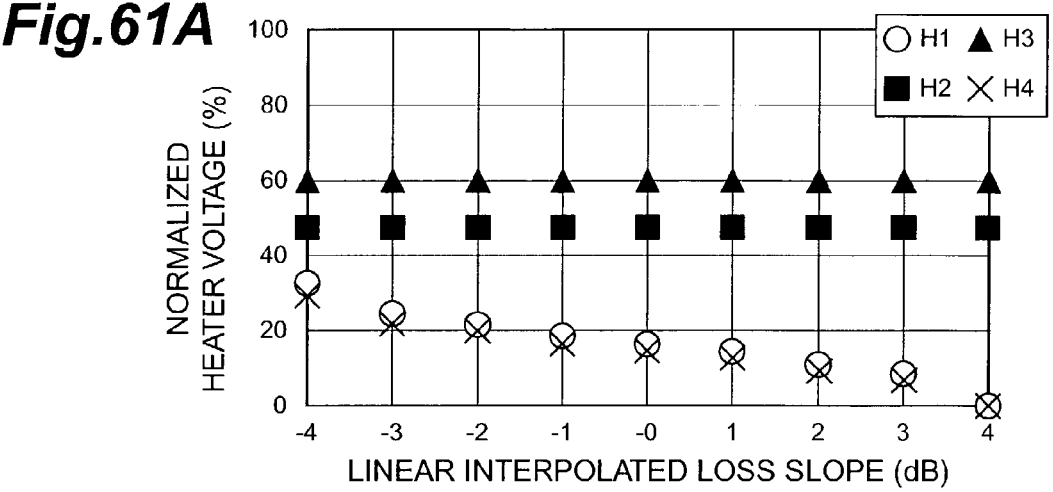
FIGS. 61A to 61C are graphs showing relationships between the loss slope and respective driving voltages of individual heaters in the transmission characteristic variable optical member 550.
Figure 61B:
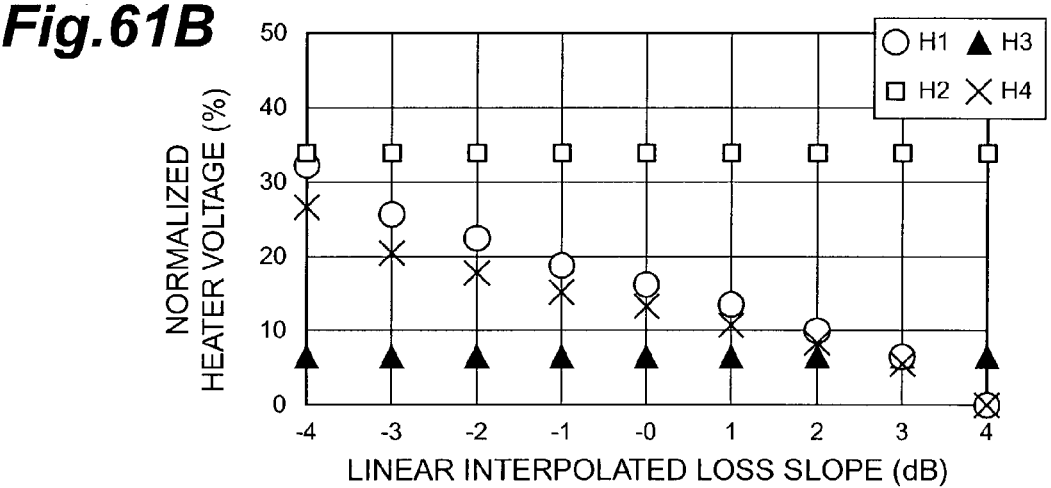
Figure 61C:
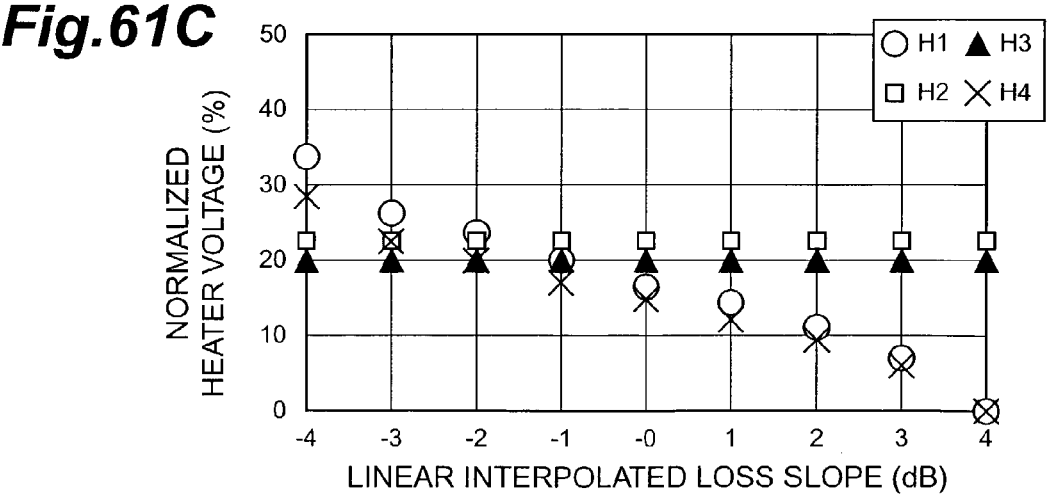

FIGS. 60A to 60C are graphs showing loss characteristics of the optical transmission characteristic variable optical member 550. FIGS. 61A to 61C are graphs showing relationships between the loss slope and respective driving voltages of individual heaters in the optical transmission characteristic variable optical member 550. FIGS. 60A and 61, 60B and 61B, and 60C and 61C indicate the case where the cross point is 1465 nm, 1480 nm, and 1495 nm (at the center wavelength), respectively. In FIGS. 61A to 61C, H1, H2, H3, and H4 indicate heaters 554a, 554b, 554c, and 554d, respectively.

Figure 62A:
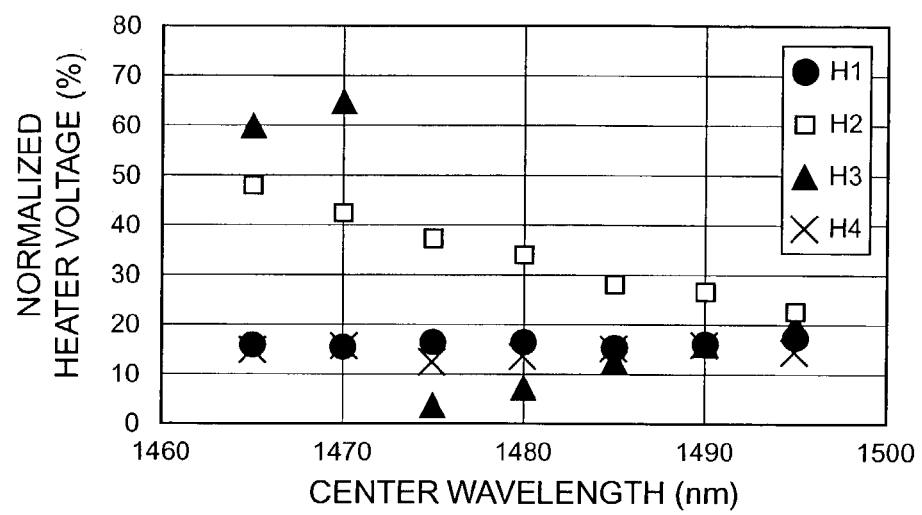
FIGS. 62A and 62B are graphs showing relationships between the cross point and the respective driving voltages of individual heaters in the transmission characteristic variable optical member 550.
Figure 62B:
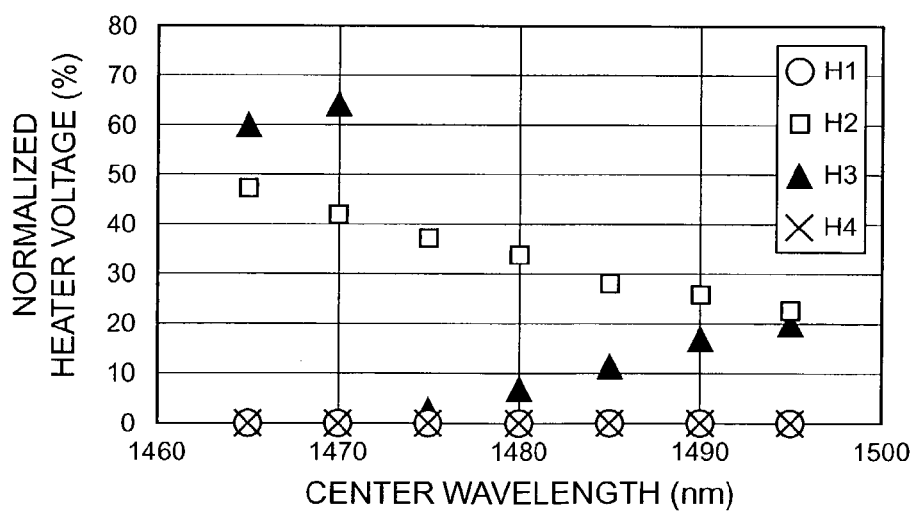

FIGS. 62A and 62B are graphs showing relationships between the cross point and respective driving voltages of individual heaters in the optical transmission characteristic variable optical member 550. As can be seen from FIGS. 61A to 61C, 62A, and 62B, the optical transmission characteristic variable optical member 550 can regulate the cross point by the temperature adjustment effected by the heaters 554b and 554c, and control the loss slope by the temperature adjustment effected by the heaters 554a and 554d.

Thus, the optical transmission characteristic variable optical member 550 can control the loss slope and the shift of cross point independently from each other. The cross point is shiftable within the range of 1465 nm to 1495 nm.

In the case of 1.4-μm wavelength band pumping TDFA, since the cross point changes by about 10 nm upon channel number fluctuations and input/output power fluctuations, the width of change of cross point in the optical transmission characteristic variable optical member 550 is preferably at least 10 nm. In the case of 1.05-μm wavelength band pumping TDFA, since the cross point changes by about 15 nm upon channel number fluctuations and input/output power fluctuations, the width of change of cross point in the optical transmission characteristic variable optical member 550 is preferably at least 15 nm.

As explained in detail in the foregoing, the optical amplifier according to the present invention can control the magnitude of gain and gain spectrum form under conditions expected in the state of actual use as well.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:
1. An optical amplifier comprising:
an optical waveguide disposed on a signal propagating line extending from a signal input end to a signal output end, said optical waveguide having a light-guiding region doped with Tm element;

a pumping light supply system configured for supplying said optical waveguide with pumping light components;

a monitor system configured for monitoring at least two wavelengths of light included in an amplification wavelength band at one or more positions on said signal propagating line, whereby powers of the pumping light components supplied to said optical waveguide are individually adjusted according to a result of monitoring effected by said monitor system; and a controller configured to maintain a gain spectrum form in said optical waveguide and to maintain a power of signal light outputted from said optical waveguide at a constant design value, by adjusting only the magnitude of the amplification gain.

2. An optical amplifier according to claim 1, wherein said pumping light supply system includes first light source means for supplying said optical waveguide with pumping light of one or more channels included in a wavelength band of 0.8 μm, 1.05 μm or 1.4 μm, and a structure for guiding a part of pumping light from said first light source means to said optical waveguide by way of an input end of said optical waveguide in a forward direction identical to an advancing direction of said signal light and guiding a part of pumping light from said first light source means to said optical waveguide by way of an output end of said optical waveguide in a backward direction opposite from said advancing direction of said signal light; and wherein said controller maintains the gain spectrum form in said optical waveguide by adjusting the power of pumping light forwardly supplied to said optical waveguide, and maintains the power of signal light outputted from said optical waveguide at the constant design value by adjusting the power of pumping light backwardly supplied to said optical waveguide.

3. An optical amplifier according to claim 1, wherein said pumping light supply system includes first light source means for supplying said optical waveguide with pumping light of one or more channels included in a wavelength band of 1.05 μm or 1.4 μm, and a structure for guiding a part of pumping light from said first light source means to said optical waveguide by way of an input end of said optical waveguide in a forward direction identical to an advancing direction of said signal light and guiding a part of pumping light from said first light source means to said optical waveguide by way of an output end of said optical waveguide in a backward direction opposite from said advancing direction of said signal light; and wherein said controller maintains the gain spectrum form in said optical waveguide by adjusting the ratio between respective powers of pumping light forwardly and backwardly supplied to said optical waveguide, and maintains the power of signal light outputted from said optical waveguide at the constant design value by adjusting the sum of respective powers of pumping light forwardly and backwardly supplied to said optical waveguide.

4. An optical amplifier according to claim 1, wherein said pumping light supply system includes first light source means for supplying said optical waveguide with pumping light of one or more channels included in a wavelength band of 1.05 μm or 1.4 μm, and a structure for guiding a part of pumping light from said first light source means to said optical waveguide by way of an input end of said optical waveguide in a forward direction identical to an advancing direction of said signal light and guiding a part of pumping light from said first light source means to said optical waveguide by way of an output end of said optical waveguide in a backward direction opposite from said advancing direction of said signal light; and wherein said controller maintains both the gain spectrum form in said optical waveguide and the power of signal light outputted therefrom by adjusting, according to the number of channels of signal light propagating through said optical waveguide, the power of pumping light supplied to said optical waveguide in at least one of said forward and backward directions.

5. An optical amplifier according to claim 1, wherein said pumping light supply system includes first light source means for supplying said optical waveguide with pumping light of one or more channels included in a wavelength band of 1.05 μm or 1.4 μm, and a structure for guiding a part of pumping light from said first light source means to said optical waveguide by way of an input end of said optical waveguide in a forward direction identical to an advancing direction of said signal light and guiding a part of pumping light from said first light source means to said optical waveguide by way of an output end of said optical waveguide in a backward direction opposite from said advancing direction of said signal light; and wherein said controller maintains both the gain spectrum form in said optical waveguide and the power of signal light outputted therefrom by adjusting, according to the power of signal light fed into said optical, waveguide, the power of pumping light supplied to said optical waveguide in at least one of said forward and backward directions.

6. An optical amplifier according to claim 1, wherein said pumping light supply system includes first light source means for outputting pumping light of one or more channels included in a wavelength band of 1.05 μm or 1.4 μm, and second light source means for outputting pumping light of one or more channels included in a wavelength band of 1.2 μm or 1.55 to 1.65 μm; and wherein said controller maintains the gain spectrum form in said optical waveguide by adjusting a power of pumping light supplied from said second light source means to said optical waveguide, and maintains the power of signal light outputted from said optical waveguide at the constant design value by adjusting a power of pumping light supplied from said first light source means to said optical waveguide.

7. An optical amplifier according to claim 1, further comprising a transmission characteristic variable optical member disposed on said signal propagating line and optically connected to said optical waveguide, said transmission characteristic variable optical member having a variable transmission characteristic in a signal wavelength band;

wherein said controller maintains both the magnitude of amplification gain and gain spectrum form in said optical waveguide by adjusting the power of said pumping light and the transmission characteristic of said transmission characteristic variable optical member.

8. An optical amplifier according to claim 7, wherein said transmission characteristic variable optical member has a structure with a variable transmittance with respect to said signal light.

9. An optical amplifier according to claim 7, wherein said transmission characteristic variable optical member has a structure with a variable loss spectrum slope with respect to said signal light.

10. An optical amplifier according to claim 9, wherein said transmission characteristic variable optical member has a structure adapted to shift the loss spectrum slope in a wavelength axis direction in the signal wavelength band.

11. An optical amplifier according to claim 10, wherein said loss spectrum has a shiftable amount of at least 10 nm in the wavelength direction.

12. An optical amplifier according to claim 11, wherein said loss spectrum has a shiftable amount of at least 15 nm in the wavelength direction.

13. An optical amplifier according to claim 1, wherein said monitor system monitors, at two or more wavelengths included in the amplification wavelength band, the light outputted from said optical waveguide and spontaneously emitted light generated within said optical waveguide.

14. An optical amplifier according to claim 13, wherein said monitor system monitors spontaneously emitted light released from a side face of said optical waveguide.

15. An optical amplifier according to claim 1, wherein said monitor system detects at least one of the power or number of channels of signal light fed into said optical waveguide, and the power, of light outputted from said optical waveguide.

16. An optical amplifier according to claim 15, wherein said monitor system detects the total power of signal light fed into said optical waveguide and the total power of light outputted from said optical waveguide.

17. An optical amplifier according to claim 1, wherein said monitor system includes:
an optical add/drop coupler for isolating a part of light outputted from said optical waveguide;
a filter for selectively transmitting therethrough a specific wavelength of light included in said part of light isolated by said optical add/drop coupler; and
a light-receiving section for detecting a power of said specific wavelength of light transmitted through said filter.

18. An optical amplifier according to claim 1, wherein said monitor system includes:
an optical add/drop coupler for isolating a part of light outputted from said optical waveguide;
a diffraction grating for diffracting said part of light isolated by said optical add/drop coupler; and
a light-receiving section for detecting a power of a specific wavelength of light diffracted by said diffraction grating.

19. An optical amplifier according to claim 18, wherein said monitor system detects the number of channels of signal light fed into said optical waveguide according to a spectrum of light diffracted by said diffraction grating.

20. An optical amplifier according to claim 1, wherein said optical waveguide includes an optical fiber having a core region doped with Tm element.

21. An optical communication system for transmitting a plurality of channels of signal light having respective wavelengths different from each other, said optical communication system including the optical amplifier according to claim 1.

22. An optical amplifier comprising:
an optical waveguide disposed on a signal propagating line extending from a signal input end to a signal output end, said optical waveguide having a light-guiding region doped with Tm element;
a pumping light supply system configured for supplying said optical waveguide with pumping light; said pumping light supply system including first light source means configured for supplying said optical waveguide with pumping light of one or more channels included in a wavelength band of 1.05 nm or 1.4 nm, and a structure configured for guiding a part of pumping light from said first light source means to said optical waveguide by way of an input end of said optical waveguide in a forward direction identical to an advancing direction of said signal light and guiding a part of pumping light from said first light source means to said optical waveguide by way of an output end of said optical waveguide in a backward direction opposite from said advancing direction of said signal light;
a monitor system configured for monitoring light included in an amplification wavelength band at
one or more positions on said signal propagating line, whereby powers of channels in the pumping light supplied to said optical waveguide are individually adjusted, according to a result of monitoring effected by said monitor system; and
a controller configured to maintain a gain spectrum form in said optical waveguide and to maintain a power of signal light outputted from said optical waveguide at a constant design value, by adjusting only the magnitude of the amplification gain.

23. An optical amplifier according to claim 22, wherein said controller regulates the gain flatness of said optical waveguide by adjusting the power of pumping light forwardly supplied to said optical waveguide, and controls the power of signal light outputted from said optical waveguide by adjusting the power of pumping light backwardly supplied to said optical waveguide.

24. An optical amplifier according to claim 22, wherein said controller maintains the gain spectrum form in said optical waveguide by adjusting the ratio between respective powers of pumping light forwardly and backwardly supplied to said optical waveguide, and maintains the power of signal light outputted from said optical waveguide at the constant design value by adjusting the sum of respective powers of pumping light forwardly and backwardly supplied to said optical waveguide.

25. An optical amplifier according to claim 22, wherein said controller maintains both the gain spectrum form in said optical waveguide and the power of signal light outputted therefrom by adjusting, according to the number of channels of signal light propagating through said optical waveguide, the power of pumping light supplied to said optical waveguide in at least one of said forward and backward directions.

26. An optical amplifier according to claim 22, wherein said controller maintains both the gain spectrum form in said optical waveguide and the power of signal light outputted therefrom by adjusting, according to the power of signal light fed into said optical waveguide, the power of pumping light supplied to said optical waveguide in at least one of said forward and backward directions.

27. An optical amplifier according to claim 22, said pumping light supply system further comprises second light source means for outputting pumping light of one or more channels included in a wavelength band of 1.2 μm or 1.55 to 1.65 μm;
wherein said controller maintains the gain spectrum form in said optical waveguide by adjusting a power of pumping light supplied from said second light source means to said optical waveguide, and maintains the power of signal light outputted from said optical waveguide at the constant design value by adjusting a power of pumping light supplied from said first light source means to said optical waveguide.

28. An optical amplifier according to claim 22, wherein said pumping light supply system further comprises second light source means for outputting pumping light of one or more channels included in a wavelength band of 1.2 µm or 1.55 to 1.65 µm; and wherein said controller maintains both the gain spectrum form in said optical waveguide and the power of signal light outputted therefrom by adjusting, according to the number of channels of signal light propagating through said optical waveguide, a power of pumping light supplied from said second light source means to said optical waveguide.

29. An optical amplifier according to claim 22, wherein said pumping light supply system further comprises second light source means for outputting pumping light of one or more channels included in a wavelength band of 1.2 µm or 1.55 to 1.65 µm; and wherein said controller maintains both the gain spectrum form in said optical waveguide and the power of signal light outputted therefrom by adjusting, according to the power of signal light fed into said optical waveguide, a power of pumping light supplied from said second light source means to said optical waveguide.

30. An optical amplifier according to claim 22, further comprising a transmission characteristic variable optical member disposed on said signal propagating line and optically connected to said optical waveguide, said transmission characteristic variable optical member having a variable transmission characteristic in a signal wavelength band;

wherein said controller maintains both the magnitude of amplification gain and gain spectrum form in said optical waveguide by adjusting the power of said pumping light and the transmission characteristic of said transmission characteristic variable optical member.

31. An optical amplifier according to claim 30, wherein said transmission characteristic variable optical member has a structure with a variable transmittance with respect to said signal light.

32. An optical amplifier according to claim 31, wherein said pumping light supply system further includes second light source means for outputting pumping light of one or more channels included in a wavelength band of 1.2 µm or 1.55 to 1.65 µm; and wherein said controller maintains the gain spectrum form in said optical waveguide by adjusting the power of pumping light in the wavelength band of 1.2 µm or 1.55 to 1.65 µm outputted from said second light source means according to the number of channels of signal light propagating through said optical waveguide while adjusting the transmittance of said transmission characteristic variable optical member in the signal wavelength band according to the power of signal light fed into said optical waveguide or a target value of the power of signal light outputted from said optical waveguide, and maintains the power of signal light outputted from said optical waveguide at the constant design value by adjusting the power of pumping light in the wavelength band of 1.05 µm or 1.4 µm outputted from said first light source means.

33. An optical amplifier according to claim 31, wherein the amount of fluctuation of loss $\Delta A$ (dB) in said transmission characteristic variable optical member is represented by the following expression:

$$\Delta A = X(\Delta P_{in} - \Delta P_{out})$$

where $\Delta P_{in}$ (dB) is the amount of power fluctuation in signal light fed into said optical waveguide, $\Delta P_{out}$ (dB) is the amount of target power fluctuation in signal light outputted from said optical waveguide, and x is a coefficient having a value corresponding to the number of channels of signal light propagating through said optical waveguide.

34. An optical amplifier according to claim 30, wherein said transmission characteristic variable optical member has a structure with a variable loss spectrum slope with respect to said signal light.

35. An optical amplifier according to claim 34, wherein said pumping light supply system further includes second light source means for outputting pumping light of one or more channels included in a wavelength band of 1.2 µm or 1.55 to 1.65 µm; and wherein said controller maintains the gain spectrum form in said optical waveguide by adjusting the power of pumping light in the wavelength band of 1.2 µm or 1.55 to 1.65 µm outputted from said second light source means according to the number of channels of signal light propagating through said optical waveguide while adjusting the loss spectrum slope of said transmission characteristic variable optical member with respect to said signal light according to the power of signal light fed into said optical waveguide or a target value of the power of signal light outputted from said optical waveguide, and maintains the power of signal light outputted from said optical waveguide at the constant design value by adjusting the power of pumping light in the wavelength band of 1.05 µm or 1.4 µm outputted from said first light source means.

36. An optical amplifier according to claim 34, wherein the amount of fluctuation of loss spectrum slope $\Delta S$ (dB) in said transmission characteristic variable optical member in the signal wavelength band is represented by the following expression:

$$\Delta S = Y(\Delta P_{in} - \Delta P_{out})$$

where $\Delta P_{in}$ (dB) is the amount of power fluctuation in signal light fed into said optical waveguide, $\Delta P_{out}$ (dB) is the amount of target power fluctuation in signal light outputted from said optical waveguide, and Y is a coefficient having a value corresponding to the number of channels of signal light propagating through said optical waveguide.

37. An optical amplifier according to claim 34, wherein said transmission characteristic variable optical member has a structure adapted to shift the loss spectrum slope in a wavelength axis direction in the signal wavelength band.

38. An optical amplifier according to claim 37, wherein said controller maintains the gain spectrum form in said optical waveguide by adjusting the slope and amount of shift in the wavelength axis direction of loss spectrum of said transmission characteristic variable optical member in the signal wavelength band according to the number of channels of signal light propagating through said optical waveguide while adjusting the loss spectrum slope of said transmission characteristic variable optical member in the signal wavelength band according to the power of signal light fed into said optical waveguide or a target value of the power of signal light outputted from said optical waveguide, and maintains the power of signal light outputted from said optical waveguide at the constant design value by adjusting the power of pumping light in the wavelength band of 1.05 µm or 1.4 µm outputted from said first light source means.

39. An optical amplifier according to claim 37, wherein said loss spectrum has a shiftable amount of at least 10 nm in the wavelength direction.

40. An optical amplifier according to claim 39, wherein said loss spectrum has a shiftable amount of at least 15 nm in the wavelength direction.

41. An optical amplifier according to claim 22, wherein said monitor system monitors, at two or more wavelengths included in the amplification wavelength band, the light outputted from said optical waveguide and spontaneously emitted light generated within said optical waveguide.

42. An optical amplifier according to claim 41, wherein said monitor system monitors spontaneously emitted light released from a side face of said optical waveguide.

43. An optical amplifier according to claim 22, wherein said monitor system detects at least one of the power or number of channels of signal light fed into said optical waveguide, and the power of light outputted from said optical waveguide.

44. An optical amplifier according to claim 43, wherein said monitor system detects the total power of signal light fed into said optical waveguide and the total power of light outputted from said optical waveguide.

45. An optical amplifier according to claim 22, wherein said monitor system includes:
   an optical add/drop coupler for isolating a part of light outputted from said optical waveguide;
   a filter for selectively transmitting therethrough a specific wavelength of light included in said part of light isolated by said optical add/drop coupler; and
   a light-receiving section for detecting a power of said specific wavelength of light transmitted through said filter.

46. An optical amplifier according to claim 22, wherein said monitor system includes:
   an optical add/drop coupler for isolating a part of light outputted from said optical waveguide;
   a diffraction grating for diffracting said part of light isolated by said optical add/drop coupler; and
   a light-receiving section for detecting a power of a specific wavelength of light diffracted by said diffraction grating.

47. An optical amplifier according to claim 46, wherein said monitor system detects the number of channels of signal light fed into said optical waveguide according to a spectrum of light diffracted by said diffraction grating.

48. An optical amplifier according to claim 22, wherein said optical waveguide includes an optical fiber having a core region doped with Tm element.

49. An optical communication system for transmitting a plurality of channels of signal light having respective wavelengths different from each other, said optical communication system including the optical amplifier according to claim 22.

50. An optical amplifier comprising:
   an optical waveguide disposed on a signal propagating line extending from a signal input end to a signal output end, said optical waveguide having a light-guiding region doped with Tm element;
   a pumping light supply system for supplying said optical waveguide with pumping light component;
   a temperature detecting section for detecting a temperature of said optical waveguide or in the vicinity thereof, whereby powers of the pumping light components supplied into said optical waveguide are individually adjusted, according to a result of monitoring effected by said monitor system; and
   a controller configured to maintain a gain spectrum form in said optical waveguide and to maintain a power of signal light outputted from said optical waveguide at a constant design value, by adjusting only the magnitude of the amplification gain.

51. An optical amplifier according to claim 50, wherein said pumping light supply system includes first light source means for supplying said optical waveguide with pumping light of one or more channels included in a wavelength band of 1.05 µm or 1.4 µm, and a structure for guiding a part of pumping light from said first light source means to said optical waveguide by way of an input end of said optical waveguide in a forward direction identical to an advancing direction of said signal light and guiding a part of pumping light from said first light source means to said optical waveguide by way of an output end of said optical waveguide in a backward direction opposite from said advancing direction of said signal light; and
   wherein said controller maintains the gain spectrum form in said optical waveguide by adjusting the power of pumping light forwardly supplied to said optical waveguide, and maintains the power of signal light outputted from said optical waveguide at the constant design value by adjusting the power of pumping light backwardly supplied to said optical waveguide.

52. An optical amplifier according to claim 50, wherein said pumping light supply system Includes first light source means for supplying said optical waveguide with pumping light of one or more channels included in a wavelength band of 1.05 µm or 1.4 µm, and a structure for guiding a part of pumping light from said first light source means to said optical waveguide by way of an input end of said optical waveguide in a forward direction identical to an advancing direction of said signal light and guiding a part of pumping light from said first light source means to said optical waveguide by way of an output end of said optical waveguide in a backward direction opposite from said advancing direction of said signal light; and
   wherein said controller maintains the gain spectrum form in said optical waveguide by adjusting the ratio between respective powers of pumping light forwardly and backwardly supplied to said optical waveguide, and maintains the power of signal light outputted from said optical waveguide at the constant design value by adjusting the sum of respective powers of pumping light forwardly and backwardly supplied to said optical waveguide.

53. An optical amplifier according to claim 50, wherein said pumping light supply system includes first light source means for outputting pumping light of one or more channels included in a wavelength band of 1.05 µm or 1.4 µm, and second light source means for outputting pumping light of one or more channels included in a wavelength band of 1.2 µm or 1.55 to 1.65 µm; and
   wherein said controller maintains the gain spectrum form in said optical, waveguide by adjusting a power of pumping light supplied from said second light source means to said optical waveguide, and maintains the power, of signal light outputted from said optical waveguide at the constant design value by adjusting a power of pumping light supplied from said first light source means to said optical waveguide.

54. An optical amplifier according to claim 50, further comprising a transmission characteristic variable optical member disposed on said signal propagating line and optically connected to said optical waveguide, said transmission characteristic variable optical member having a variable transmission characteristic in a signal wavelength band;
   wherein said controller maintains both the magnitude of amplification gain and gain spectrum form in said optical waveguide by adjusting the power of said pumping light and the transmission characteristic of said transmission characteristic variable optical member.

55. An optical amplifier according to claim 54, wherein said transmission characteristic variable optical member has a structure with a variable transmittance with respect to said signal light.

56. An optical amplifier according to claim 54, wherein said transmission characteristic variable optical member has a structure with a variable loss spectrum slope with respect to said signal light.

57. An optical amplifier according to claim 56, wherein said transmission characteristic variable optical member includes a plurality of Mach-Zehnder interferometers configured into a plurality of stages.

58. An optical amplifier according to claim 56, wherein said transmission characteristic variable optical member has a structure adapted to shift the loss spectrum slope in a wavelength axis direction in the signal wavelength band.

59. An optical amplifier according to claim 58, wherein said loss spectrum has a shiftable amount of at least 10 nm in the wavelength direction.

60. An optical amplifier according to claim 59, wherein said loss spectrum has a shiftable amount of at least 15 nm in the wavelength direction.

61. An optical amplifier according to claim 50, wherein said optical waveguide includes an optical fiber having a core region doped with Tm element.

62. An optical communication system for transmitting a plurality of channels of signal light having respective wavelengths different from each other, said optical communication system including the optical amplifier according to claim 50.

* * * * *